US011080093B2

(12) United States Patent
Chandran et al.

(10) Patent No.: US 11,080,093 B2
(45) Date of Patent: Aug. 3, 2021

(54) METHODS AND SYSTEMS TO RECLAIM CAPACITY OF UNUSED RESOURCES OF A DISTRIBUTED COMPUTING SYSTEM

(71) Applicant: VMware, Inc., Palo Alto, CA (US)

(72) Inventors: Rachil Chandran, Palo Alto, CA (US); Lalit Jain, Santa Clara, CA (US); Harutyun Beybutyan, Yerevan (AM); James Ang, Palo Alto, CA (US); Leah Nutman, Palo Alto, CA (US); Keshav Mathur, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 168 days.

(21) Appl. No.: 16/013,503

(22) Filed: Jun. 20, 2018

(65) Prior Publication Data
US 2019/0317816 A1 Oct. 17, 2019

Related U.S. Application Data

(63) Continuation-in-part of application No. 15/951,523, filed on Apr. 12, 2018.

(51) Int. Cl.
*G06F 9/46* (2006.01)
*G06F 9/50* (2006.01)
(Continued)

(52) U.S. Cl.
CPC .......... *G06F 9/5022* (2013.01); *G06F 9/5077* (2013.01); *G06F 17/18* (2013.01);
(Continued)

(58) Field of Classification Search
CPC ...... G06F 9/5022; G06F 9/5077; G06F 17/18; G06F 2009/5019; G06F 2209/508; G06N 7/005
See application file for complete search history.

(56) References Cited

U.S. PATENT DOCUMENTS

| 2011/0225016 A1* | 9/2011 | Boss ...................... G06Q 10/06 705/7.25 |
| 2013/0024455 A1* | 1/2013 | Bose ................... G06F 11/3442 707/740 |

(Continued)

OTHER PUBLICATIONS

Vlachos et al., On periodicity Detection and Structural Periodic Similarity, SIAM, Apr. 2005, 12 pages.*
(Continued)

*Primary Examiner* — Diem K Cao

(57) ABSTRACT

Computational methods and systems to reclaim capacity of a virtual infrastructure of distributed computing system are described. Methods and systems are directed to forecasting usage of resources that form a virtual infrastructure of a distributed computing system. Streams of metric data that represent usage of resources of the virtual infrastructure assigned to a virtual object are collected. A binary sequence of active status metric data is computed for the virtual object based on the streams of metric data. Forecasted active status metric data are computed in a forecast interval based on the sequence of active status metric data. Expected active or inactive status of virtual object over the forecast interval is determined from the forecasted active status metric data. If the virtual object is expected to inactive status over the forecast interval, resources assigned to the virtual object are reclaimed for use by active virtual objects.

27 Claims, 48 Drawing Sheets

(51) Int. Cl.
*G06F 17/18* (2006.01)
*G06N 7/00* (2006.01)

(52) U.S. Cl.
CPC ....... *G06N 7/005* (2013.01); *G06F 2209/508* (2013.01); *G06F 2209/5019* (2013.01)

(56) References Cited

U.S. PATENT DOCUMENTS

| | | | | |
|---|---|---|---|---|
| 2013/0097601 | A1* | 4/2013 | Podvratnik | G06F 9/5027 718/1 |
| 2015/0363238 | A1* | 12/2015 | Bai | G06F 9/5022 718/1 |
| 2016/0253215 | A1* | 9/2016 | Fang | G06F 1/329 718/104 |
| 2016/0294722 | A1* | 10/2016 | Bhatia | H04L 47/70 |
| 2017/0199770 | A1* | 7/2017 | Peteva | G06F 9/5088 |
| 2018/0007128 | A1* | 1/2018 | Ramachandra | G06F 11/3442 |
| 2018/0302291 | A1* | 10/2018 | Srinivasan | G06F 9/45558 |
| 2019/0056969 | A1* | 2/2019 | Khandros | G06F 16/258 |

OTHER PUBLICATIONS

Xiao et al, Dynamic Resource Allocation Using Virtual Machines for Cloud Computing Environment, IEEE, Jun. 2013, 21 pages.*

* cited by examiner

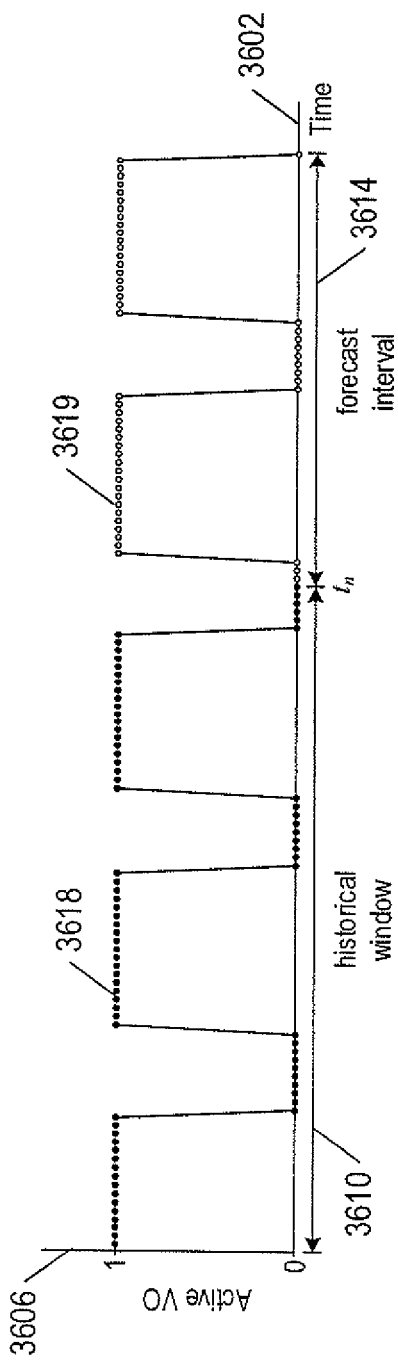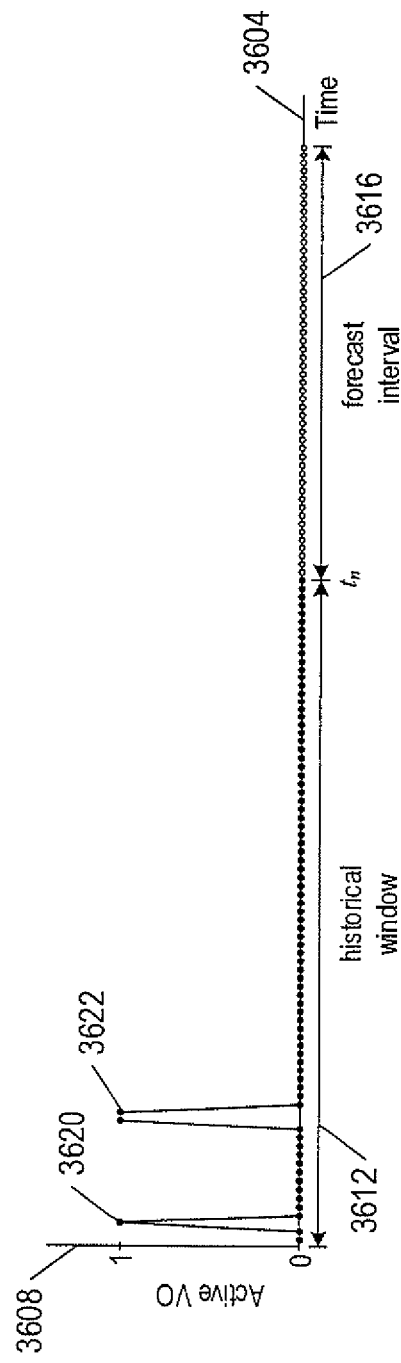
FIG. 36A
FIG. 36B

METHODS AND SYSTEMS TO RECLAIM CAPACITY OF UNUSED RESOURCES OF A DISTRIBUTED COMPUTING SYSTEM

CROSS-REFERENCE TO RELATED APPLICATION

This application is a continuation-in-part of application Ser. No. 15/951,523 filed Apr. 12, 2018.

TECHNICAL FIELD

This disclosure is directed to methods and systems to reclaim unused resource capacity of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Cloud computing service providers that manage large distributed computing systems sell cloud computing services to individuals and enterprises, called "tenants," as a way for tenants to deploy their applications, store data, and offer services to their customers via the Internet. Virtualization has enabled cloud computing service providers to sell cloud computing services to tenants in much the same way a utility sells a service to a utility customer. For example, virtualization has enabled tenants to run their applications in virtual objects, such as virtual machines ("VMs") and containers, in a virtual infrastructure (e.g., virtual CPUs, virtual memory, virtual disk space etc.) created from computational resources (e.g., CPU, memory, disk space etc.) of a distributed computing system. As a result, tenants can configure a virtual infrastructure to run multiple virtual objects on the same resources, scale resource usage to meet changing network, computing, and data storage demands, and only pay for usage of the resources used to create the virtual infrastructure. Virtualization has also decreased a tenant's time to market while eliminating a heavy investment in information technology ("IT") resources and operating expenses.

Workloads of virtual objects may vary over time, which often leads to wasted resources and unnecessary costs to tenants. For example, in order for a distributed computing system tenant in the retail industry to meet increased customer demands during the holiday season, the tenant typically adds resources to an existing virtual infrastructure to run additional virtual objects. However, when the demand returns to normal, the added virtual objects become idle and tenants often forget to delete the idle virtual objects. Alternatively, a tenant may have powered off the added virtual objects after the demand returns to normal but leaves the added virtual objects in a powered-off state believing the added virtual objects may be needed in the near future. In either case, resources allocated to enlarge the virtual infrastructure are wasted, because these resources cannot be utilized by other virtual objects while the resources remain assigned to the idle and powered-off virtual objects. As a result, a cloud computing service provider is not able to maximize usage of resources of a distributed computing system and a tenant that unknowingly maintains idle and power-off virtual objects in the distributed computing system continues to pay for unutilized resources.

SUMMARY

Computational methods and systems to reclaim capacity of a virtual infrastructure of distributed computing system are described. Methods and systems are directed to forecasting usage of resources that form a virtual infrastructure of a distributed computing system. The resources included processors, cores, memory, network adapters, and disk storage space. The virtual infrastructure supports virtual objects, including applications, virtual machines ("VMs"), and containers. Methods and systems collect streams of metric data. Each stream of metric data represents usage of a resource of the virtual infrastructure assigned to a virtual object. A binary sequence of active status metric data is computed for the virtual object based on the streams of metric data. For example, binary values of "1" and "0" in a sequence of active status metric data may represent active and inactive status, respectively, of the virtual object at different time stamps. Forecasted active status metric data are computed in a forecast interval based on the sequence of active status metric data. If one or more data points of the forecasted active status metric data is non-zero, the virtual object is expected to be active over the forecast interval and resources assigned to the virtual object are not reclaimed. On the other hand, if the forecasted active status metric data is zero over the forecast interval, the virtual object is expected to be inactive over the forecast interval and the resources assigned to the virtual object are reclaimed for use by active virtual objects.

DESCRIPTION OF THE DRAWINGS

FIGS. 36A-36B show plots of example active status metric data for two different virtual objects running on a virtual infrastructure.

DETAILED DESCRIPTION

Figure 1:
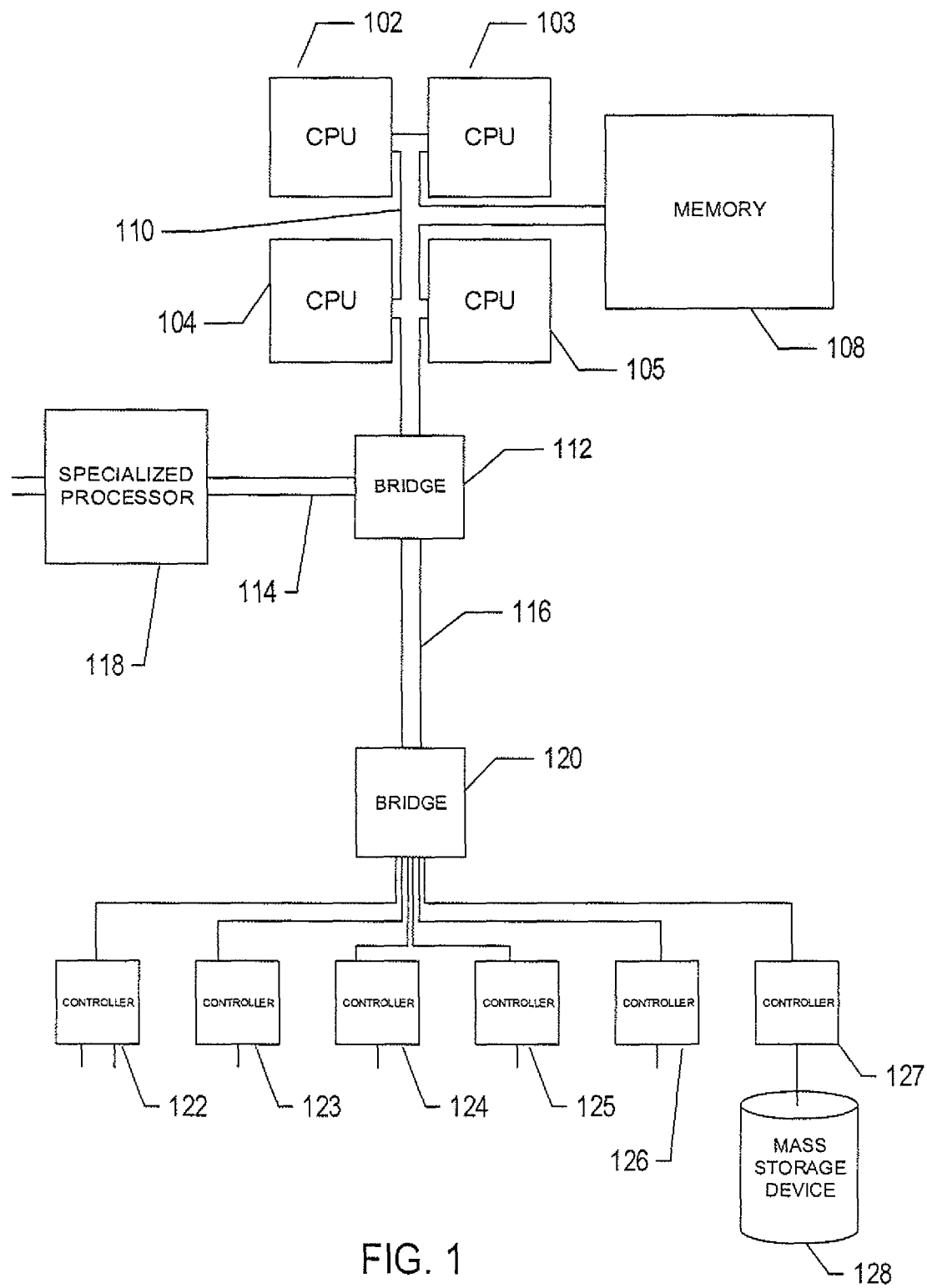
FIG. 1 shows an architectural diagram for various types of computers.

This disclosure presents computational methods and systems that reclaims capacity of unused resources of a distributed computing system. In a first subsection, computer hardware, complex computational systems, and virtualization are described. Containers and containers supported by virtualization layers are described in a second subsection. Methods and systems to reclaim capacity of unused resources of a distributed computing system are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, containers, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
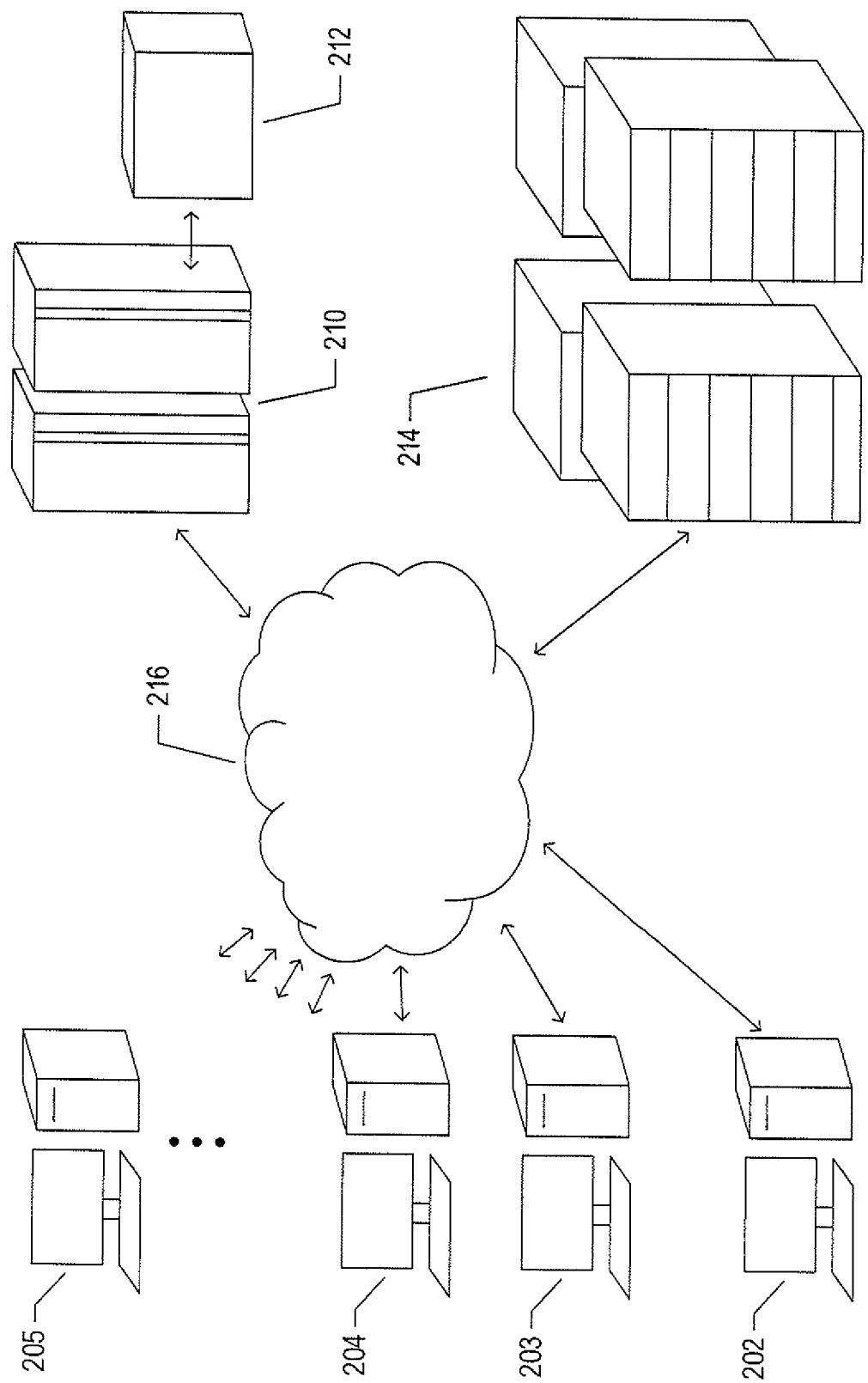
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
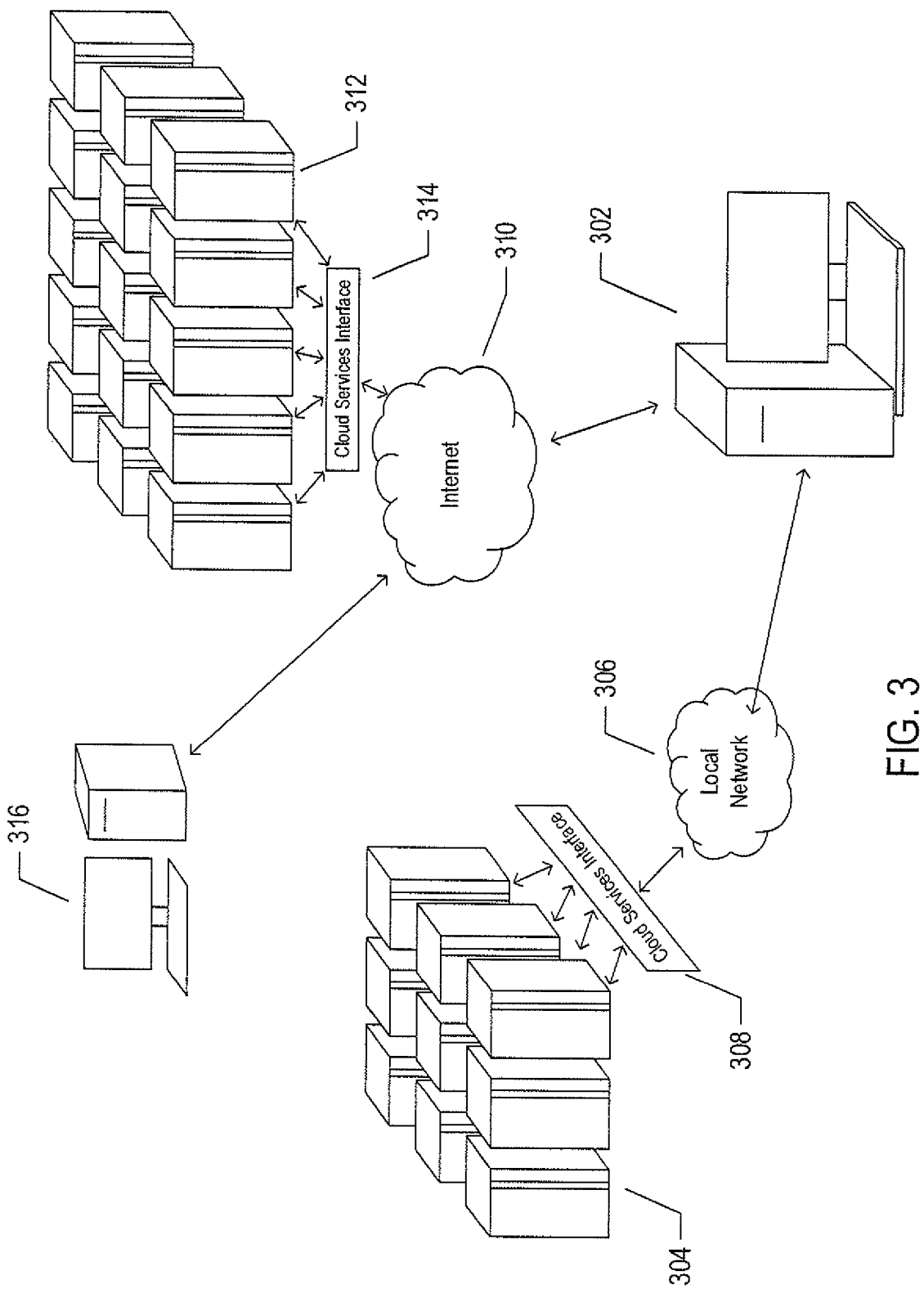
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
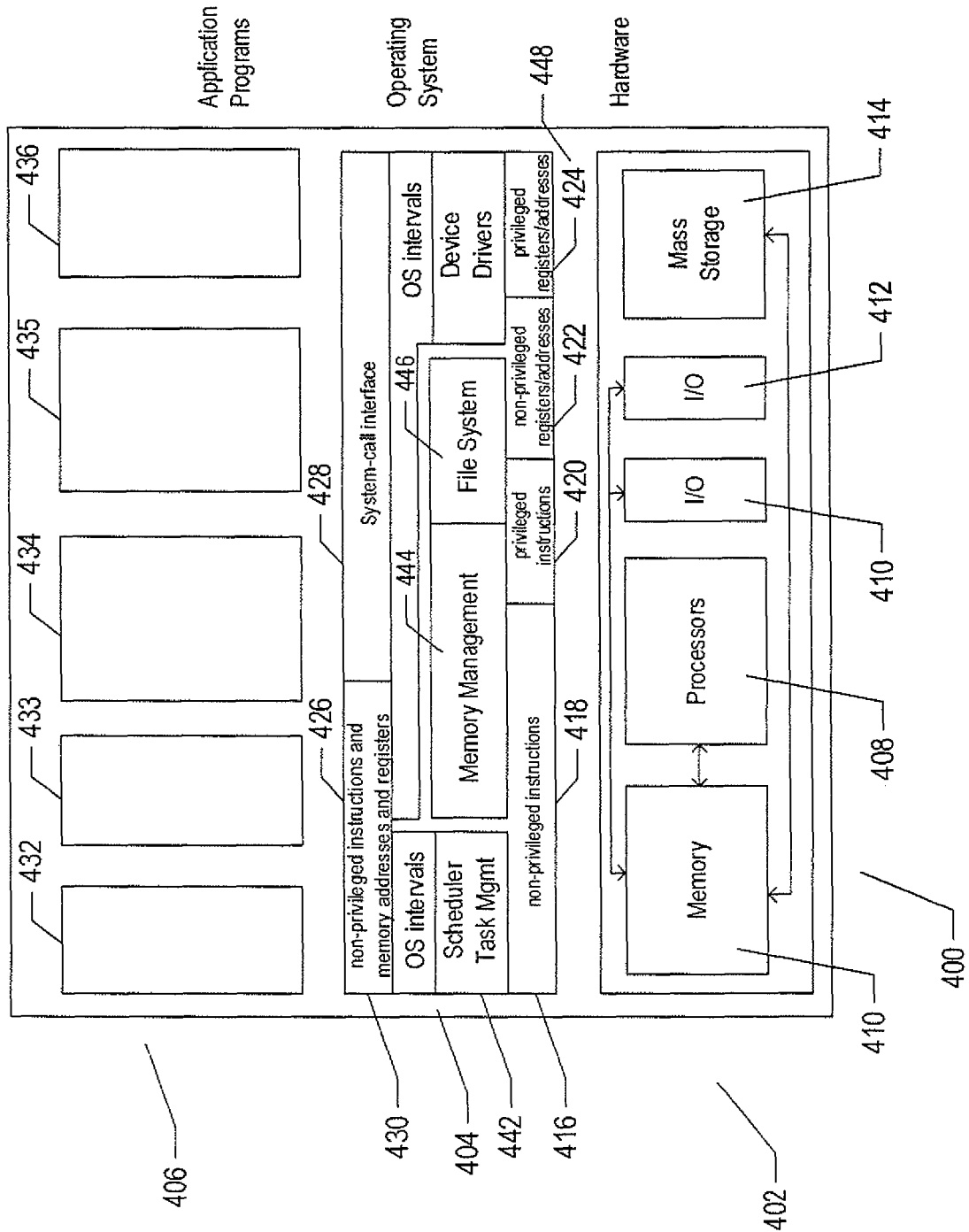
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
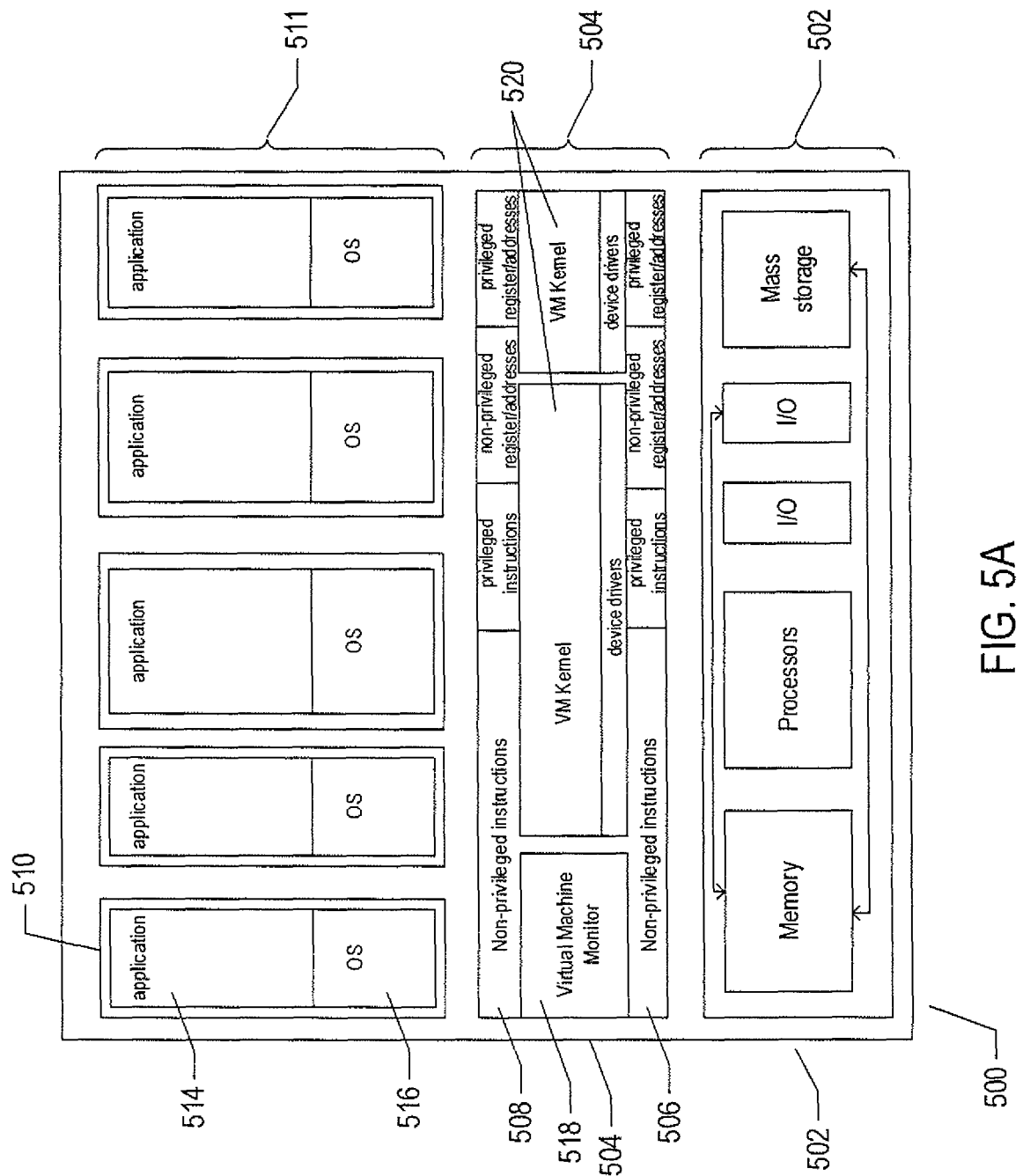
FIGS. 5A-5B show two types of virtual machine ("VM") and VM execution environments.
Figure 5B:
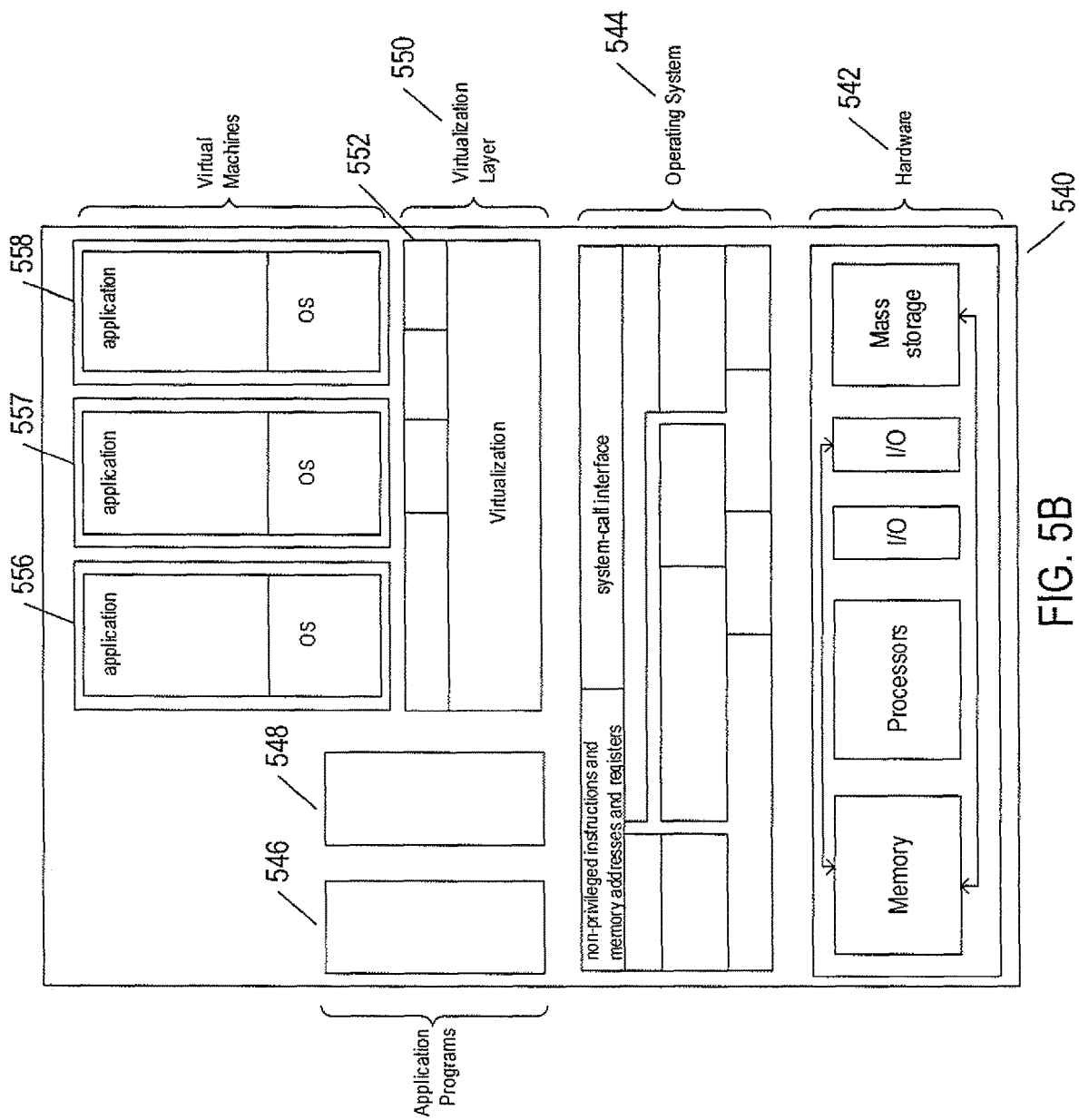

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
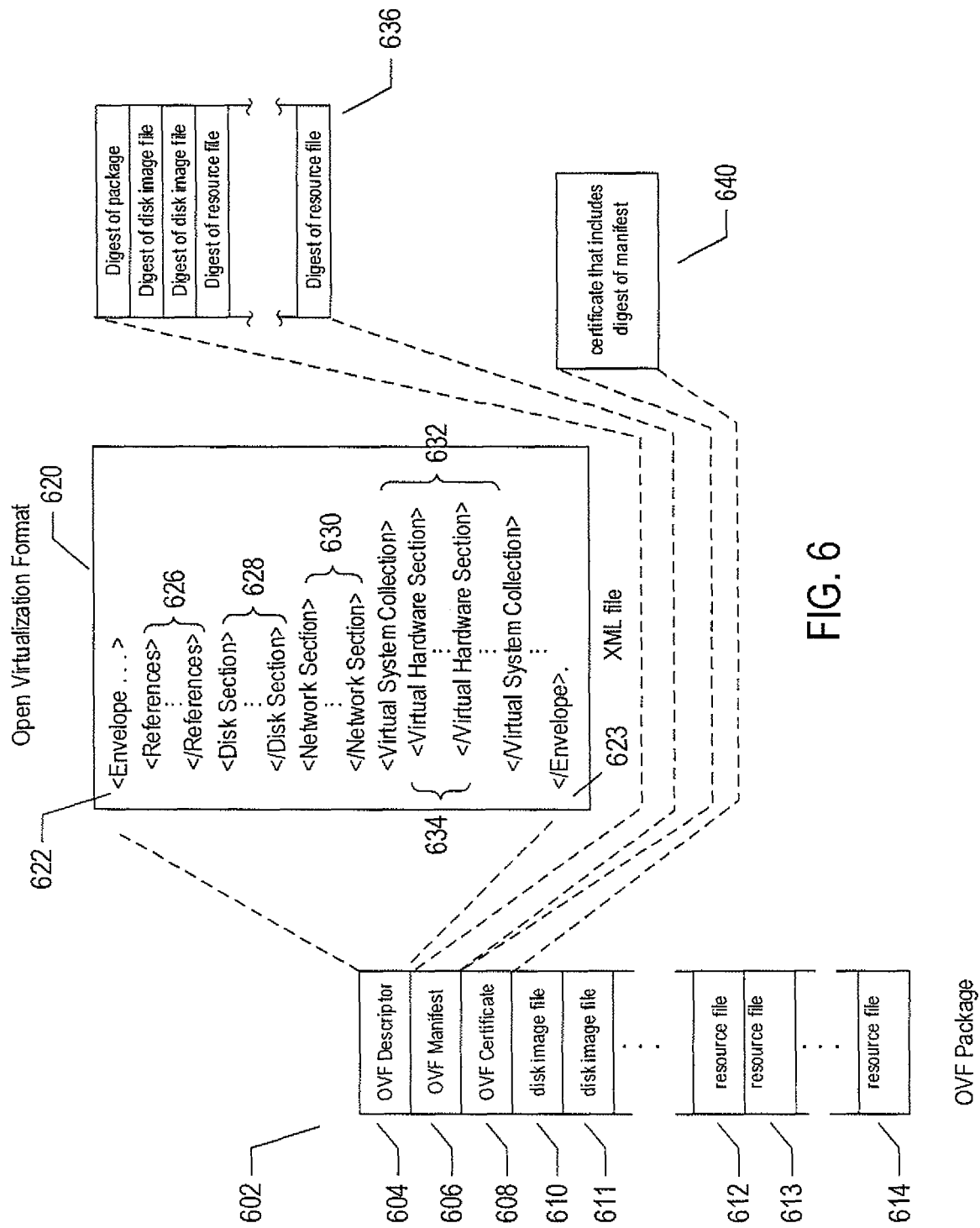
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hashfunction-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
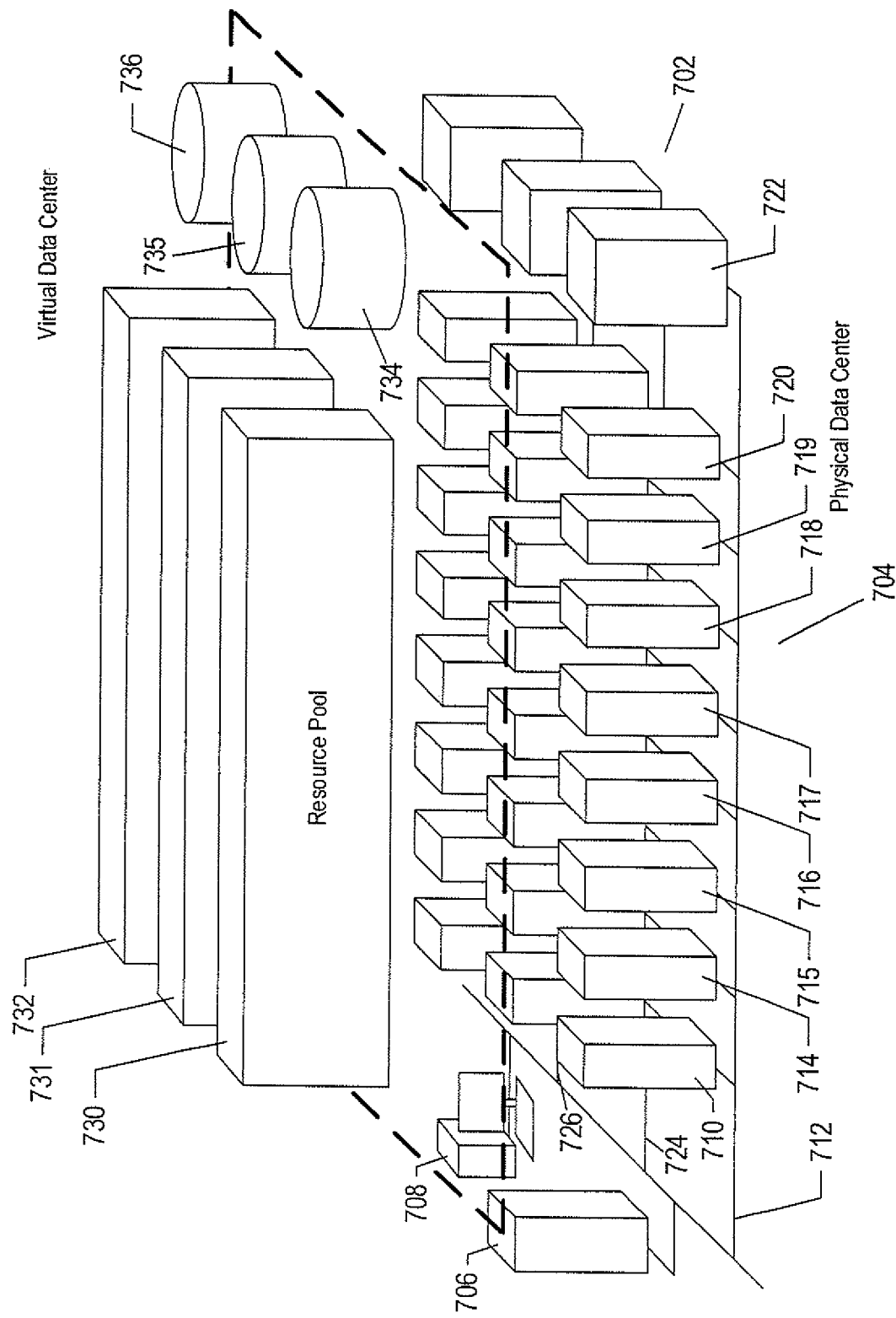
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
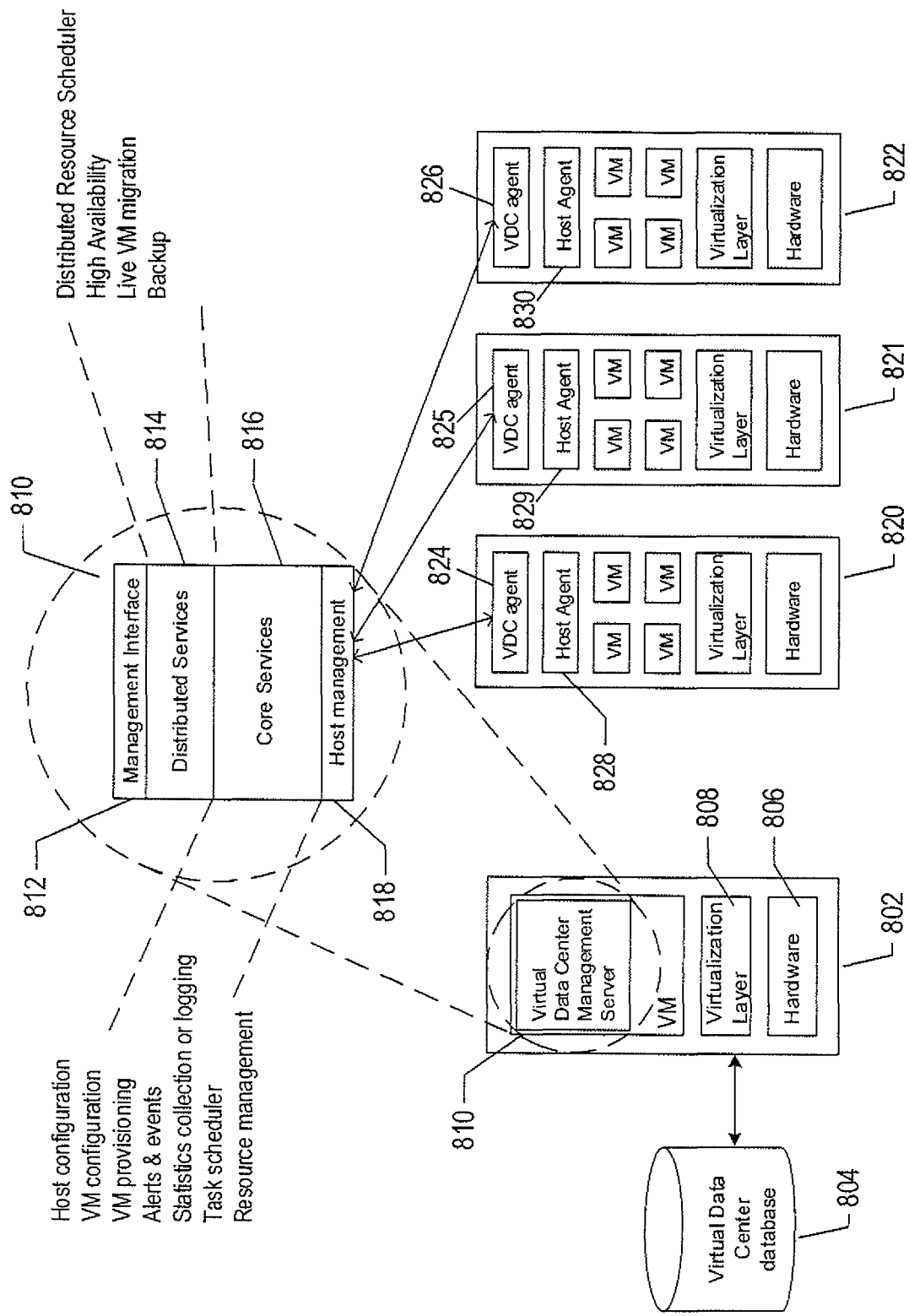
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each of the physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
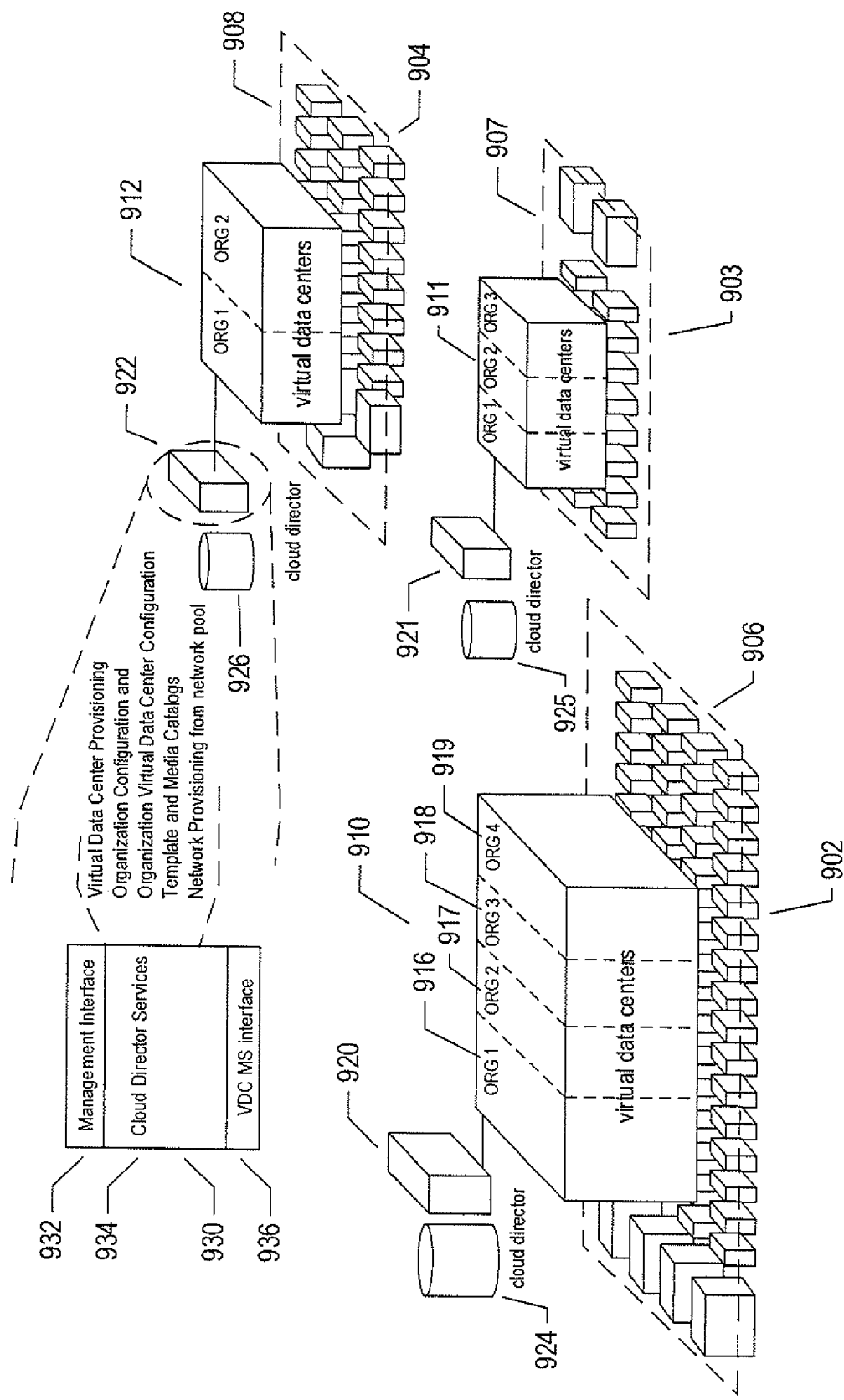
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
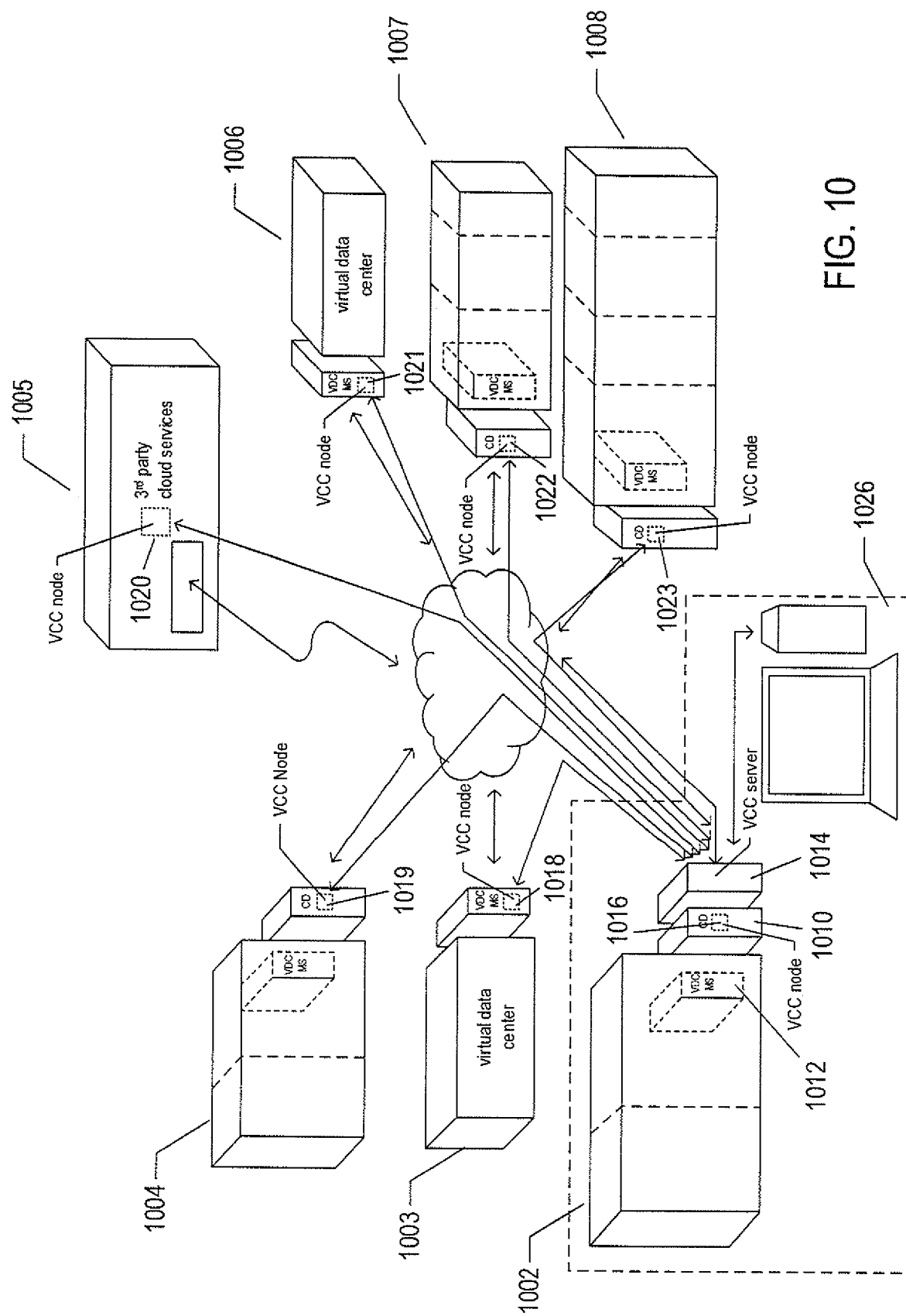
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by
Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
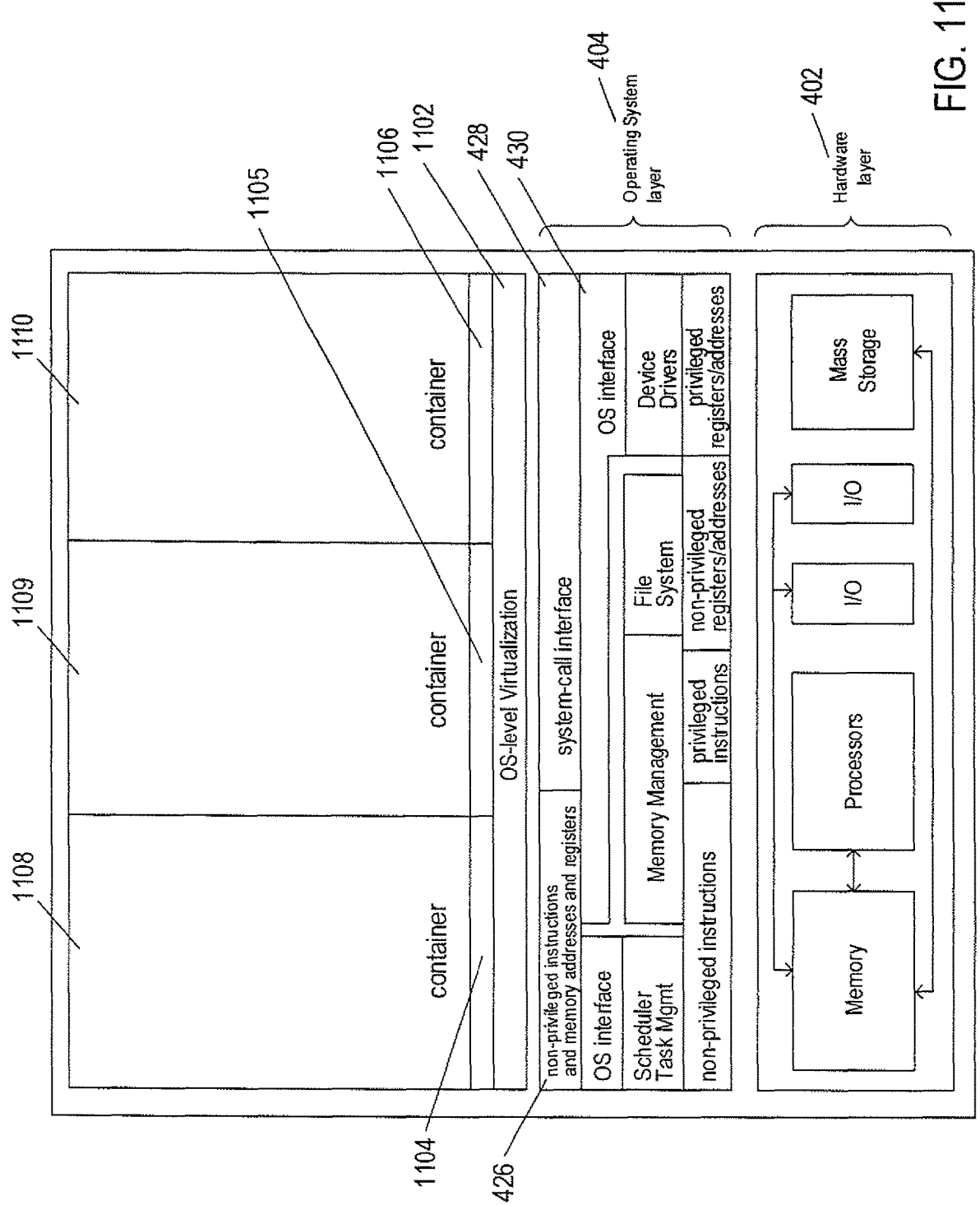
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
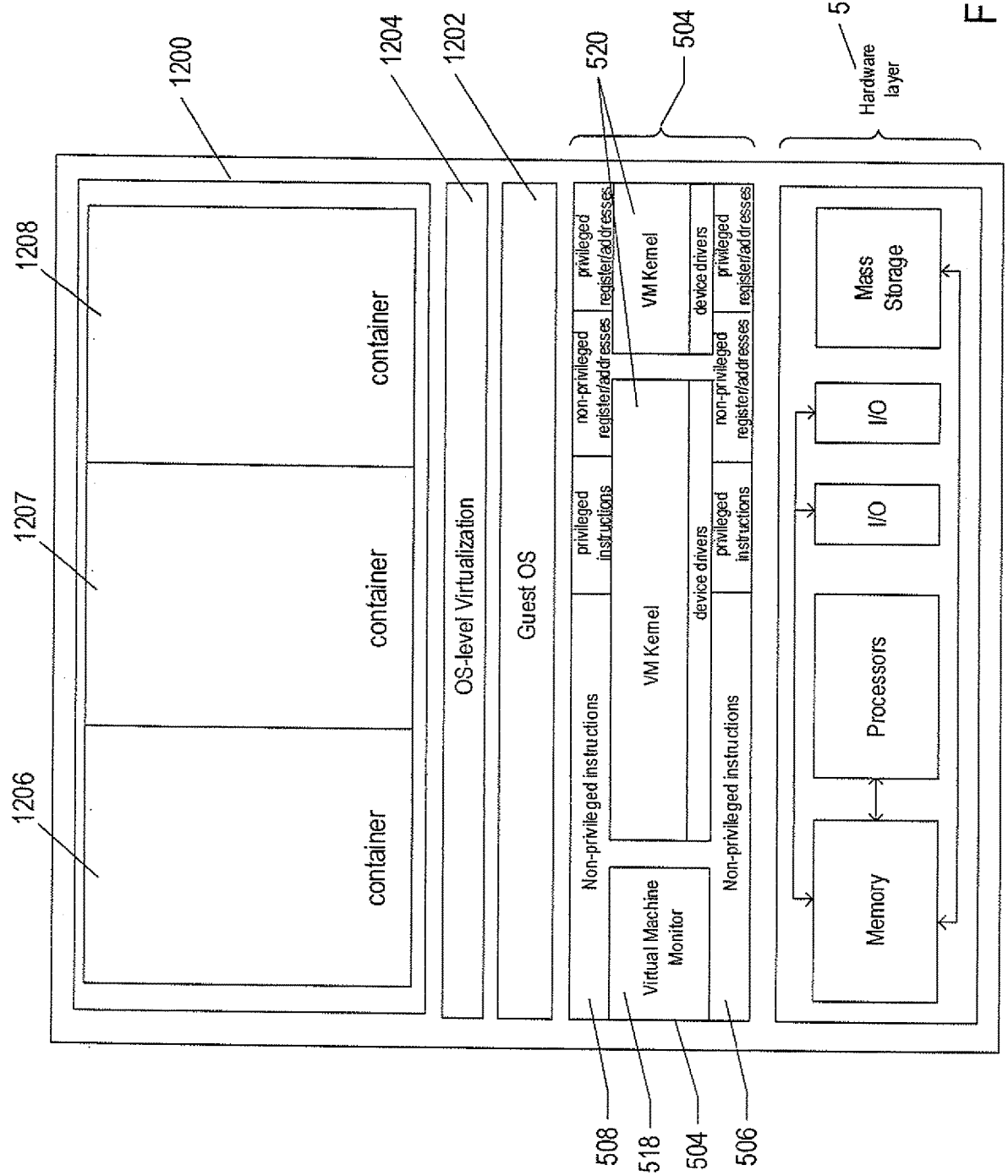
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
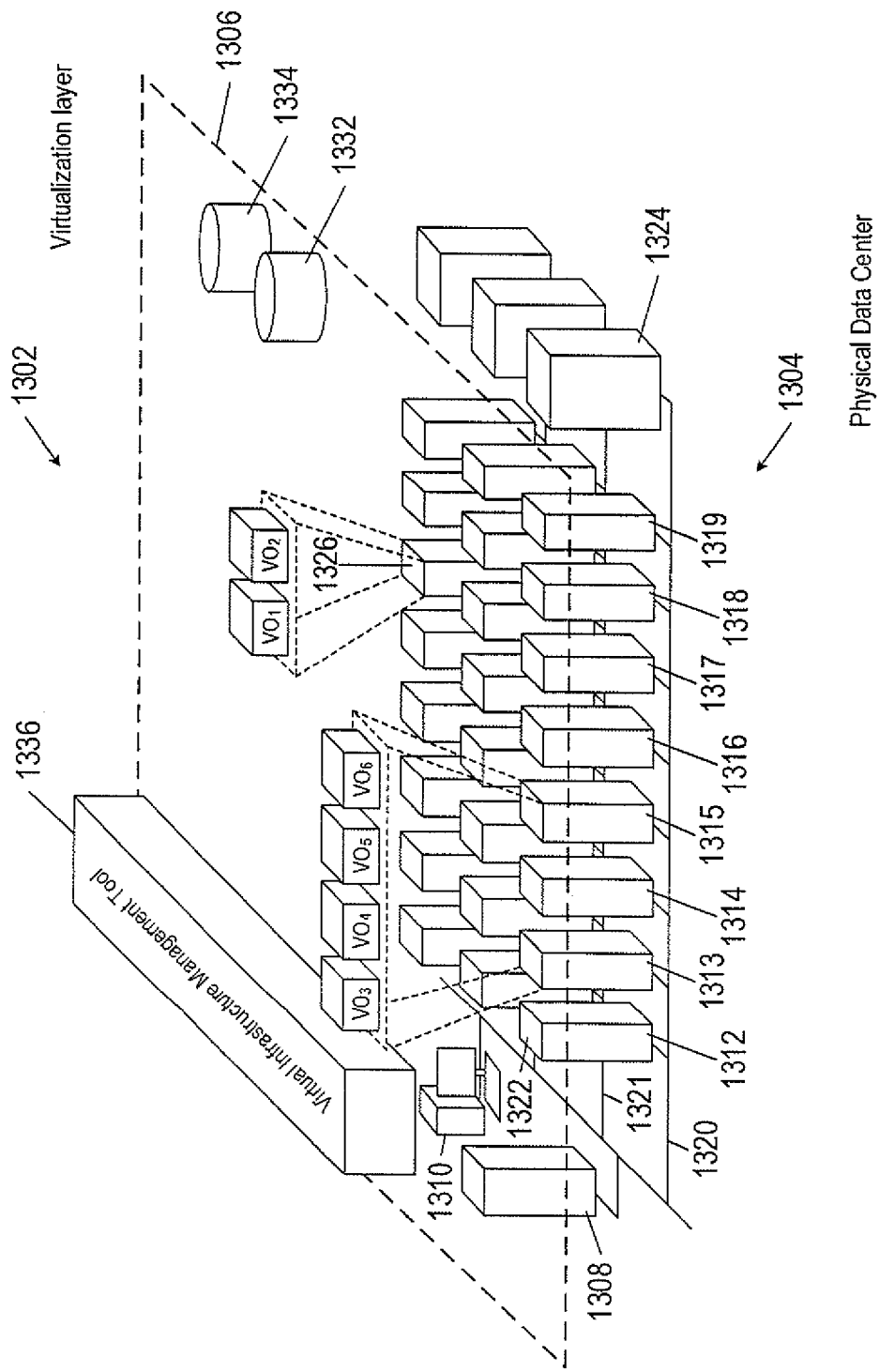
FIG. 13 shows an example of a virtualization layer located above a physical data center.

Methods and Systems to Reclaim Capacity of Unused Resources of a Distributed Computing System FIG. 13 shows an example of a virtualization layer 1302 located above a physical data center 1304. The virtualization layer 1302 is separated from the physical data center 1304 by a virtual-interface plane 1306. The physical data center 1304 comprises a management server computer 1308 and any of various computers, such as PC 1310, on which a virtual-data-center management interface may be displayed to system administrators and other users. The physical data center 1304 additionally includes many server computers, such as server computers 1312-1319, that are coupled together by local area networks 1320-1322. In the example of FIG. 13, each local area network directly interconnects a bank of eight server computers and a mass-storage array. For example, local area network 1320 directly interconnects server computers 1312-1319 and a mass-storage array 1324. Different physical data centers may be composed of many different types of computers, networks, data-storage systems and devices connected according to many different types of connection topologies. In the example of FIG. 13, the virtualization layer 1302 includes six virtual objects denoted by VO$_1$, VO$_2$, VO$_3$, VO$_4$, VO$_5$, and VO$_6$. A virtual object can be an application, a VM, or a container. The virtual objects VO$_1$ and VO$_2$ are hosted by a server computer 1326. The virtual objects VO$_3$, VO$_4$, VO$_5$, and VO$_6$ are hosted by a cluster of server computers 1313-1315. The virtualization layer 1302 includes virtual data stores 1332 and 1334 that provide virtual storage for the virtual objects. FIG. 13 also shows a virtual infrastructure management tool ("VIMT") 1336 abstracted to the virtualization layer 1302. The VIMT 1336 is hosted by the management server computer 1308. The VIMT 1336 includes an information technology ("IT") operations management server, such as VMware's vRealize® Operations™.

In the following discussion, the term "resource" means an actual physical resource of a distributed computing system, such as a multicore processor, a core, memory, disk drive, network adapter, or a storage appliance. Resources of a server computer and clusters of server computers form a resource pool for creating virtual resources of a virtual infrastructure used to run virtual objects. The term "virtual resource" refers to a portion of a resource assigned to a virtual object. For example, a virtual resource may be one or more cores of a multicore processor, a portion of memory, or a sector of a disk drive for use by a virtual object. Each virtual object uses only the resources of the resource pool assigned to the virtual object.

Figure 14A:
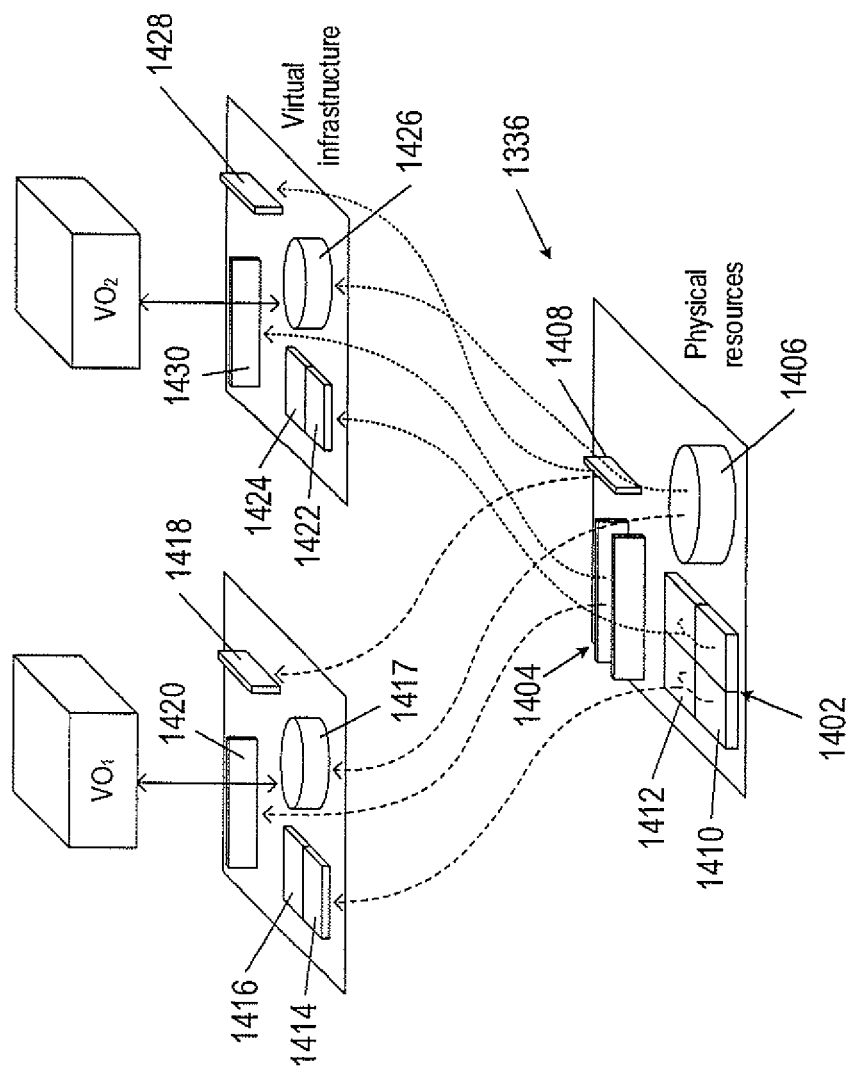
FIG. 14A shows an example of a virtual infrastructure formed from resources of a server computer used to run two virtual objects.

FIG. 14A shows an example of a virtual infrastructure formed from resources of the server computer 1336 used to run the two virtual objects VO$_1$ and VO$_2$ shown in FIG. 13. In this example, the resources of the server computer 1336 include a quad core processor 1402 with four independent processor cores, memory 1404, disk drive 1406, and a network adaptor 1408. The resources of the server computer 1336 are a resource pool that is partitioned to form a virtual infrastructure used to run the virtual objects VO$_1$ and VO$_2$. For example, two cores 1410 and 1412 of the quad core processor 1402 correspond to two virtual processors 1414 and 1416 assigned to the virtual object VO$_1$. Virtual storage 1417 comprises a portion of the disk drive 1406 assigned to the virtual object VO$_1$. The network adaptor 1408 serves as a virtual adaptor 1418 that provides communication between the virtual objects VO$_1$ and VO$_2$, between the virtual object VO$_1$ and other virtual objects on different hosts, and between the virtual object VO$_1$ and physical machines of the distributed computer system. Virtual memory 1420 comprises a portion of the memory 1404 assigned to the virtual object VO$_1$. In a similar manner, virtual processors 1422 and 1424, virtual storage 1426, virtual network adaptor 1428, and virtual memory 1430 are assigned to the virtual object VO$_2$ from the resources of the server computer 1336. The virtual processors 1414, 1416, 1422, and 1424, virtual storage 1417 and 1426, virtual network adaptors 1418 and 1428, and virtual memories 1420 and 1428 are virtual resources of a virtual infrastructure created from the resources of the server computer 1336.

A resource pool is not limited to the resources of a single server computer. A resource pool may be composed of the resources of a cluster of server computers that in turn are partitioned to from a virtual infrastructure used to run multiple virtual objects.

Figure 14B:
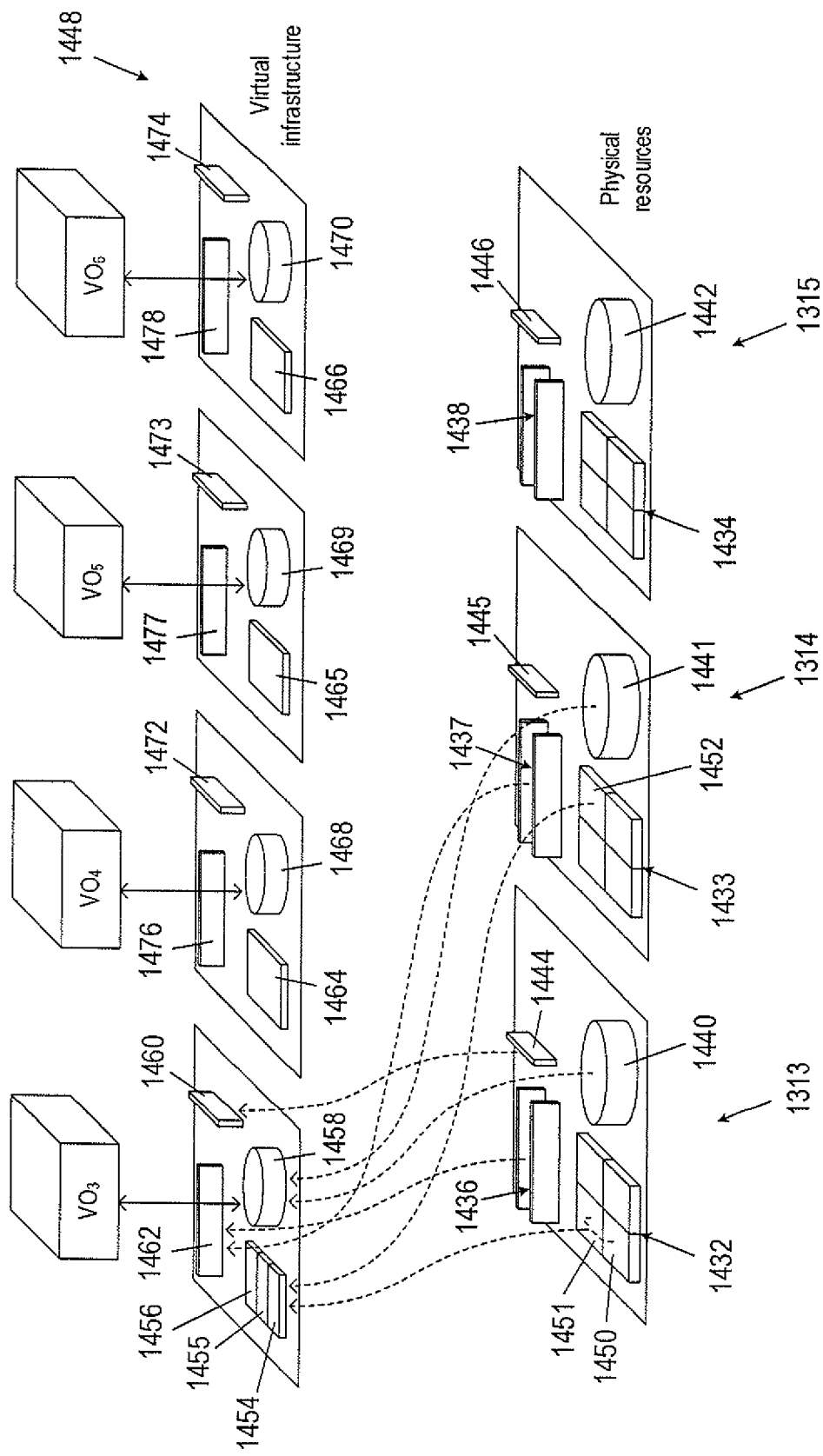
FIG. 14B shows an example of a virtual infrastructure formed from resources of a cluster of server computers used to run four virtual objects.

FIG. 14B shows an example of a virtual infrastructure formed from resources of the cluster of server computers 1313-1315 used to run the four virtual objects VO$_3$, VO$_4$, VO$_5$, and VO$_6$ shown in FIG. 13. In this example, the resources of the cluster of server computers 1313-1315 include quad core processors 1432-1434, memories 1436-1438, disk drives 1440-1442, and network adaptors 1444-1446. The resources of the cluster of server computers 1313-1315 are a resource pool partitioned to form a virtual infrastructure 1448 to run the virtual objects VO$_3$, VO$_4$, VO$_5$, and VO$_6$. For example, two cores 1450 and 1451 of the processor 1432 and core 1452 of the processor 1433 are three virtual processors 1454-1456 assigned to the virtual object VO$_3$. Virtual storage 1458 comprises a portion of the physical disk drives 1440 and 1441 assigned to the virtual object VO$_3$. The network adaptor 1444 serves as a virtual network adaptor 1460 that provides communication between the virtual object VO$_3$ and the virtual objects VO$_4$, VO$_5$, and VO$_6$ and between the virtual object VO$_3$ and server computers and devices of the distributed computer system. Virtual memory 1462 comprises a portion of the memory 1436 and memory 1437 assigned to the virtual object VO$_3$. In a similar manner, the resources of the server computers 1313-1315 are used to create the virtual processors 1464-1466, virtual storage 1468-1470, virtual network adaptors 1472-1474, and virtual memories 1476-1478 of the virtual infrastructure 1448 are assigned to the virtual objects VO$_4$, VO$_5$, and VO$_6$.

Workloads of virtual objects often vary with time, leading to wasted resources and unnecessary costs to tenants. For example, a tenant of a distributed computing system may have created numerous additional VMs to meet a temporary increase in demand for services provided by the tenant. But when the demand has returned to normal the tenant may have forgotten to delete the additional VMs, in which case the VMs become idle. Alternatively, the tenant may have powered off the additional virtual objects believing the additional VMs will be needed in the near future. In the following discussion, idle or powered off virtual objects are called "inactive virtual objects." The resources allocated to inactive virtual objects are wasted, because these resources cannot be utilized by other virtual objects while the resources remain assigned to the inactive virtual objects. The cloud computing service provider is not able to maximize resource usage and the tenant may unknowingly continue to pay for use of resources that are assigned to the inactive virtual objects.

The VIMT 1336 manages virtual resources of a virtual infrastructure formed from resources that are assigned to the virtual objects. The VIMT 1336 monitors usage of virtual resources in the virtual infrastructure based on streams of time series metric data, also called "streams of metric data" or "metric data streams," sent to the VIMT 1336 from operating systems, guest operating systems, and other metric data sources running on the server computers, computer systems, network devices, and mass-storage devices. As described below, the VIMT 1336 manages virtual resources of a virtual infrastructure by forecasting usage of virtual resources by virtual objects, identifying virtual objects that are expected to be inactive in the future based on the forecasted usage of virtual resources, and reclaiming the virtual resources assigned to the prospective inactive virtual objects for use by active virtual objects.

Figure 15:
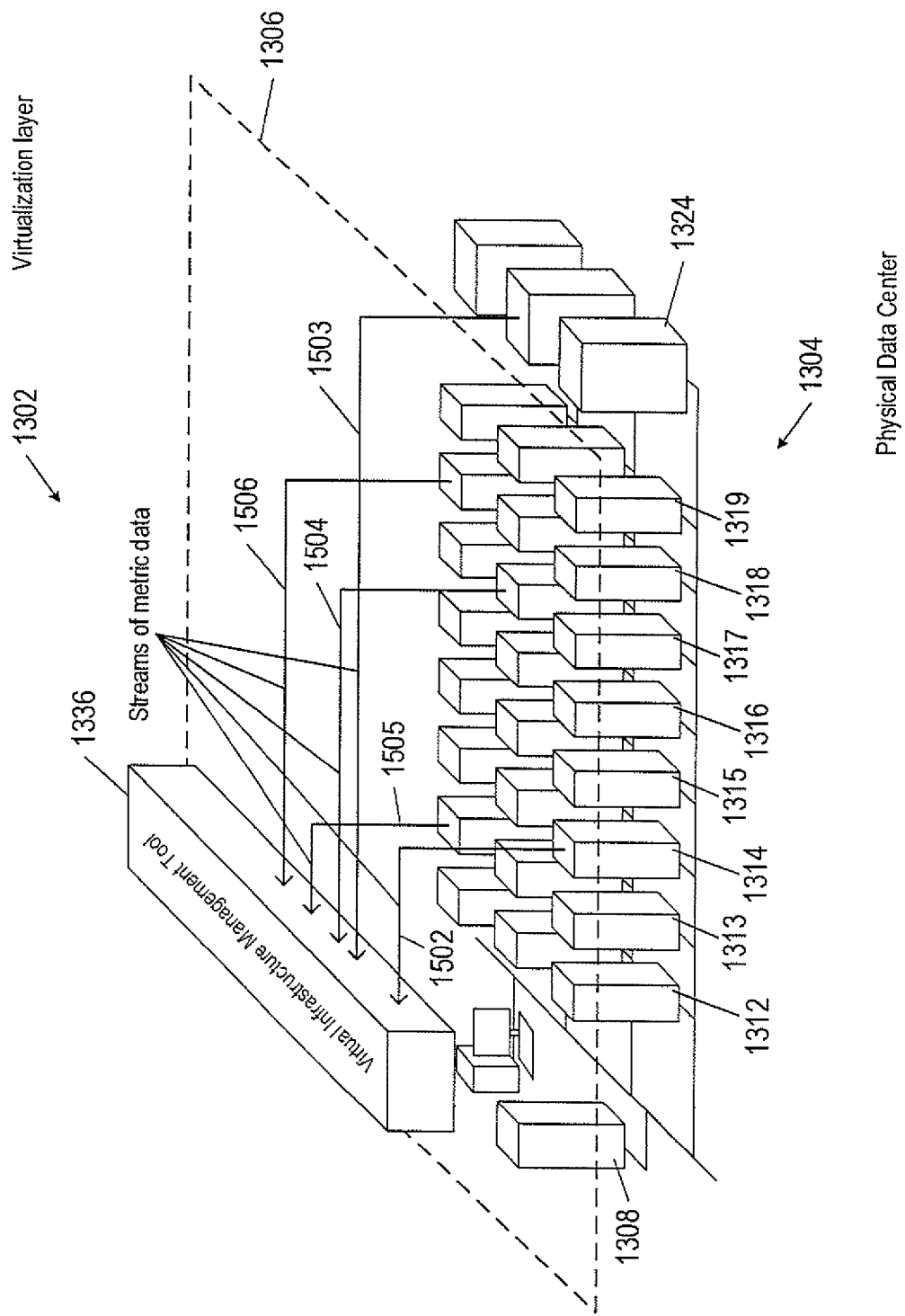
FIG. 15 shows a virtual infrastructure management tool receiving streams of metric data.

FIG. 15 shows the VIMT 1336 receiving streams of metric data represented by directional arrows 1502-1506. The streams of metric data include core usage, memory usage, network throughput, network traffic, amount of storage in use, hard drive active time, and hard disk transfer rate. Core usage is a measure of processor time used to process instructions of an application program or operating system as a percentage of core capacity. Amount of memory is the amount of memory (e.g., GBs) a computer system or other device uses at a given time. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. Clusters of server computers may also send collective metric data to the VIMT 1336. For example, a cluster of server computers 1312-1319 sends streams of cluster metric data, such as total processor usage, total amount of memory usage, total network throughput, total network traffic, disk active time, hard disk transfer rate to the VIMT 1336.

Figure 16A:
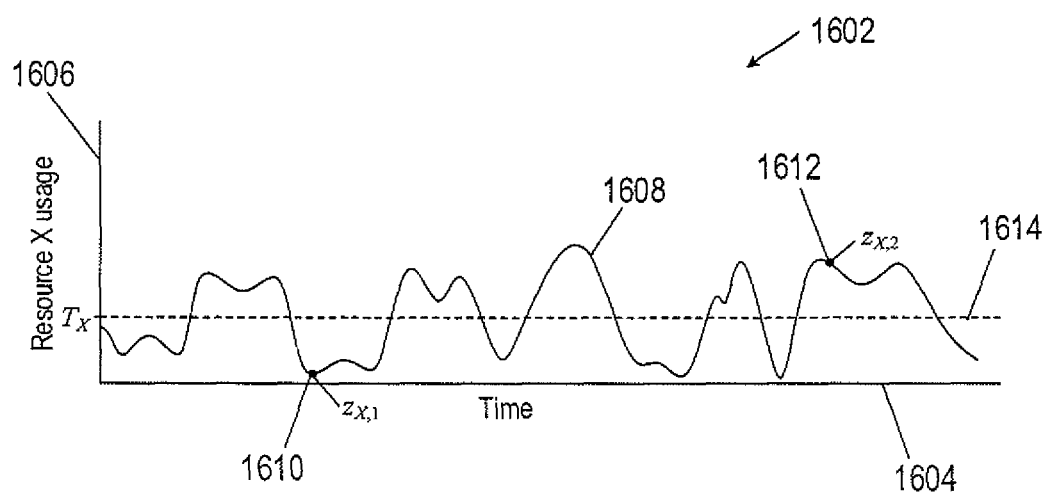
FIG. 16A-16B shows plots of three streams of metric data for three virtual resources and a sequence of active status metric data for a virtual object.

FIG. 16A shows a plot 1602 of a stream of metric data for a type of resource X The resource X can be a processor, processor core, memory, disk transfer rate, disk storage, or network throughput. Horizontal axis 1604 is a time axis that represent a time interval. Vertical axis 1606 represents usage of the resource X. Curve 1608 represents resource usage over the time interval. Although the stream of metric data is represented by continuous curve, the stream of metric data comprises a sequence of discrete metric data values at each time stamp recorded in a data-storage device. For example, metric data points 1610 and 1612 represent metric data points denoted by $z_{X,1}$ and $z_{X,2}$ at corresponding time stamps $t_1$ and $t_2$. Each metric data point may represent usage of the resource X at a point in time. Alternatively, each metric data point may represent cumulative usage of the resource X over time periods and each time stamp denotes the time period. Each time stamp denotes the beginning or ending of the time period. For example, if the resource X is a processor and the time period is an hour, then each metric data point represents cumulative usage of the resource X in one hour time periods. If the period of time is a day, then each metric data point represents cumulative usage of the resource X in one day time periods.

Each stream of metric data of a resource may be compared with a corresponding activity threshold to determine if the resource is active. In FIG. 16A, horizontal dashed line 1614 represents an activity threshold $T_X$ for the resource. When the following condition is satisfied $$z_{X,k} < T_X \quad (1)$$

the resource is considered inactive at the time stamp $t_k$. Otherwise, the resource is considered active. For example, metric data point $z_{X,1}$ indicates the resource is inactive at the time stamp $t_1$ and the metric data point $z_{X,2}$ indicates the resource is active at the time stamp $t_2$.

In an alternative implementation, streams of metric data may also be sent from the virtual objects and clusters of virtual objects to the VIMT 1336. The streams of metric data may represent usage of virtual resources by virtual objects, such as virtual processor usage, virtual memory usage, virtual network throughput, virtual network traffic, virtual amount of storage in use, virtual storage active time, and virtual storage transfer rate. The metric data points in a stream of metric data of a virtual resource of a virtual infrastructure created to run a virtual object may be computed as a sum of the metric data points of the resources assigned to the virtual object:

$$z_{vX,k} = \sum_{i=1}^{PR} z_{X_i,k} \quad (2)$$

where
the subscript vX represents a virtual resource;
$z_{vX,k}$ is a metric data point in a stream of metric data of a virtual resource at a time stamp $t_k$;

$z_{X_i,k}$ is a metric data point in a stream of metric data of an i-th resource at the time stamp $t_k$; and
PR is the number of type X resources assigned to the virtual object.

Each metric data point $z_{vX,k}$ may represent usage of the virtual resource vX at a point in time. Alternatively, each metric data point $z_{vX,k}$ may represent cumulative usage of the virtual resource vX over time periods and each time stamp denotes the time period. Each time stamp denotes the beginning or ending of the time period. For example, if the virtual resource vX is a processor and the time period is an hour, then each metric data point represents cumulative usage of the virtual resource vX in one hour time periods. If the time period is a day, then each metric data point represents cumulative usage of the virtual resource vX in one day time periods.

Each stream of metric data associated with a virtual object has an associated virtual resource threshold denoted by $T_{vX}$ that may be used to determine whether the corresponding virtual resource assigned to the virtual object is active or inactive. When the following condition is satisfied $$z_{vX,k} < T_{vX} \quad (3)$$

the virtual resource vX is considered inactive at the time stamp $t_k$. Otherwise, the virtual resource vX is considered active. A set of virtual resources can be used to determine whether a virtual object is inactive (i.e., idle or powered off). Let $z_k$ be a metric data point that represents active status of a virtual object at the time stamp $t_k$. The active status value at each time stamp may be expressed as a binary number. For example, the active status at a time stamp may be determined as follows:

$$z_k = \begin{cases} a & \text{if } z_{vX,k} \geq T_{vX} \text{ for at least one } vX \in v\Gamma \\ 0 & \text{if } z_{vX,k} < T_{vX} \text{ for all } vX \in v\Gamma \end{cases} \quad (4)$$

where
a is a non-zero real number; and
$v\Gamma$ is a set of virtual resources that define an inactive virtual object.

For example, the set of virtual resources, $v\Gamma$, used to define an inactive virtual object include, but are not limited to, virtual processor, virtual memory, virtual network, and virtual storage.

Figure 16B:
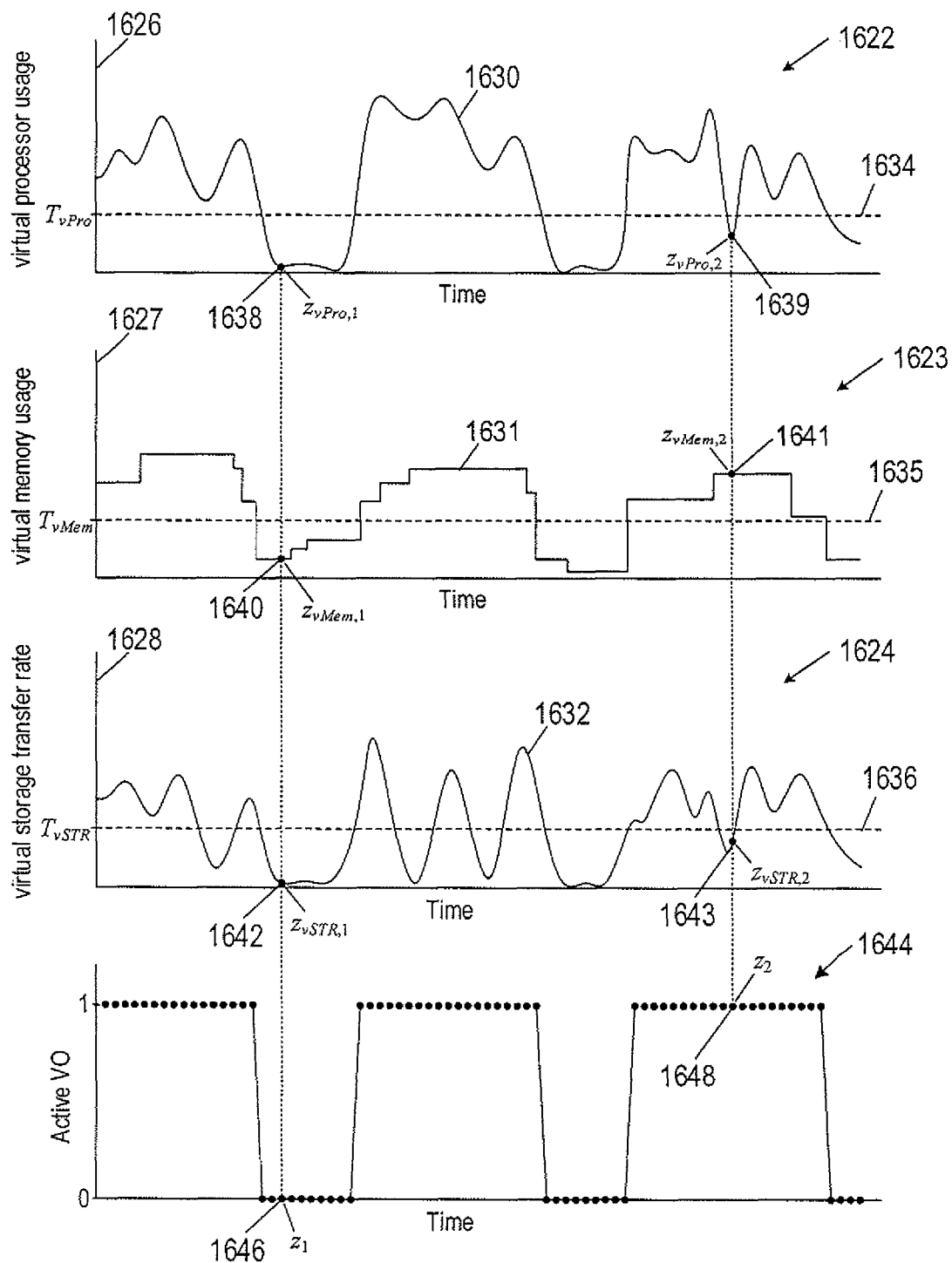

FIG. 16B shows plots 1622-1624 of three streams of metric data for three virtual resources of a virtual infrastructure used to run a virtual object. The virtual object can be an application, a VM, or a container. In plots 1622-1624, horizontal axes are time axes that represent the same time interval. Vertical axes 1626, 1627, and 1628 represent virtual processor usage, virtual memory usage, and virtual storage transfer rate. In plot 1622, curve 1630 represents virtual processor usage by the virtual object over the time interval. In plot 1623, curve 1631 represents virtual memory usage by the virtual object over the time interval. In plot 1624, curve 1632 represents virtual network throughput by the virtual object over the time interval. Horizontal dashed lines 1634-1636 represent virtual processor, virtual memory, and virtual storage transfer rate thresholds denoted by $T_{vPro}$, $T_{vMem}$, and $T_{vSTR}$, respectively. Although the streams of metric data are represented by continuous curves, each stream of metric data comprises a sequence of discrete metric data values at each time stamp recorded in a data-storage device. Each metric data point is computed according to Equation (2). For example, metric data points 1618 and 1639 of virtual processor usage 1630 represent metric data points denoted by $z_{vPro,1}$ and $z_{vPro,2}$ at corresponding time stamps $t_1$ and $t_2$. Metric data points 1640 and 1641 of virtual memory usage 1631 represent metric data points denoted by $z_{vMem,1}$ and $z_{vMem,2}$ at the same two time stamps. Metric data points 1642 and 1643 of virtual storage transfer rate 1632 represent metric data points denoted by $z_{vSTR,1}$ and $z_{vSTR,2}$ at the same two time stamps.

FIG. 16B also shows a plot 1644 of a sequence of active status metric data for the virtual object with virtual resource usages represented by the streams of metric data in plots 1642-1644. Each metric data point represents the active status of the virtual object at each time stamp in the time interval determined according to Equation (4) based on the virtual processor usage, virtual memory usage, and the virtual storage transfer rate. For example, according to Equation (4), because metric data points 1638, 1640, and 1642 are less than the corresponding virtual resource thresholds 1634, 1635, and 1636, the active status value at time stamp $t_1$ is $z_1=0$ as represented by point 1646. Point 1648 represents an active status value $z_2=1$ at time stamp $t_2$ because the corresponding virtual memory usage 1641 is greater than the memory threshold 1635.

In an alternative implementation, a set of resources assigned to a virtual object can be used to determine whether the virtual object is inactive (i.e., idle or powered off). Let $z_k$ be a metric data point that represents active status of a virtual object at the time stamp $t_k$. The active status value at each time stamp may be expressed as a binary number. For example, the active status at a time stamp may be determined as follows:

$$z_k = \begin{cases} a & \text{if } z_{X,k} \geq T_X \text{ for at least one } X \in \Gamma \\ 0 & \text{if } z_{X,k} < T_X \text{ for all } X \in \Gamma \end{cases} \quad (5)$$

where $\Gamma$ is a set of resources assigned to a virtual object. For example, the set of resources $\Gamma$ assigned to a virtual object may be processor cores, memory, network throughput, and storage.

It should be noted that the term time stamp $t_k$ is not limited to particular k-th point in time but may also represent a k-th period of time selected by a system administrator. For example, the metric data points $z_{X,k}$ and $z_{vX,k}$ may represent usage of the resource X and virtual resource vX in an hour, six hours, twelve hours, a full day, or two-day periods of time. In addition, the active status metric $z_k$ may represent active status of the resource for an hour, six hours, twelve hours, a full day, or two-day periods of times.

In one implementation, the VIMT 1336 identifies an inactive virtual object based on an associated sequence of active status metric data in a historical time interval. The capacity of the resources assigned to the inactive virtual object can be reclaimed. A system administrator may identify a historical time interval for determining whether a virtual object is inactive (i.e., idle or powered off). If data points in the sequence of active status metric data are zero over the historical time interval, then the virtual object is identified as inactive. An inactive virtual object may be migrated to a more cost effective virtual infrastructure or the virtual object may be deleted. In either case, the capacity of the resources of the virtual infrastructure assigned to the inactive virtual object are reclaimed and may be repurposed by assigning the resources for another virtual object or further partitioning the resources for use by the other virtual objects already running on the virtual infrastructure. On the other hand, if at least one active status value in the sequence of active status metric data is non-zero in the historical time interval, then the virtual object is identified as active, the virtual object is not disturbed, and the resources assigned to the virtual object are not reclaimed.

Figure 17A:
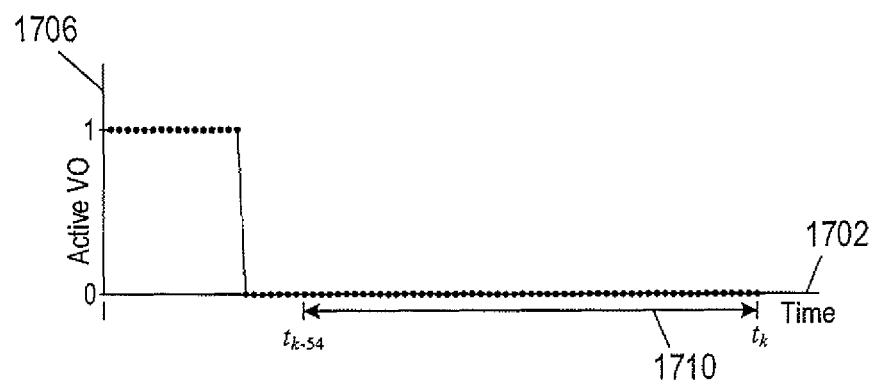
FIGS. 17A-17B show plots of active status streams of metric data for two virtual objects.
Figure 17B:
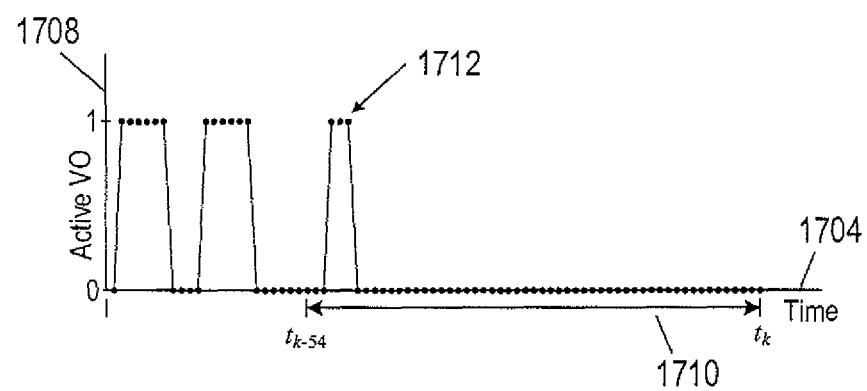

FIGS. 17A-17B show plots of active status streams of metric data for two virtual objects. In FIGS. 17A-17B, horizontal axes 1702 and 1704 represent time intervals. Vertical axes 1706 and 1708 represent active status ranges. Directional arrow 1710 represents a historical time interval that contains 55 active state data points between current time stamp $t_k$ and an oldest time stamp $t_{k-54}$ in the historical time window 1410. In FIG. 17A, a first virtual object is identified as inactive because none of the active status data points in the historical time window is non-zero. As a result, the first virtual object may be deleted and the virtual resources of the virtual infrastructure assigned to the virtual object can be reclaimed, assigned to another virtual object, or partitioned to run other virtual objects that are currently running on the virtual infrastructure. In FIG. 17B, a second virtual object is identified as active because three of the active status data points 1712 in the historical time window 1710 are non-zero. As a result, the second virtual object is not deleted and the virtual resources assigned to the second virtual object are not reclaimable.

In another implementation, the VIMT 1336 submit a forecast request to the analytics system 1900 described below with reference to FIG. 19 to proactively determine whether a virtual object is expected to be active or inactive in a forecast time interval. The analytics system 1900 generates forecasted active status metric data based on a historical sequence of active status metric data that is used by the VIMT 1336 to identify the virtual object as active or inactive over the forecast interval. A virtual object that is expected to be inactive over a forecast interval is called a "prospectively inactive virtual object," and a virtual object that is expected to be active over a forecast interval is called a "prospectively active virtual object." If the virtual object is a prospectively inactive virtual object, then the virtual object may be migrated to another server computer and run using a different virtual infrastructure when needed or the virtual object may be deleted to free up storage space occupied by the virtual object. In addition, virtual resources of the virtual infrastructure that are assigned to the prospectively inactive virtual object are reclaimed for use by active virtual objects or for new virtual objects that are expected to run on the virtual infrastructure. If, on the other hand, the virtual object is a prospectively active virtual object, the virtual object remains undisturbed and the virtual resources of the virtual infrastructure assigned to the virtual object are maintained.

A method for forecasting active status metric data points from a historical sequence of active status metric data over a forecast interval is described below with reference to FIGS. 19-35. The description of FIGS. 18A-18D introduces terminology regarding different types of streams of metric data that may be input to the analytics system 1900 to obtain forecasted metric data.

Figure 18A:
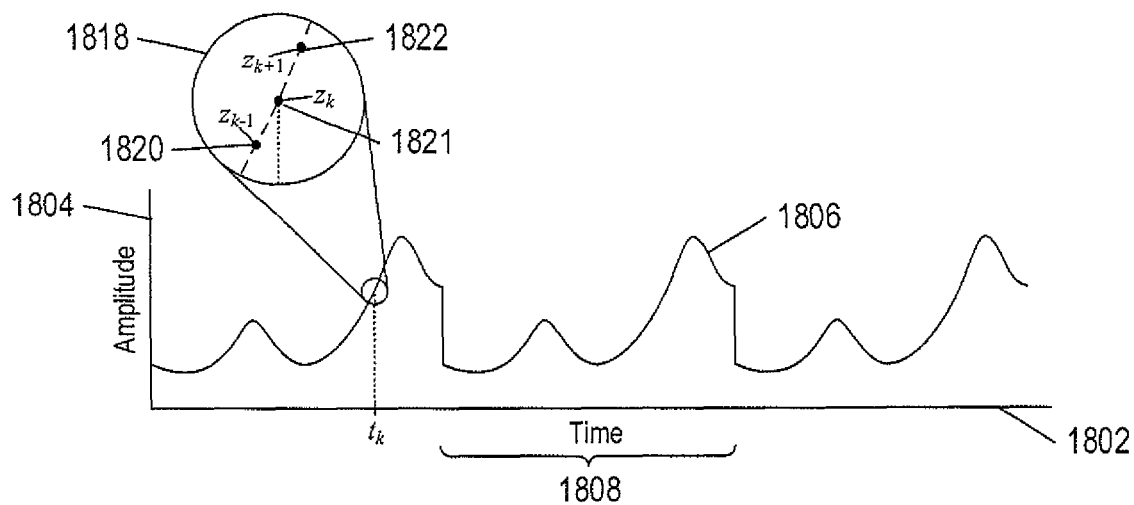
FIGS. 18A-18D show plots of four different example streams of metric data.
Figure 18B:
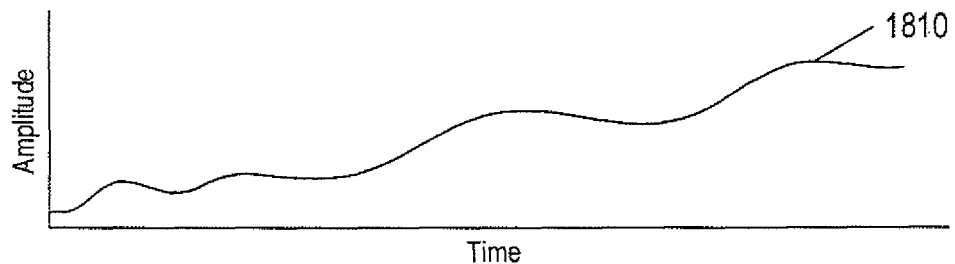
Figure 18C:
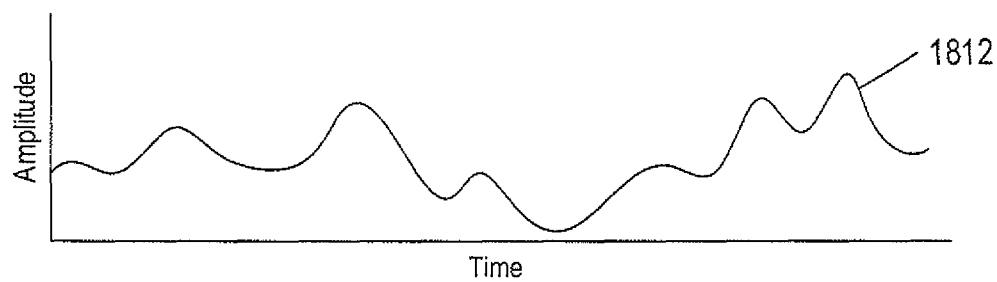
Figure 18D:
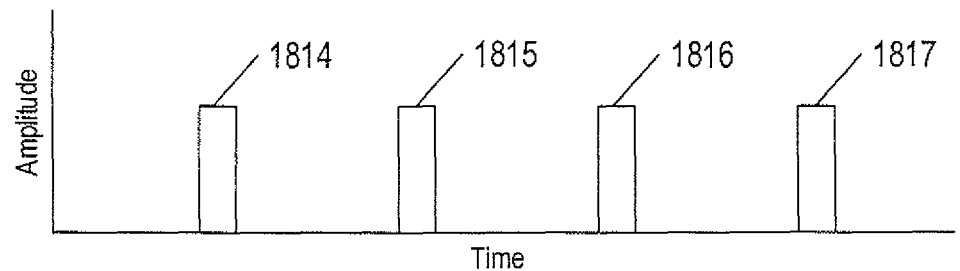

FIGS. 18A-18D show plots of four different example streams of metric data. Horizontal axes, such as axis 1802, represents time. Vertical axes, such as vertical axis 1804, represents a range of metric data amplitudes. In FIGS. 18A-18C, curves represent four examples of different patterns of metric data streams. For example, in FIG. 18A, curve 1806 represents a periodic stream of metric data in which the pattern of metric data in time interval 1808 is repeated. In FIG. 18B, curve 1810 represents a trendy stream of metric data in which the amplitude of the metric data generally increases with increasing time. In FIG. 18C, curve 1812 represents a non-trendy, non-periodic stream of metric data. In FIG. 18D, rectangles 1814-1817 represent pulse waves of a pulsed stream of metric data generated by a resource that is utilized periodically and only for the duration of each pulse. The example streams of time series metric data shown in FIGS. 18A-18D represent usage of different resources. For example, the metric data in FIG. 18A may represent CPU usage of a core in a multicore processor of a server computer over time. The metric data in FIG. 18B may represent the amount of virtual memory a VM uses over time. The metric data in FIG. 18C may represent network throughput for a cluster of server computers.

In FIGS. 18A-18D, the streams of metric data are represented by continuous curves. In practice, a stream of metric data comprises a sequence of discrete metric data values in which each numerical value is recorded in a data-storage device with a time stamp. FIG. 18A includes a magnified view 1818 of three consecutive metric data points represented by points. Points represent amplitudes of metric data points at corresponding time stamps. For example, points 1820-1822 represents consecutive metric data values (i.e., amplitudes) $z_{k-1}$, $z_k$, and $z_{k+1}$ recorded in a data-storage device at corresponding time stamps $t_{k-1}$, $t_k$, and $t_{k+1}$, where subscript k is an integer time index of the k-th metric data point in the stream of metric data.

Figure 19:
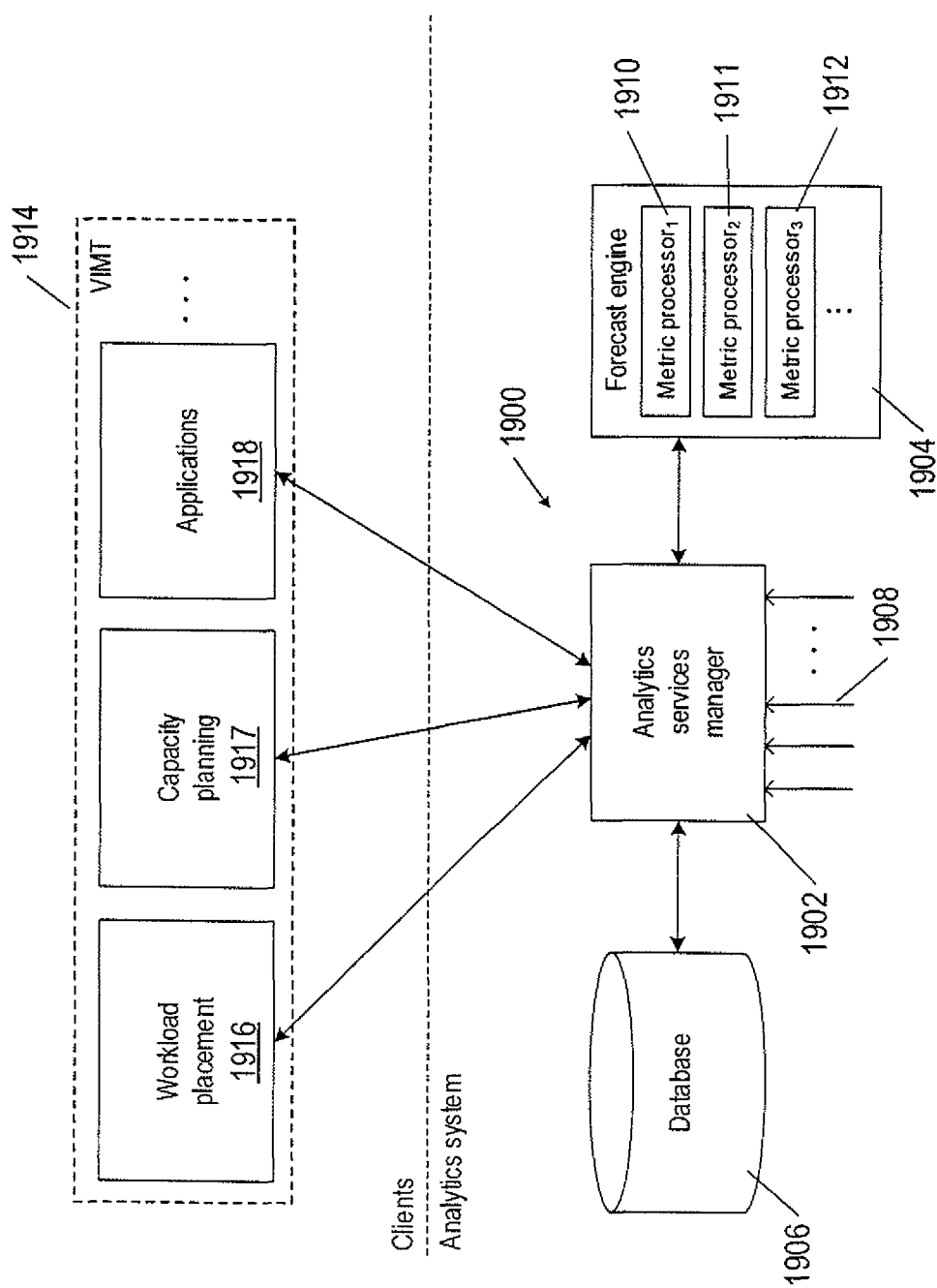
FIG. 19 shows an architecture of an example metric data analytics system that may be implemented as part of a management system.

FIG. 19 shows an architecture of an example metric data analytics system 1900. The analytics system 1900 comprises an analytics services manager 1902, a forecast engine 1904, and a metric data stream database 1906. The analytics services manager 1902 receives streams of metric data represented by directional arrows, such as directional arrow 1908. The forecast engine 1902 host a collection of metric processors, such as metric processors 1910-1912. The forecast engine 1904 provides a library of configurable models. The forecast engine 1904 includes an interface that enables a user to create one or more metric processors from the configurable models described below and assigns to each metric processor a single stream of metric data. Each metric processor is registered with a registration key that the analytical services manager 1902 uses to route a stream of metric data associate with a resource to a corresponding metric processor. Each stream of metric data is copied to the database 1906 to create a history for each resource. Each metric processor generates a forecast when the metric processor receives a forecast request sent by a user or when the metric processor receives a forecast request from the VIMT 1914. The VIMT 1914 includes a workload placement application 1916, a capacity planning application 1917, and other applications that use forecasted metric data. One or more of the streams of metric data received by the analytics services manager 1902 are sequences of active status metric data generated by the VIMT 1914. The VIMT 1914 may submit a request to the analytics services manager 1902 for forecasted active status metric data for a forecast interval to prospectively determine whether an associated virtual object is active or inactive. In the following discussion of FIGS. 20-35, the terms "stream of metric data," "metric data stream," "sequence of metric data," and "forecasted metric data" includes "stream of active status metric data," "active status metric data stream," "sequence of active status metric data," and "forecasted active status metric data."

Figure 20:
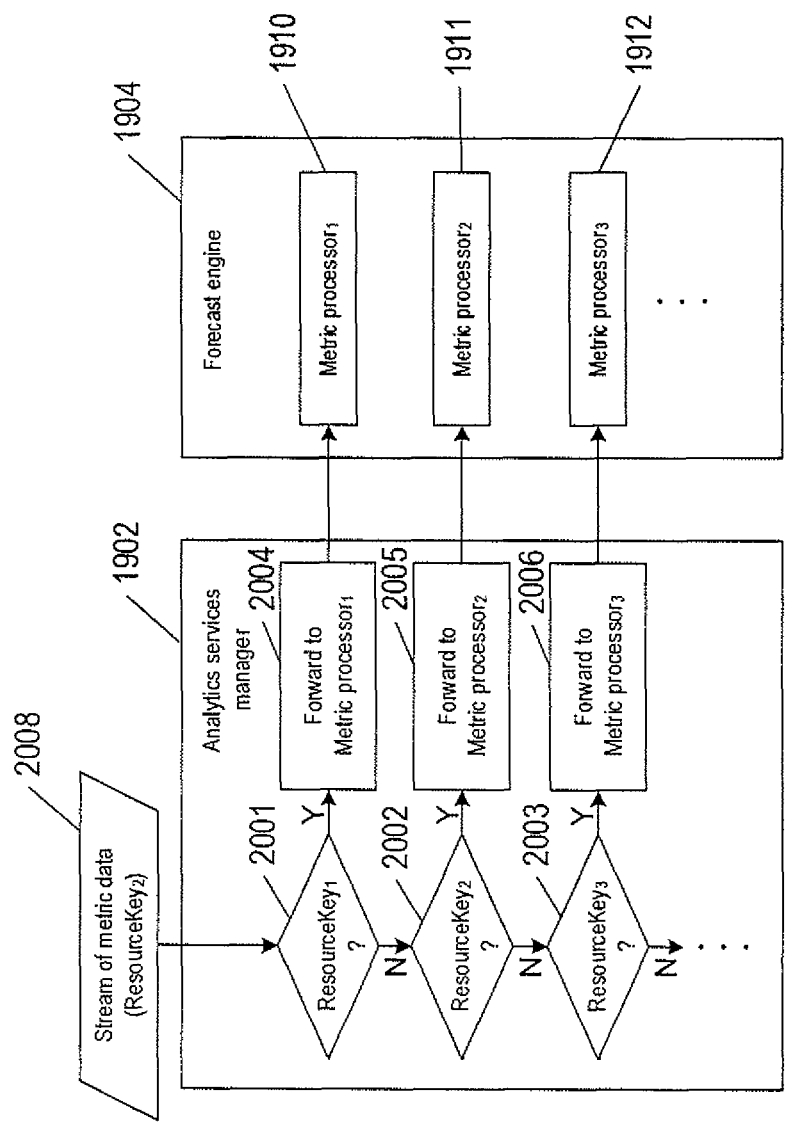
FIG. 20 shows an example implementation of the analytics services manager.

FIG. 20 shows an example implementation of the analytics services manager 1902. Each metric processor is registered with a resource key in the analytics services manager 1902. Each data point of a stream of metric data comprises a resource key, time stamp, and a metric data value. The analytics services manager 1902 utilizes the resource key to route the stream of metric data to the metric processor associated with the resource key. In the example of FIG. 20, a series of decision blocks 2001-2003 represent operations in which the resource key of each stream of metric data received by the analytics services manager 1902 is checked against the resource keys of registered metric processors. Blocks 2004-2006 represent forwarding operations that correspond to the decision blocks 2001-2003 in which a metric data stream with a resource key that matches one of the registered registration keys is forwarded to one of the corresponding metric processors 1910-1912 of the forecast engine 1904. For example, FIG. 20 shows an example stream of metric data 2008 with a resource key denoted by "ResourceKey$_2$," input to the analytics services manager 1902. The resource key is checked against the registered resource keys maintained by the analytics services manager 1902. Because the resource key "ResourceKey$_2$" matches the registered resource key represented by block 2002, control flows to block 2005 in which the stream of metric data is forwarded to corresponding metric processor 1911. The stream of metric data may also be copied to the database 1906.

The analytics services manager 1902 also manages the life cycle of each metric processor. The analytics service manager 1902 can tear down a metric processor when requested by a user and may reconstruct a metric processor when instructed by a user by resetting and replaying an historical stream of metric data stored in the database 1906.

Each metric processor updates and constructs models of metric data behavior based on a stream of metric data. The models are used to create metric data forecasts when a request for a forecast is made. As a result, each metric processor generates a real time metric data forecast in response to a forecast request. In order to generate a real time metric data forecast, each metric processors maintains the latest statistics on the corresponding stream of metric data, updates model parameters as metric data is received, and maintains a limited history of metric data. The duration of the sequence of metric data values comprising a limited history may vary, depending on the resource. For example, when the resource is a CPU or memory of single server computer, the limited history of metric comprise a sequence collected over an hour, day, or a week. On the other hand, when the resource is CPU usage or memory of an entire cluster of server computers that run a tenant's applications, the limited history of metric may comprise a sequence collected over days, weeks, or months. By updating the models, statistics, and maintaining only a limited history of the metric data, each metric processor utilizes a bounded memory footprint, a relatively small computational load, and computes a metric data forecast at low computational costs.

Figure 21:
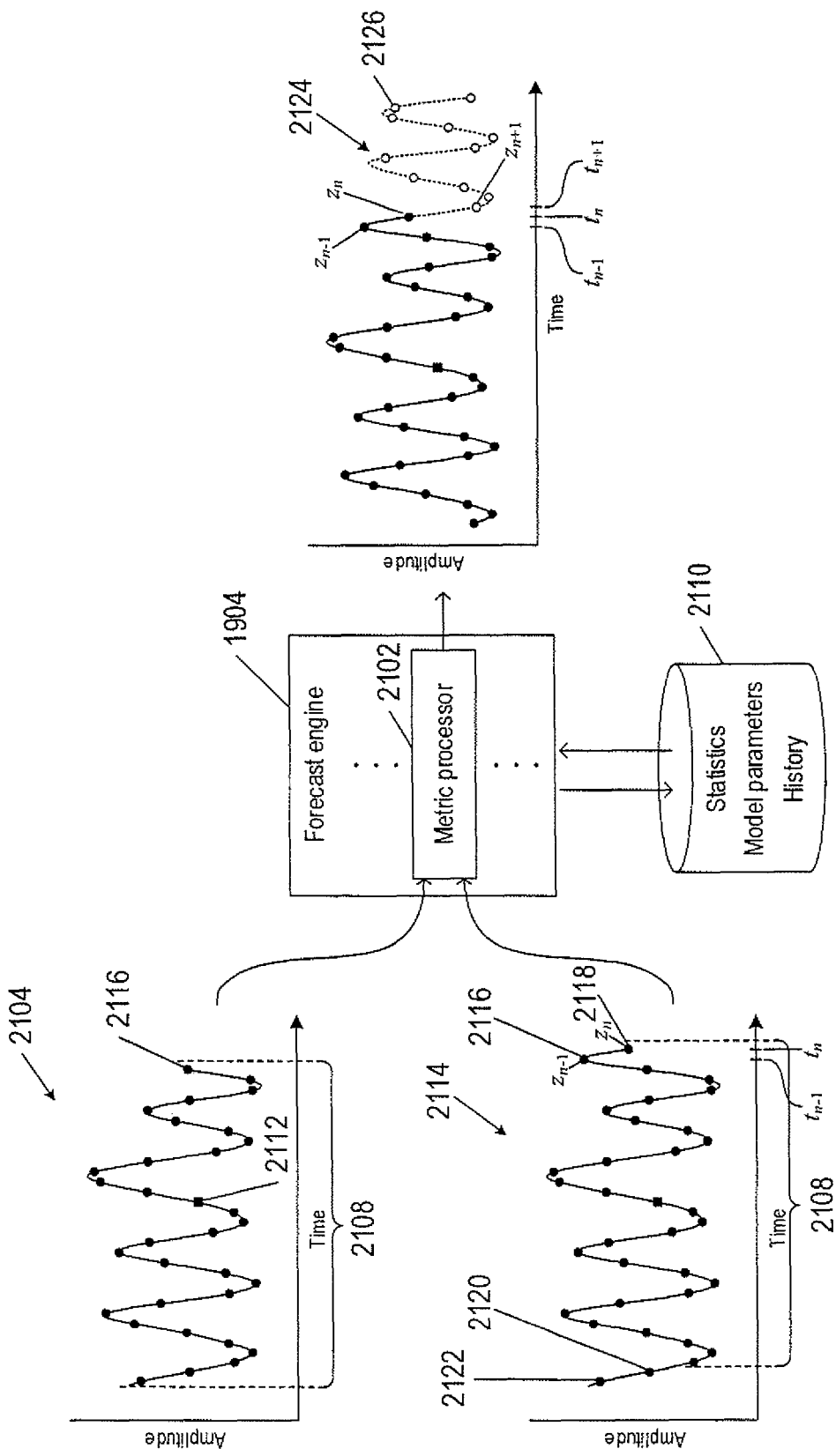
FIG. 21 shows an example of a history of metric data maintained by a metric processor of the forecast engine.

Metric data points of a metric data stream may arrive at the analytics services manager 1902 one at a time or two or more metric data points may arrive in time intervals. FIG. 21 shows an example of a limited history of metric data maintained by a metric processor 2102 of the forecast engine 1902. Plot 2104 displays data points of a limited history of metric data maintained by the metric processor 2102. For example, point 2106 represents a recently forwarded metric data value of the limited history of metric data recorded in a data-storage device 2110. The limited history of metric data is contained in a historical window 2108 of duration D. The historical window 2108 contains a sequence of metric data with time stamps in a time interval $[t_n-D, t_n]$, where subscript n is a positive integer time index, and $t_n$ is the time stamp of the most recently received metric data value $z_n$ added to the limited history and in the historical window. Ideally, consecutive metric data values forwarded to the metric processor 2102 have regularly spaced time stamps with no gaps. Interpolation is used to fill in any gaps or missing metric data in the limited history of metric data. For example, square-shaped metric data point 2112 represents an interpolated metric data value in the limited history of metric data. Interpolation techniques that may be used to fill in missing metric data values include linear interpolation, polynomial interpolation, and spline interpolation. The metric processor 2102 computes statistical information and forecast model parameters based on the limited history of metric data 2104 and records the statistical information and forecast model parameters in the data-storage device 2110. The historical window 2108 advances in time to include the most recently received metric data values and discard a corresponding number of the oldest metric data values from the limited history of metric data. Plot 2114 displays data points of an updated limited history of metric data. Points 2116 and 2118 represents two recently received metric data values added to the limited history of metric data and points 2120 and 2122 that represent the oldest metric data values outside the historical window 2108 are discarded. The metric data in the historical window 2108 are called "lags" and a time stamp of a lag is called "lag time." For example, metric data values $z_{n-1}$ and $z_n$ in the historical window are called lags and the corresponding time stamps values $t_{n-1}$ and $t_0$ and called lag times. The metric processor 2102 computes statistical information and updates model parameters stored in the data-storage device 2110 based on the latest limited history of metric data 2104.

When a forecast request is received by the metric processor 2102, the metric processor 2102 computes a metric data forecast based on the latest model parameters. The metric processor 2102 computes forecasted metric data values in a forecast interval at regularly spaced lead time stamps represented by open points. FIG. 21 shows a plot of forecasted metric data 2124 represented by open points, such as open point 2126, appended to the latest limited history of metric data. For example, a first forecasted metric data value $\tilde{z}_{n+1}$ occurs at lead time stamp $t_{n+1}$, where "~" denotes a forecast metric data value.

Each metric data value in a stream of metric data may be decomposed as follows:

$$z_i = T_i + A_i + S_i \tag{6}$$

where i=1, ..., n;

n is the number of metric data values in the historical window;

$T_i$ is the trend component;

$A_i$ is the stochastic component; and $S_i$ is the seasonal or periodic component.

Note that certain streams of metric data may have only one component (e.g., $A_i \neq 0$ and $T_i = S_i = 0$, for all i). Other streams may have two components (e.g., $A_i \neq 0$, $S_i \neq 0$, and $T_i = 0$, for all i). And still other streams may have all three components.

Figure 22:
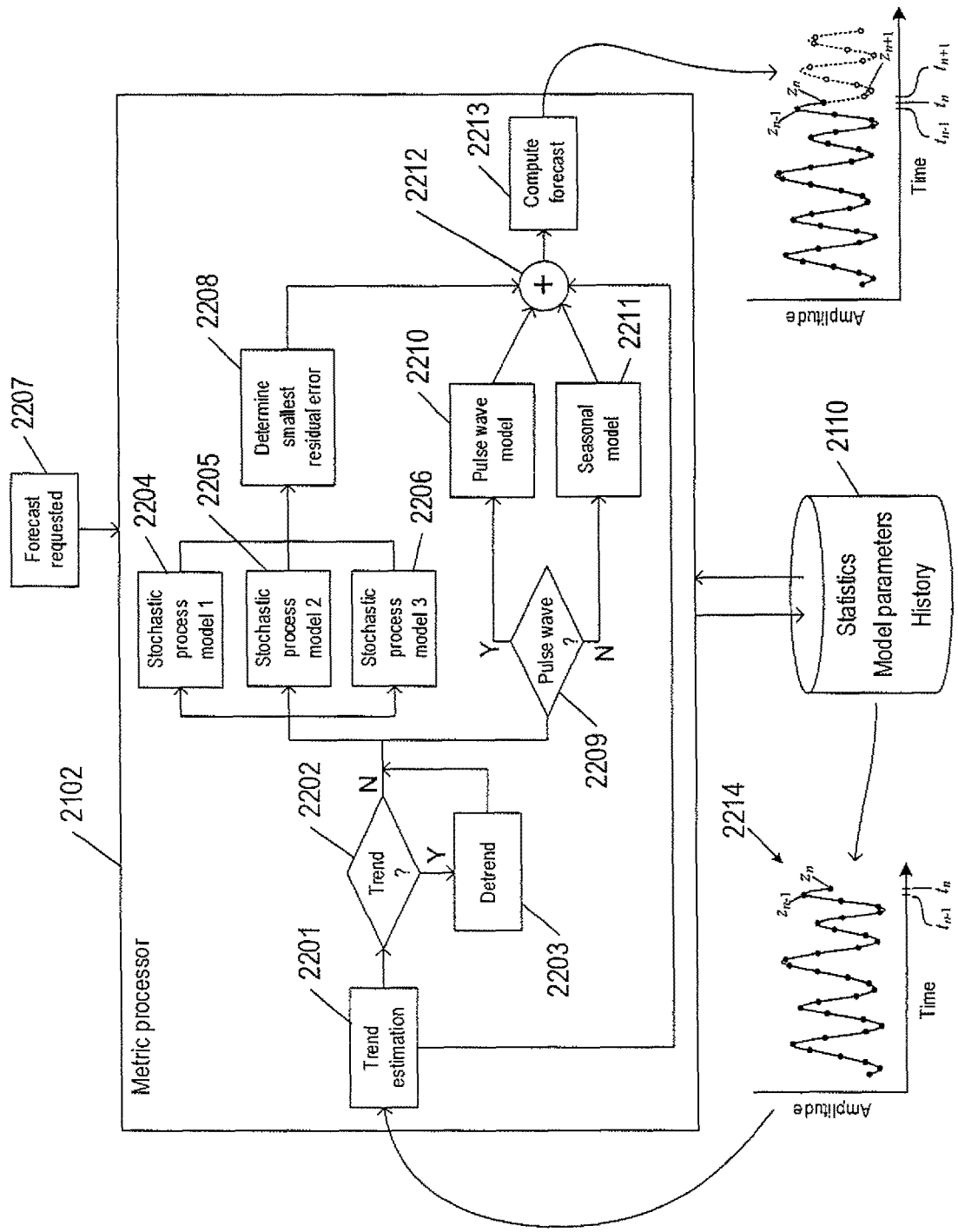
FIG. 22 shows an overview of example metric processing operations carried out by a metric processor.

FIG. 22 shows an overview of example processing operations carried out by the metric processor 2120. The latest metric data 2114 within the historical window 2108 is input to the metric processor 2102. The historical window contains the latest sequence of metric data in the limited history. In block 2201, a trend estimate of the metric data in the historical window is computed. In decision block 2202, if the trend estimate fails to adequately fit the metric data in the historical window, the metric data is non-trendy. On the other hand, if the trend estimate adequately fits the sequence of metric data, the sequence of metric data in the historical window is trendy and control flows to block 2203 where the trend estimate is subtracted from the metric data to obtain detrended sequence of metric data over the historical window.

Figure 23A:
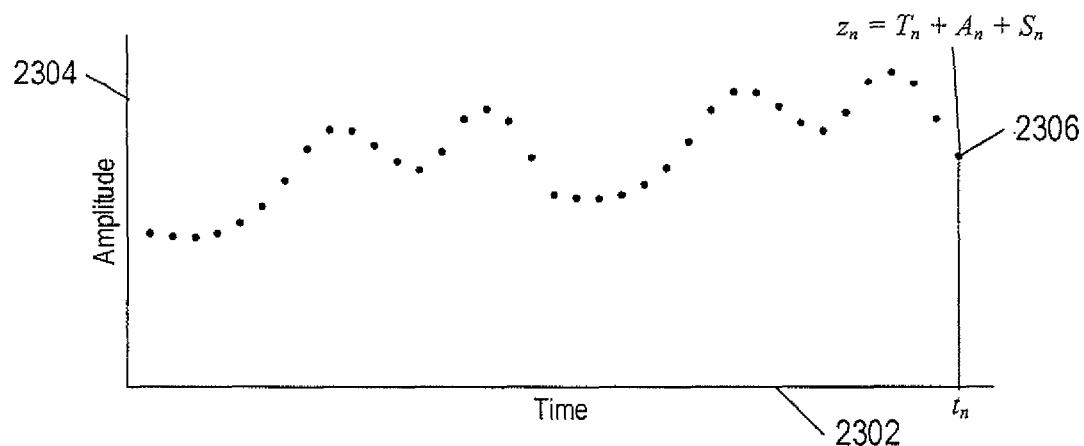
FIGS. 23A-23C show an example of computing a trend estimate and detrending metric data within a historical window.
Figure 23B:
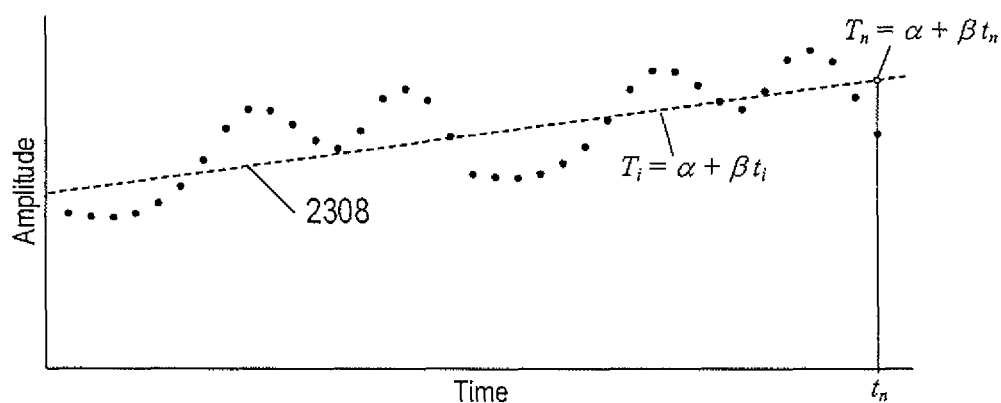
Figure 23C:
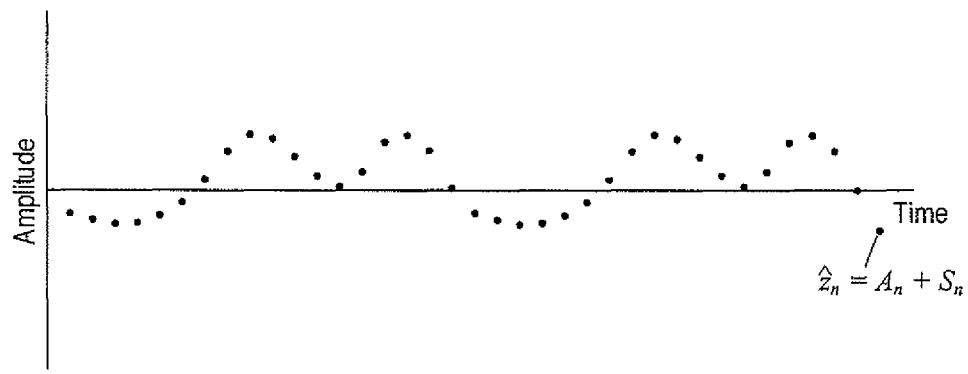

FIGS. 23A-23C show an example of computing a trend estimate and detrending metric data within a historical window. In FIGS. 23A-23C, horizontal axes, such as horizontal axis 2302, represent time. Vertical axes, such as vertical axis 2304, represent the amplitude range of the metric data in the historical window. In FIG. 23A, the values of the metric data represented by points, such as point 2306, vary over time, but a trend is recognizable by an overall increase in metric data values with increasing time. A linear trend may be estimated over the historical window by a linear equation given by:

$$T_i = \alpha + \beta t_i \tag{7a}$$

where $\alpha$ is vertical axis intercept of the estimated trend;

$\beta$ is the slope of the estimated trend;

i=1, ..., n; and n is the time index of the most recently added metric data value to sequence of metric data with a time stamp in the historical window.

The index i is the time index for time stamps in the historical window. The slope $\alpha$ and vertical axis intercept $\beta$ of Equation (7a) may be determined by minimizing a weighted least squares equation given by:

$$L = \sum_{i=1}^{n} w_i (z_i - \alpha - \beta t_i)^2 \tag{7b}$$

where $w_i$ is a normalized weight function.

Normalized weight functions $w_i$ weight recent metric data values higher than older metric data values within the historical window. Examples of normalized weight functions that give more weight to more recently received metric data values within the historical window include $w_L = e^{(i-n)}$ and $w_i = i/n$, for i=1, ..., n. The slope parameter of Equation (7a) is computed as follows:

$$\beta = \frac{\sum_{i=1}^{n} w_i (t_i - t_w)(z_i - z_w)}{\sum_{i=1}^{n} w_i (t_i - t_w)^2} \tag{7c}$$

where $$t_w = \frac{\sum_{i=1}^{n} w_i t_i}{\sum_{i=1}^{n} w_i}$$

$$z_w = \frac{\sum_{i=1}^{n} w_i z_i}{\sum_{i=1}^{n} w_i}$$

The vertical axis intercept parameter of Equation (7a) is computed as follows:

$$\alpha = z_w - \beta t_w \tag{7d}$$

In other implementations, the weight function may be defined as $w_i \equiv 1$.

A goodness-of-fit parameter is computed as a measure of how well the trend estimate given by Equation (7a) fits the metric data values in the historical window:

$$R^2 = \frac{\sum_{i=1}^{n}(T_i - z_w)^2}{\sum_{i=1}^{n}(z_i - z_w)^2} \quad (8)$$

The goodness-of-fit $R^2$ ranges between 0 and 1. The closer $R^2$ is to 1, the closer linear Equation (7a) is to accurately estimating a linear trend in the metric data of the historical window. In decision block 1802 of FIG. 18, when $R^2 \leq Th_{trend}$, where $Th_{trend}$ is a user defined trend threshold less than 1, the estimated trend of Equation (7a) is not a good fit to the sequence of metric data values and the sequence of metric data in the historical window is regarded as non-trendy metric data. On the other hand, when $R^2 > Th_{trend}$, the estimated trend of Equation (7a) is recognized as a good fit to the sequence of metric data in the historical window and the trend estimate is subtracted from the metric data values. In other words, when $R^2 > Th_{trend}$, for $i=1, \ldots, n$, the trend estimate of Equation (7a) is subtracted from the sequence of metric data in the historical window to obtain detrended metric data values:

$$\hat{z}_i = z_i - T_i \quad (9)$$

where the hat notation "^" denotes non-trendy or detrended metric data values.

In FIG. 23B, dashed line 2308 represents an estimated trend of the sequence of metric data. The estimated trend is subtracted from the metric data values according to Equation (9) to obtain a detrended sequence of metric data shown in FIG. 23C. Although metric data values may vary stochastically within the historical window, with the trend removed as shown in FIG. 23C, the metric data is neither generally increasing nor decreasing for the duration of the historical window.

Returning to FIG. 22, as recently forwarded metric data values are input to the metric processor 2102 and a corresponding number of oldest metric data values are discarded from the historical window, as described above with reference to FIG. 21, the metric processor 2102 updates the slope and vertical axis intercepts according to Equations (7b) and (7c), computes a goodness-of-fit parameter according to Equation (8), and, if a trend is present, subtracts the trend estimate according to Equation (9) to obtain a detrended sequence of metric data in the historical window. If no trend is present in the metric data of the historical window as determined by the goodness-of-fit in Equation (8), the sequence of metric data in the historical window is non-trendy. In either case, the sequence of metric data output from the computational operations represented by blocks 2201-2203 is called a sequence of non-trendy metric data and each non-trendy metric data value is represented by $$\hat{z}_i = A_i + S_i \quad (10)$$

where $i=1, \ldots, n$.

The mean of the non-trendy metric data in the historical window is given by:

$$\mu_z = \frac{1}{n}\sum_{i=1}^{n}\hat{z}_i$$

When the metric data in the historical window has been detrended according to Equation (9) and $R^2 > Th_{trend}$, the mean $\mu_z = 0$. On the other hand, when the metric data in the historical satisfies the condition $R^2 \leq Th_{trend}$, then it may be the case that the mean $\mu_z \neq 0$.

In alternative implementations, computation of the goodness-of-fit $R^2$ is omitted and the trend is computed according to Equations (7a)-(7d) followed by subtraction of the trend from metric data in the historical window according to Equation (9). In this case, the mean of the metric data $\mu_z$ equals zero in the discussion below.

The sequence of detrended or non-trendy metric data may be either stationary or non-stationary metric data. Stationary non-trendy metric data varies over time in a stable manner about a fixed mean. Non-stationary non-trendy metric data, on the other hand, the mean is not fixed and varies over time. For a stationary sequence of non-trendy metric data, the stochastic process models 2204-2206 in FIG. 22 may be autoregressive moving-average models 2206-2208 ("ARMA") computed separately for the stationary sequence of metric data in the historical window. An ARMA model is represented, in general, by $$\phi(B)\hat{z}_n = \theta(B)a_n \quad (11a)$$

where
B is a backward shift operator;

$$\phi(B) = 1 - \sum_{i=1}^{p} \phi_i B^i$$

$$\theta(B) = 1 - \sum_{i=1}^{q} \theta_i B^i$$

$a_n$ is white noise;
$\phi_i$ is an i-th autoregressive weight parameter;
$\theta_i$ is an i-th moving-average weight parameter;
p is the number of autoregressive terms called the "autoregressive order;" and
q is the number of moving-average terms called the "moving-average order;"
The backward shift operator is defined as $B\hat{z}_n = \hat{z}_{n-1}$ and $B^i\hat{z}_n = \hat{z}_{n-i}$. In expanded notation, the ARMA model is represented by $$\hat{z}_n = \sum_{i=1}^{p}\phi_i\hat{z}_{n-i} + a_n + \mu_z\Phi + \sum_{i=1}^{q}\theta_i a_{n-i} \quad (11b)$$

where $\Phi = 1 - \phi_1 - \ldots - \phi_p$.
The white noise parameters $a_n$ may be determined at each time stamp by randomly selecting a value from a fixed normal distribution with mean zero and non-zero variance. The autoregressive weight parameters are computed from the matrix equation:

$$\vec{\phi} = P^{-1}\vec{\rho} \quad (12)$$

-continued where $$\vec{\phi} = \begin{bmatrix} \phi_1 \\ \vdots \\ \phi_p \end{bmatrix};$$

$$\vec{\rho} = \begin{bmatrix} \rho_1 \\ \vdots \\ \rho_p \end{bmatrix}; \text{ and}$$

$$P^{-1} = \begin{bmatrix} 1 & \rho_1 & \cdots & \rho_{p-1} \\ \rho_1 & 1 & \cdots & \rho_{p-2} \\ \vdots & \vdots & \ddots & \vdots \\ \rho_{p-1} & \rho_{p-2} & \cdots & 1 \end{bmatrix}^{-1}$$

The matrix elements are computed from the autocorrelation function given by:

$$\rho_k = \frac{\gamma_k}{\gamma_0} \quad (13)$$

where $$\gamma_k = \frac{1}{n} \sum_{i=1}^{n-k} (\hat{z}_i - \mu_z)(\hat{z}_{i+k} - \mu_z)$$

$$\gamma_0 = \frac{1}{n} \sum_{i=1}^{n} (\hat{z}_i - \mu_z)^2$$

The moving-average weight parameters may be computed using gradient descent. In the Example of FIG. 22, the metric processor 2102 computes three separate stochastic process models 2204-2206 for stationary sequence of non-trendy metric data in the latest historical window. For example, when the historical window of the sequence of non-trendy metric data is updated with recently received non-trendy metric data values, three sets of autoregressive and moving average weight parameters are computed for each the three ARMA models denoted by ARMA($p_1$, $q_1$), ARMA($p_2$, $q_2$), and ARMA($p_3$, $q_3$).

Figure 24:
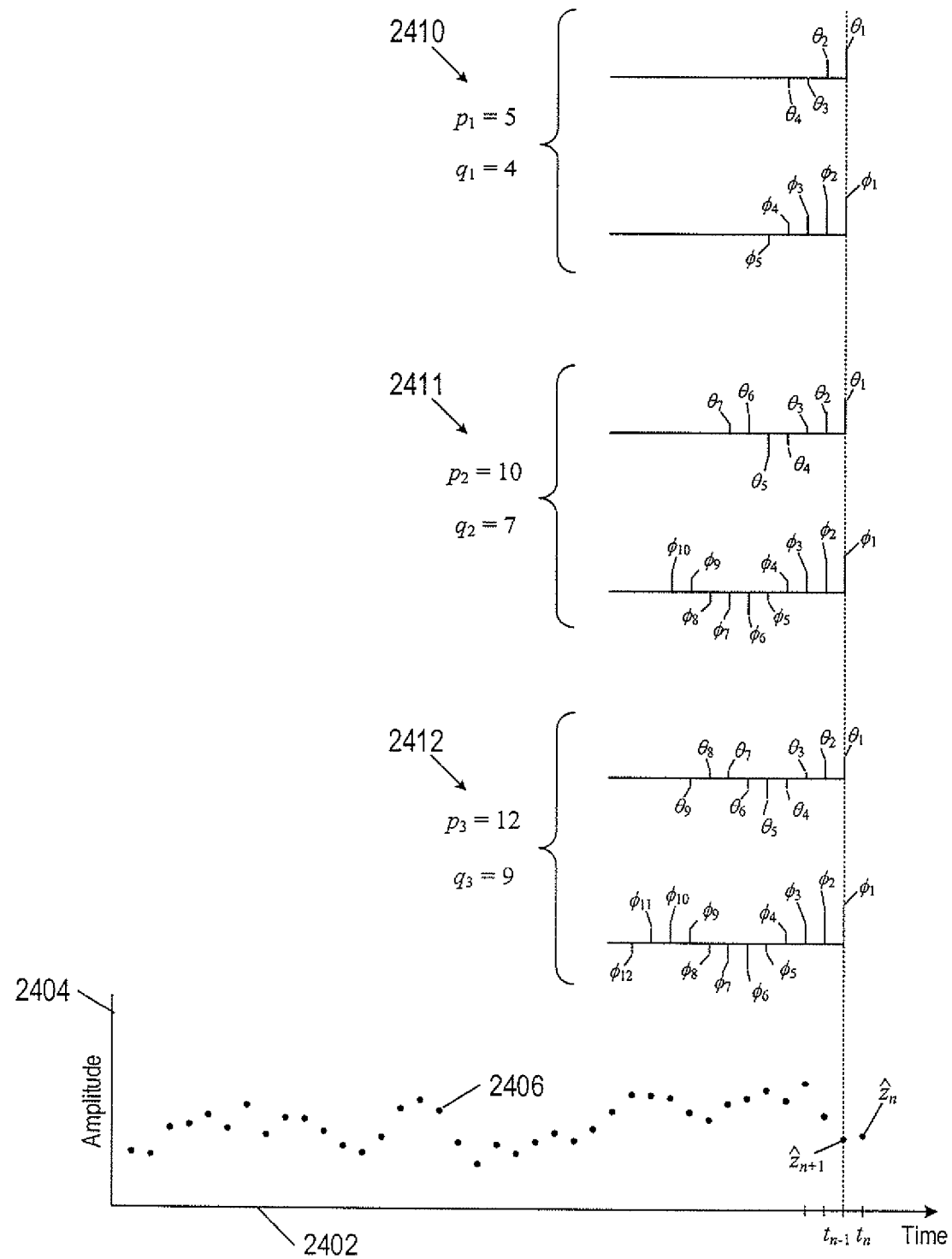
FIG. 24 shows example weight parameters for three autoregressive moving-average models.

FIG. 24 shows example weight parameters for three autoregressive moving-average models ARMA($p_1$, $q_1$), ARMA($p_2$, $q_2$), and ARMA($p_3$, $q_3$). Horizontal axis 2402 represents time. Vertical axis 2404 represents a range of amplitudes of a stationary sequence of non-trendy metric data. Points, such as point 2406, represent metric data values in a historical window. FIG. 24 includes plots of three example sets of autoregressive and moving average weight parameters 2410-2412 for three different autoregressive and moving-average models. For example, ARMA model ARMA($p_3$, $q_3$) 2412 comprises twelve autoregressive weight parameters and nine moving-average weight parameters. The values of the autoregressive weight parameters and moving-average weight parameters are computed for the stationary sequence of non-trendy metric data in the historical window. Positive and negative values of the autoregressive weight parameters and moving-average weight parameters are represented by line segments that extend above and below corresponding horizontal axes 2414 and 2416 and are aligned in time with time stamps of the non-trendy metric data.

Prior to updating the stochastic process models, when a new metric data value $z_{n+1}$ is received by the metric processor 2102, the new metric data value is detrended according to Equation (9) to obtained detrended metric value $\hat{z}_{n+1}$ and a corresponding estimated non-trendy metric data value $\hat{z}_{n+1}^{(m)}$ is computed using each of the stochastic process models 2204-2206. For example, the estimated non-trendy metric data value $\hat{z}_{n+1}^{(m)}$ may be computed using each of the ARMA models ARMA($p_m$, $q_m$) as follows:

$$\hat{z}_{n+1}^{(m)} = \sum_{i=1}^{p_m} \phi_i \hat{z}_n + a_{n+1} + \mu_z \Phi + \sum_{i=1}^{q_m} \theta_i a_n \quad (14)$$

where m=1, 2, 3.

Separate accumulated residual errors are computed for each stochastic model as new metric data values are received by the metric processor 2102 as follows:

$$\text{Error}(p_m, q_m) = \sum_{i=1}^{n} (\hat{z}_{n+1}^{(m)} - \hat{z}_{n+1})^2 \quad (15)$$

where $\hat{z}_{n+1}$ is a latest non-trendy metric data value received by the metric processor 2102 at time stamp $t_{n+1}$;

$\hat{z}_{n+1}^{(m)}$ is an estimated non-trendy metric data value computed using the ARMA model ARMA($p_m$, $q_m$) at the time stamp $t_{n+1}$; and $(\hat{z}_{n+1}^{(m)} - \hat{z}_{n+1})^2$ is a residual error at the time stamp $t_{n+1}$.

After the accumulated residual error is computed, the limited history of metric data is updated as described above with reference to FIG. 21 and the parameters of the stochastic process models 2204-2206 are updated.

Figure 25:
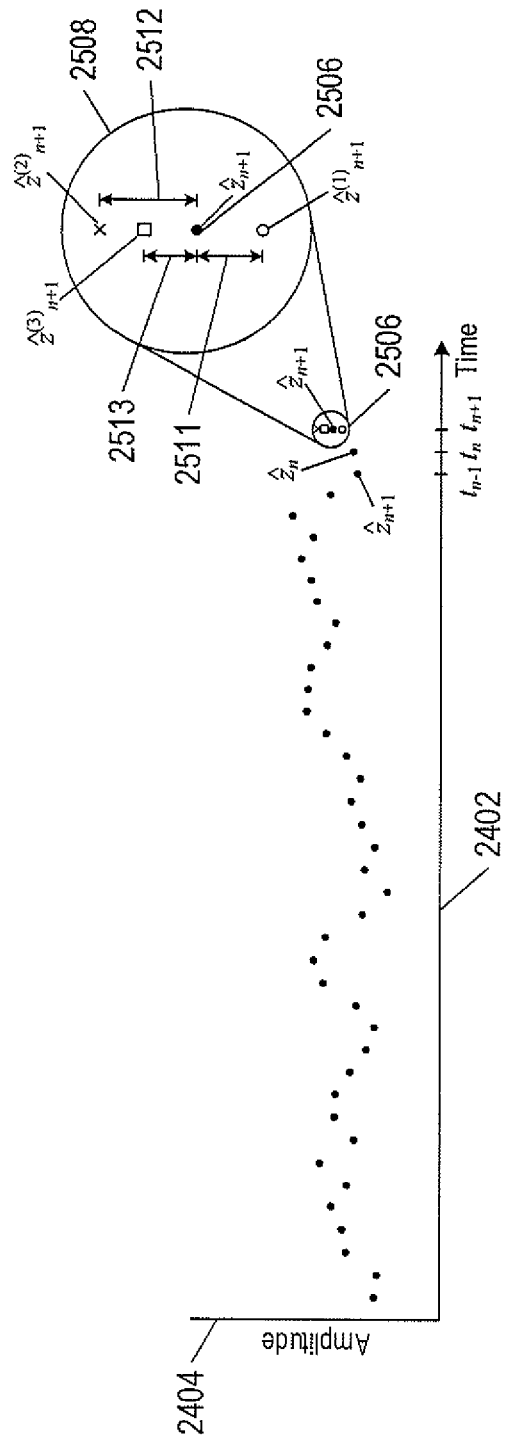
FIG. 25 shows an example of a latest non-trendy metric data value and three forecasted non-trendy metric data values with the same time stamp.

FIG. 25 shows an example of a latest non-trendy metric data value $\hat{z}_{n+1}$ received by the metric processor 2102 as represented by point 2506. Three candidate metric data values are separately computed using the three ARMA models ARMA($p_1$, $q_1$), ARMA($p_2$, $q_2$), and ARMA($p_3$, $q_3$) as follows:

$$\hat{z}_{n+1}^{(1)} = \sum_{i=1}^{p_1} \phi_i \hat{z}_n + a_{n+1} + \mu_z \Phi + \sum_{i=1}^{q_1} \theta_i a_n$$

$$\hat{z}_{n+1}^{(2)} = \sum_{i=1}^{p_2} \phi_i \hat{z}_n + a_{n+1} + \mu_z \Phi + \sum_{i=1}^{q_2} \theta_i a_n$$

and $$\hat{z}_{n+1}^{(3)} = \sum_{i=1}^{p_3} \phi_i \hat{z}_n + a_{n+1} + \mu_z \Phi + \sum_{i=1}^{q_3} \theta_i a_n$$

where the white noise $a_{n+1}$ is randomly selecting from the fixed normal distribution. FIG. 25 includes a magnified view 2508 of the latest non-trendy metric data value $\hat{z}_{n+1}$ 2506 received by the metric processor 2102 and three estimated non-trendy metric data values $\hat{z}_{n+1}^{(1)}$, $\hat{z}_{n+1}^{(2)}$ and $\hat{z}_{n+1}^{(3)}$ computed separately from the three ARMA models at the time stamp $t_{n+1}$. Directional arrows 2511-2513 represent differences in amplitudes between the latest non-trendy metric data value $\hat{z}_{n+1}$ 2506 and the three estimated non-trendy metric data values $\hat{z}_{n+1}^{(1)}$, $\hat{z}_{n+1}^{(2)}$ and $\hat{z}_{n+1}^{(3)}$. Accumulated residual errors are maintained for each of the ARMA models as follows:

$$\text{Error}(p_1, q_1) = \sum_{i=1}^{n} (\hat{z}_{n+1}^{(1)} - \hat{z}_{n+1})^2$$

$$\text{Error}(p_2, q_2) = \sum_{i=1}^{n} (\hat{z}_{n+1}^{(2)} - \hat{z}_{n+1})^2$$

and $$\text{Error}(p_3, q_3) = \sum_{i=1}^{n} (\hat{z}_{n+1}^{(3)} - \hat{z}_{n+1})^2$$

Returning to FIG. 22, when a forecast is requested 2207 in block 2208, the accumulated residual errors of the stochastic models are compared and the stochastic process model with the smallest accumulated residual error is selected for forecasting. For example, the ARMA model ARMA($p_m$, $q_m$) may be used to compute forecasted metric data values as follows:

$$\hat{z}_{n+l}^{(m)} = \sum_{i=1}^{l-1} \phi_i \hat{z}_{n+i-1}^{(m)} + \sum_{i=l}^{p_m} \phi_i \hat{z}_{n+l-i} + a_{n+l} + \mu_z \Phi + \sum_{i=1}^{q_m} \theta_i a_{n+l-i} \quad (16)$$

where
l=1, ..., L is a lead time index with L the number of lead time stamps in the forecast interval;
$\hat{z}_n^{(m)}$ is zero; and
$a_{n+l}$ is the white noise for the lead time stamp $t_{n+l}$.

Figure 26:
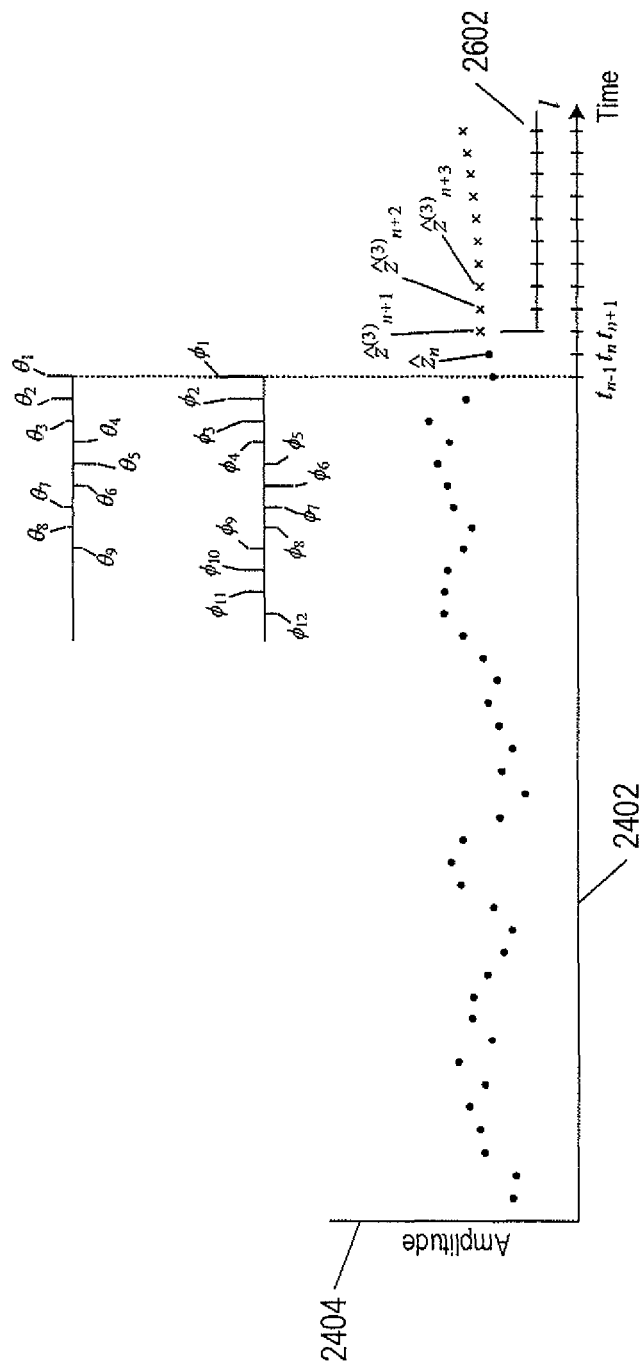
FIG. 26 shows an example sequence of forecasted non-trendy metric data.

FIG. 26 shows forecasted metric data values computed using weight parameters of the ARMA model 2412 ARMA($p_3$, $q_3$) in FIG. 24. In the example of FIG. 26, horizontal axis 2602 is a time axis for positive integer lead time indices denoted by l. The first three forecasted metric data values, denoted by "x's" in FIG. 26, are computed using ARMA($p_3$, $q_3$) as follows:

$$\hat{z}_{n+1}^{(3)} = \sum_{i=1}^{p_3} \phi_i \hat{z}_{n+1-i} + a_{n+1} + \mu_z \Phi + \sum_{i=1}^{q_3} \theta_i a_{n+l-i}$$

$$\hat{z}_{n+2}^{(3)} = \phi_1 \hat{z}_{n+1}^{(3)} + \sum_{i=1}^{p_3} \phi_i \hat{z}_{n+2-i} + a_{n+2} + \mu_z \Phi + \sum_{i=1}^{q_3} \theta_i a_{n+l-i}$$

and $$\hat{z}_{n+3}^{(3)} = \phi_1 \hat{z}_{n+2}^{(3)} + \phi_2 \hat{z}_{n+1}^{(3)} + \sum_{i=3}^{p_3} \phi_i \hat{z}_{n+3-i} + a_{n+3} + \mu_z \Phi + \sum_{i=1}^{q_3} \theta_i a_{n+l-i}$$

In still other implementations, the stochastic process models 2204-2206 in FIG. 22 may be implemented as autoregressive process ("AR") models given by:

$$\hat{z}_n = \sum_{i=1}^{p} \phi_i \hat{z}_{n-i} + a_n + \mu_z \Phi \quad (17)$$

The autoregressive process model is obtained by omitting the moving-average weight parameters form the ARMA model. By omitting the moving-average model, computation of the autoregressive weight parameters of the autoregressive model is less computationally expensive than computing the autoregressive and moving-average weight parameters of the ARMA models. When the historical window of the sequence of non-trendy metric data is updated with recently received non-trendy metric data values, three sets of autoregressive weight parameters are computed for each the three AR models denoted by AR($p_1$), AR($p_2$), and AR($p_3$). Accumulated residual errors are maintained for each of the AR models. Forecasted metric data values $\hat{z}_{n+l}^{(m)}$ are computed for lead times using Equation (16) with the moving-average weight parameters equal to zero and the AR model with smallest accumulated residual error at the time of the forecast request.

Unlike a stationary sequence of non-trendy metric data, a non-stationary sequence of non-trendy metric data does not vary over time in a stable manner about a fixed mean. In other words, a non-stationary sequence of non-trendy metric data behaves as the though the metric data values of the sequence have no fixed mean. In these situations, one or more of the stochastic process models 2204-2206 in FIG. 22 may be implemented using an autoregressive integrated moving-average ("ARIMA") model given by:

$$\phi(B)\nabla^d \hat{z}_n = \theta(B) a_n \quad (18)$$

where $\nabla^d = (1-B)^d$.

The ARIMA autoregressive weight parameters and move-average weight parameters are computed in the same manner as the parameters of the ARMA models described above. The ARIMA model, denoted by ARIMA($p_1$, $q_1$), ARIMA($p_2$, $q_2$), and ARIMA($p_3$, $q_3$), with the smallest accumulated residual error at the time of the forecast request is used to compute forecasted metric data values $\hat{z}_{n+l}^{(m)}$ for lead times in the forecast interval.

Returning to FIG. 22, certain streams of metric data may have pulse wave patterns. Other streams of metric data may have a single time varying periodic pattern or a combination of period patterns, such as hourly, daily, weekly or monthly periodic patterns, and are called "seasonal." Other streams of metric data may not be periodic. Because pulse wave metric data is a special type of periodic data, in decision block 2209, edge detection is used to determine if the sequence of non-trendy metric data in the historical window is pulse wave metric data. If edge detection reveals that the metric data is pulse wave metric data, control flows to determining the pulse wave model 2210. Otherwise, control flows to block 2211 to determine if the metric data contains a seasonal pattern. Seasonality in a sequence of non-trendy metric data is a regular periodic pattern of amplitude changes that repeats in time periods. A seasonal period is determined in a seasonal model in block 2211.

Figure 27:
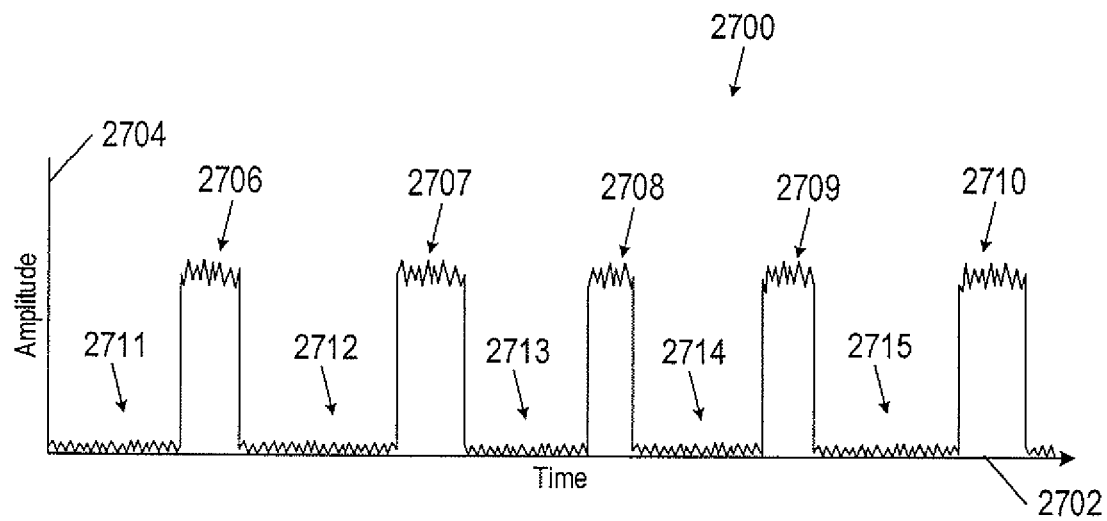
FIG. 27 shows a plot of an example stream of metric data that exhibits a pulse wave pattern.

FIG. 27 shows a plot of an example stream of metric data 2700. Horizontal axis 2702 represents time. Vertical axis 2704 represents a range of amplitudes for metric data values. The stream of metric data comprises pulses 2706-2710 separated by low amplitude time intervals 2711-2714. The stream of metric data may represent network traffic, memory usage, or CPU usage for a server computer that runs a periodically executed VM. The low amplitude time intervals 2711-2714 represent time intervals in which the VM is idle. Pulses 2706-2710 represent time intervals when the VM is running. This stream of metric data is an example of metric data modeled using a pulse wave model 2610.

Figure 28:
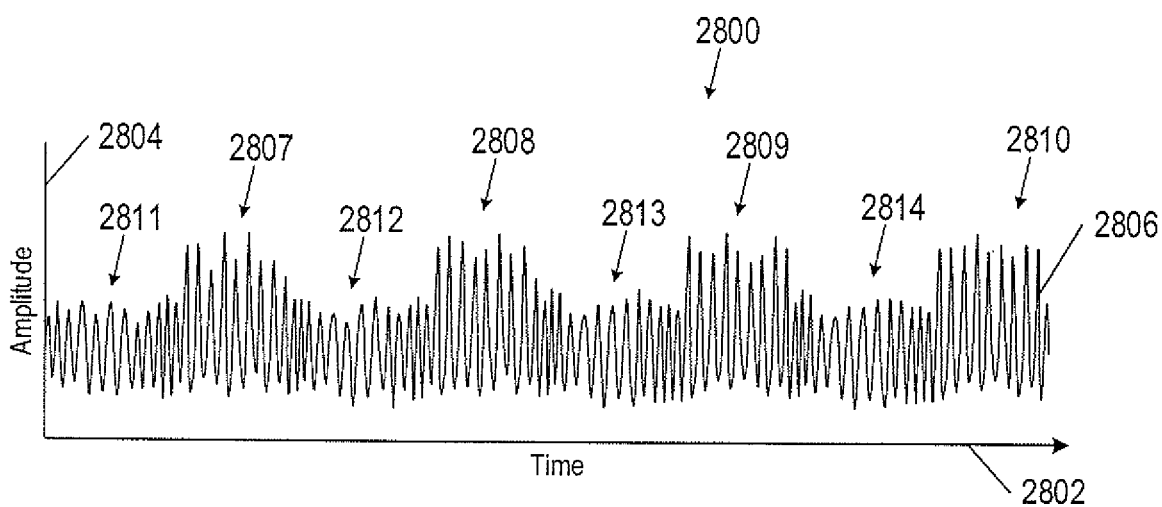
FIG. 28 shows a plot of an example stream of metric data that exhibits a seasonal wave pattern.

FIG. 28 shows a plot of an example stream of metric data 2800 that exhibits two seasonal periods. Horizontal axis 2802 represents time. Vertical axis 2804 represents a range of amplitudes for metric data values. Oscillating curve 2806 represents a stream of metric data with two seasonal periods. A first longer seasonal period appears with regularly spaced larger amplitude oscillations 2806-2809 separated by regularly spaced smaller amplitude oscillations 2810-2813. A second shorter seasonal period exhibits oscillations over much shorter time intervals. This stream of metric data is an example of seasonal metric data modeled using the seasonal model 2611.

In block 2609 of FIG. 26, edge detection is applied to the metric data in the historical window. An exponentially weighted moving average ("EWMA") of absolute differences between two consecutive non-trendy metric data values denoted by $\Delta_i = |\hat{z}_i - \hat{z}_{i-1}|$ is maintained for $i=1, \ldots, n$ metric data values in the historical window. The EWMA for the latest time stamp $t_0$ in the historical window is computed recursively by:

$$MA_n = \alpha \Delta_n + (1-\alpha) MA_{n-1} \quad (19a)$$

where
$MA_0 = 0$; and
$0 < \alpha < 1$.

For example, the parameter a may be set 0.1, 0.2, or 0.3. For each new non-trendy metric data value $\hat{z}_{n+1}$, the absolute difference $\Delta_{n+1} = |\hat{z}_{n+1} - \hat{z}_n|$ is computed. The new non-trendy metric data value $\hat{z}_{n+1}$ is a spike in the magnitude of the stream of metric data, when the absolute difference satisfies the following spike threshold condition:

$$\Delta_{n+1} > Th_{spike} \quad (19b)$$

where $Th_{spike} = C \times MA_n$.

The parameter C is a numerical constant (e.g., C=4.0, 4.5, or 5.0). When the absolute difference $\Delta_{n+1}$ is less than the spike threshold, control flows to seasonal model in block 2611 of FIG. 26. When the new non-trendy metric data value $\hat{z}_{n+1}$ satisfies the condition given by Equation (19b), edge detection is applied to determine if sequence of non-trendy metric data comprises pulse wave edges in a backward time window $[\hat{z}_{n-X}, \hat{z}_n]$ and a forward time window $[\hat{z}_n, \hat{z}_{n+X}]$, where X is a fixed number of metric data points.

Figure 29A:
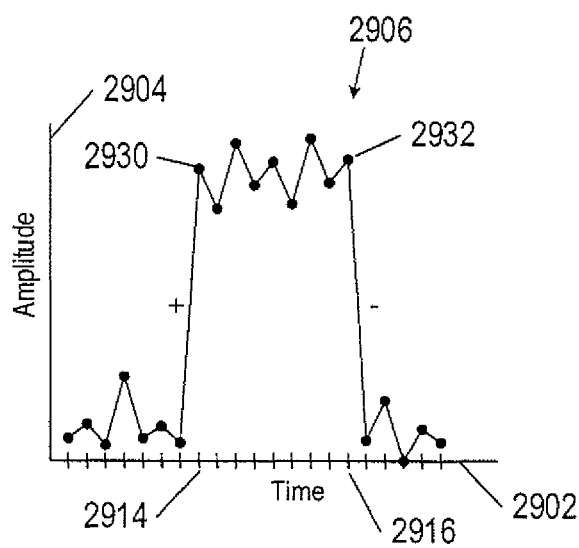
FIGS. 29A-29D shows edge detection applied to a sequence of metric data.

FIGS. 29A-29D shows edge detection applied to a sequence of metric data. Horizontal axes, such as horizontal axis 2902, represent time. Vertical axes, such as vertical axis 2904, represent a range of amplitudes for metric data values. In FIG. 29A, metric data with low amplitude metric data are located on both sides of a pulse 2906 of high amplitude metric data. Noise appears as smaller amplitude variations in metric data values.

Figure 29B:
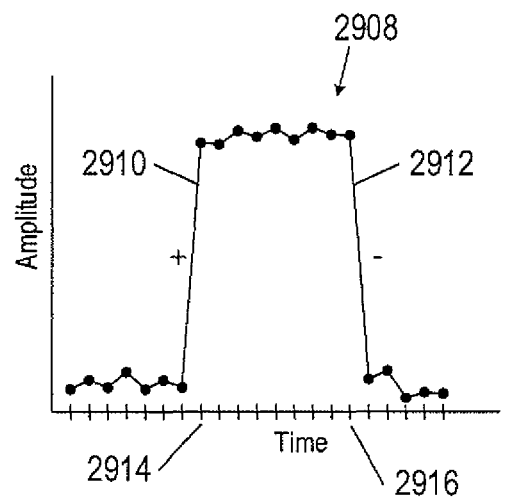

A smoothing filter is applied to the metric data in the historical window to suppress the noise. The smoothing filter may be a moving median filter, a moving average filter, and a Gaussian filter. FIG. 29B shows smoothed amplitudes in the metric data of a smoothed pulse 2908 and smoothed amplitudes of metric data surrounding the pulse. Increasing edge 2910 and decreasing edge 2912 of the pulse 2908 appear near corresponding time stamps 2914 and 2916. Edges may be detected by first computing the gradient at each smoothed metric data value in the historical domain. For $i=1, \ldots, n$, the gradient may be computed at each smoothed metric data value as follows:

$$G(t_i) = -\tfrac{1}{2}\hat{z}_{i-1}^s + \tfrac{1}{2}\hat{z}_{i+1}^s \quad (20)$$

where $\hat{z}_i^s$ is a smoothed metric data value in the historical domain.

After computing the gradient at each metric data value, other gradients around an edge may be large enough to obscure detection of actual edges of a pulse.

Figure 29C:
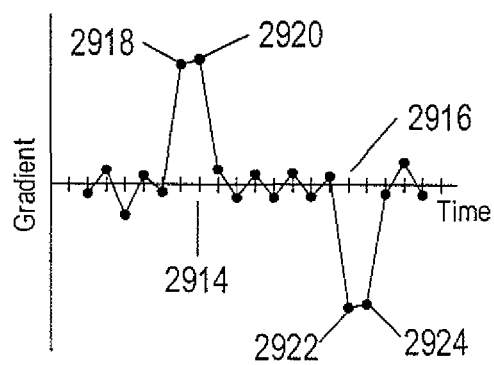

FIG. 29C shows a plot of example gradients of the metric data shown in FIG. 29B. Points 2918 and 2920 are positive gradient values that correspond to edge 2910 in FIG. 29B. Points 2922 and 2924 are negative gradient values that correspond to edge 2912 in FIG. 29B.

Non-maximum edge suppression is applied to identify pulse edges by suppressing gradient values (i.e., setting gradient values to 0) except for local maxima gradients that correspond to edges in a pulse. Non-maximum edge suppression is systematically applied in overlapping neighborhoods of consecutive gradients. For example, each neighborhood may contain three consecutive gradients. The magnitude of a central gradient in the neighborhood is compared with the magnitude of two other gradients in the neighborhood. If the magnitude of the central gradient is the largest of the three gradients in the neighborhood, the values of the other gradients are set to zero and the value of the central gradient is maintained. Otherwise, the gradient with the largest value is maintained while the value of the central gradient and the other gradient in the neighborhood are set to zero.

Figure 29D:
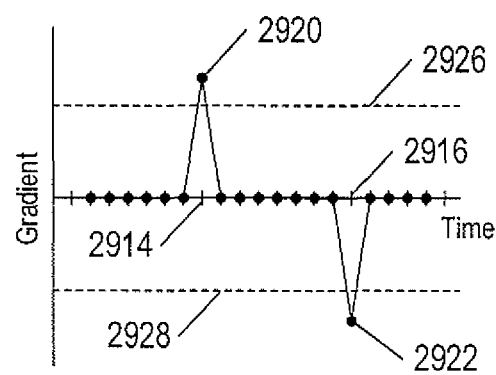

FIG. 29D shows a plot of gradients after applying non-maximum edge suppression to the gradients shown in FIG. 29C. In FIG. 29D, point 2920 is a positive gradient at time stamp 2914 and corresponds to upward ("+") edge 2910 and point 2922 is a negative gradient at time stamp 2916 and corresponds to downward ("−") edge 2912. Positive gradient thresholds Th+ 2926 and negative gradient threshold Th− 2928 are used to identify the metric data values at time stamps 2914 and 2916 corresponding to a pulse. In this example, gradients 2920 and 2922 exceed corresponding gradient thresholds 2926 and 2928. As a result, amplitude 2930 at time stamp 2914 is identified as an upward edge of the pulse wave 2906 and amplitude 2932 at time stamp 2916 is identified as a downward edge of the pulse wave 2906. The output for each edge detection is denoted by ($t_s$, A, sign), where A is an amplitude of a pulse edge at time stamp $t_s$. The "sign" is a binary value, such as "0" for upward edges and "1" for downward edges.

Figure 30A:
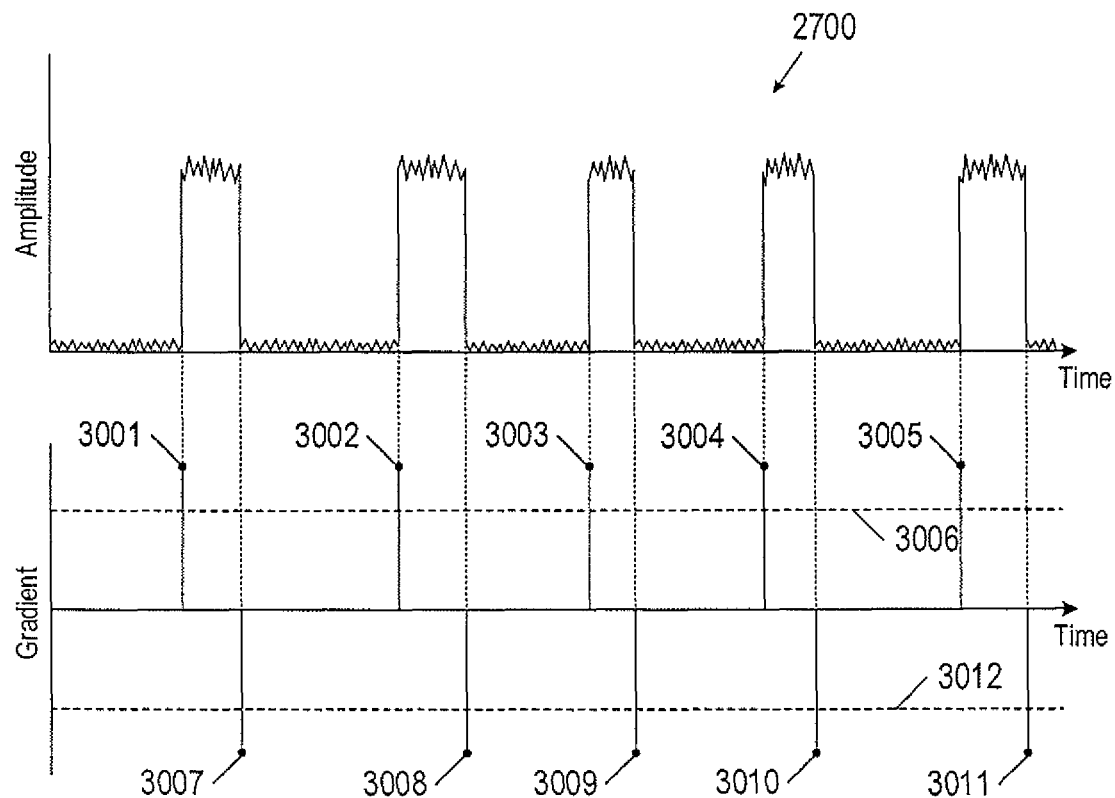
FIG. 30A shows a plot of gradients that correspond to edges of pulses in a pulse-wave stream of metric data.
Figure 30B:
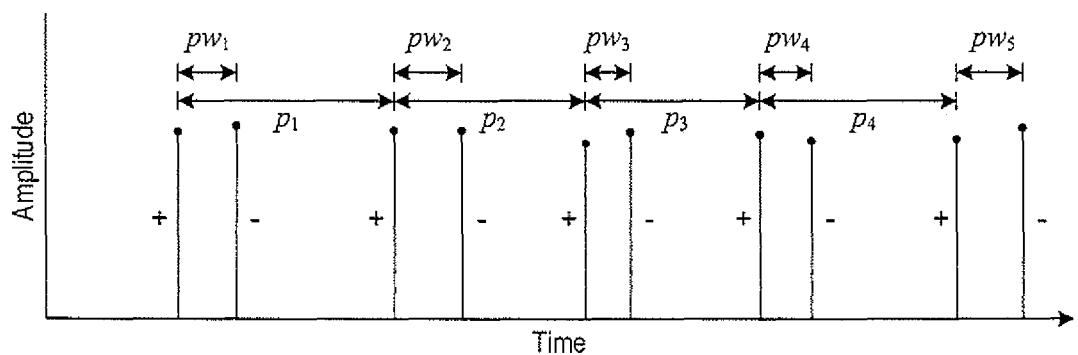
FIG. 30B shows pulse widths and periods of the pulses in the pulse-wave stream of metric data of FIG. 30A.

Returning to FIG. 22, the pulse wave model 2210 estimates the pulse width and period for the pulse wave stream of metric data. The pulse width can be estimated as a difference in time between consecutive upward and downward edges. The period can be estimated as a difference in time between two consecutive upward (or downward) edges. FIG. 30A shows a plot of gradients of upward and downward edges of the pulses in the sequence of non-trendy metric data 2700 shown in FIG. 27. Positive gradients 3001-3005 exceed positive gradient threshold 3006. Negative gradients 3007-3011 exceed negative gradient threshold 3012. The gradients in FIG. 30A are used to designate edges of the sequence of non-trendy metric data 2700 shown in FIG. 27 as upward or downward edges. FIG. 30B shows pulse widths and periods of the stream of metric data 2700. Each edge has a corresponding 3-tuple ($t_s$, A, sign). In FIG. 30B, pulse widths denoted by $pw_1$, $pw_2$, $pw_3$, $pw_4$, and $pw_5$ are computed as a difference between time stamps of consecutive upward and downward edges. Periods are denoted by $p_1$, $p_2$, $p_3$, $p_4$, and $p_5$ are computed as a difference between time stamps of two consecutive upward (or downward) edges. The latest pulse widths and periods are recorded in corresponding circular buffer back-sliding histograms described below with reference to FIG. 34A.

Returning to FIG. 22, if the sequence of non-trendy metric data is not pulse-wave metric data, the metric data may be seasonal metric data and a seasonal period is determined in seasonal model 2211. The seasonal model 2211, begins by applying a short-time discrete Fourier transform ("DFT") given by:

$$Z(m, k/N) = \sum_{i=1}^{N} \hat{z}_i w(i-m) \exp(-j2\pi ki/N) \quad (21)$$

where
m is an integer time shift of a short-time window;
j is the imaginary constant;
k=0, . . . ,N−1 is a frequency spectrum sample;
N is the number of data points in a subset of the historical window (i.e., N≤n); and
w(i−m) is a window function.

The window function w(i−m) is function that tapers toward both ends of the short-time window. For example, the window function can be a Hann function, a Hamming function, or Gaussian function. The spectrum Z(m, k/N) is a complex valued function of m and k. The power spectral density ("PSD") is given by:

$$PSD(m, k/N) = |Z(m, k/N)|^2 \quad (22)$$

where $k = 0, \ldots, N/2$;

$f_k = \frac{2k}{N} f_c$; and $f_c$ is the Nyquist frequency.

The PSD is the power of the frequency spectrum at N/2+1 frequencies. The PSD values PSD(m, k/N) form a periodogram over a domain of frequency samples k (i.e., $f_k$) for each time shift m.

The short-time DFT may be executed with a fast Fourier transform ("FFT"). Ideally, a high-resolution FFT comprising a large window size and high sampling rate would be used to compute a PSD in each historical window of the FFT to provide complete frequency spectrum information in the historical window. By finding a maximum PSD point at each time shift m and curve fitting, various seasonal patterns and reconstructed metric data values can ideally be forecasted with an inverse FFT. However, computing a high-resolution FFT and storing the full PSD for a sequence of non-trendy metric data is computationally expensive and time consuming in a resource constrained management system that already receives thousands of different streams of metric data and in which real time forecasts are needed to respond to rapidly to changing demands for computational resources in a distributed computing system.

Methods described herein avoid the slowdown created by a high-resolution FFT by:

1) using an FFT in a short-time window with a small number of metric data points (e.g., a short-time window may have N=64, 128 or 256 sequential non-trendy metric data points of the limited history) for three different coarse sampling rates, 2) extracting a single principle frequency from each PSD and tracking a most recent mode of the principle frequency, and 3) performing a local auto-correlation function ("ACF") search in the time domain to refine estimation of a principle period that corresponds to the principle frequency of the metric data to compensate for resolution lost with coarse sampling rates and spectral leakage.

The FFT is applied to subsequences of the sequence of non-trendy metric data, each subsequence comprising N metric data points sampled from the sequence of non-trendy metric data using a different sampling rate. Each subsequence of metric data points is searched for a periodic pattern. For example, the example sequence of non-trendy metric data 2800 shown in FIG. 28 appears to have a short periodic pattern and a longer periodic pattern as described above with reference to FIG. 28. The period determined for the shorter sampling rate has higher priority in forecasting than a period obtained for a longer sampling rate.

Figure 31:
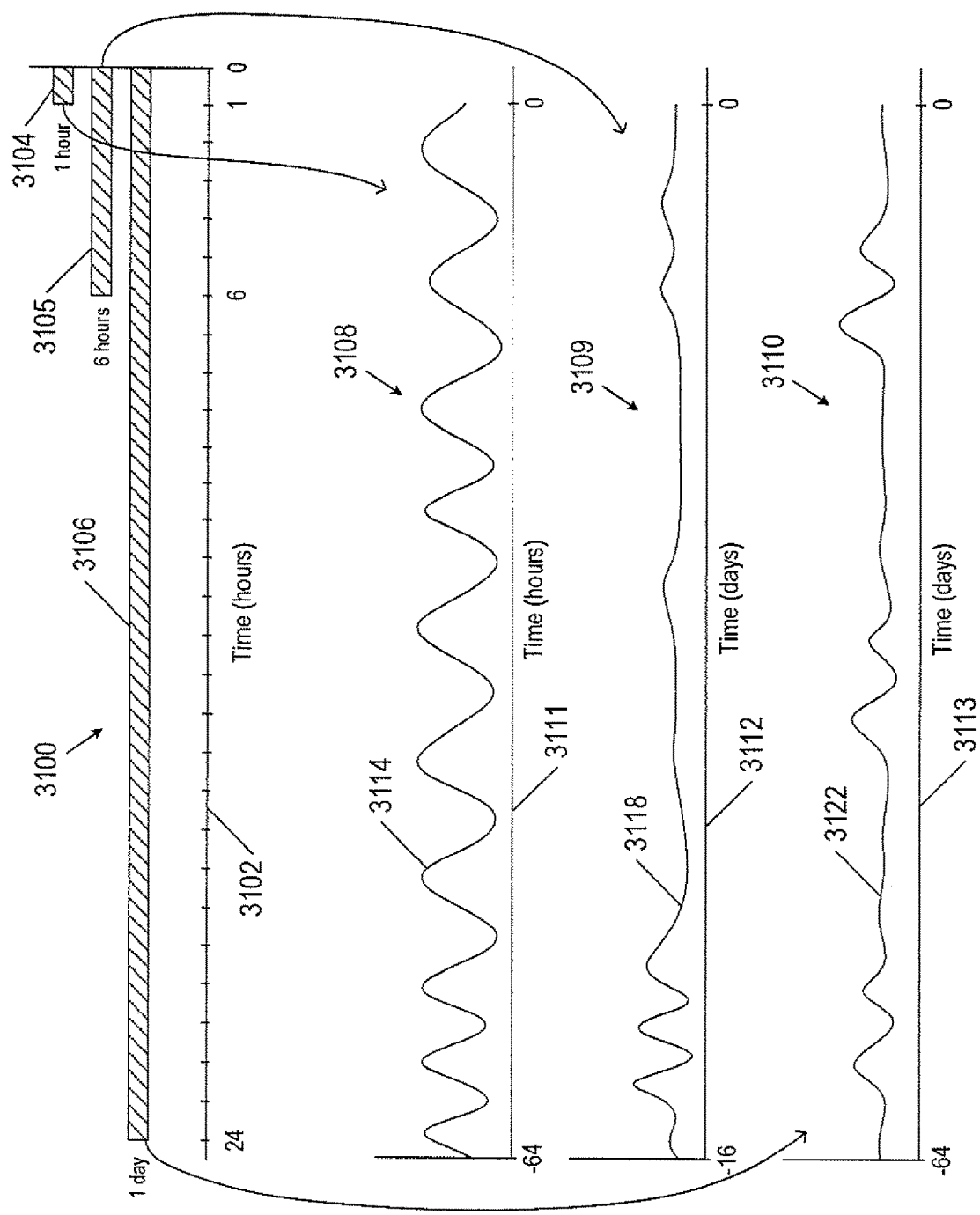
FIG. 31 shows a bar graph of three different examples of coarse sampling rates and associated streams of metric data.

FIG. 31 shows a bar graph 3100 of three different examples of coarse sampling rates and associated with different subsequences of sampled from the same sequence of non-trendy metric data. Horizontal axis 3102 represent time in hours. Hash-marked bars 3104-3106 represent durations of three different sampling rates applied to the same stream of metric data to collect three different subsequences of non-trendy metric data over three different time intervals. Each subsequence contains N=64 sequential non-trendy metric data points. Plots 3108-3110 are example plots of subsequences of metric data sampled from the same sequence of non-trendy metric data over three different time intervals and the three different sampling rates. In plots 3108-3110, horizontal axes 3111-3112 represent different time intervals. Time zero along each axis represents the current time. In plot 3108, horizontal axis 3111 represents a time interval of 64 hours. Curve 3114 represents a subsequence of metric data sampled from the sequence of non-trendy metric data over a 64-hour time interval at the sampling rate of 1 hour. In plot 3109, horizontal axis 3112 represents a time interval of 16 days. Curve 3118 represents a sequence of metric data sampled from the sequence of non-trendy metric data over a 16-day time interval at the sampling rate of 6 hours. In plot 3110, horizontal axis 3113 represents a time interval of 64 days. Curve 3122 represents metric data sampled from the sequence of non-trendy metric data over a 64-day time interval at the sampling rate of 24 hours. The different sampling rates applied to the same sequence of non-trendy metric data over different time intervals and at different sampling rates reveal different frequency patterns or seasonal periods. Subsequences of metric data 3114 and 3122 exhibit seasonal periods. Subsequence of metric data 3118 exhibits no discernible periodic pattern. If it is the case that different periods are present in the subsequences of metric data 3114 and 3122, the period for the subsequence of metric data 3114 is used to forecast metric data, because the period associated with the shorter sampling rate has higher priority in forecasting than the period associated with the longer sampling rate.

Figure 32:
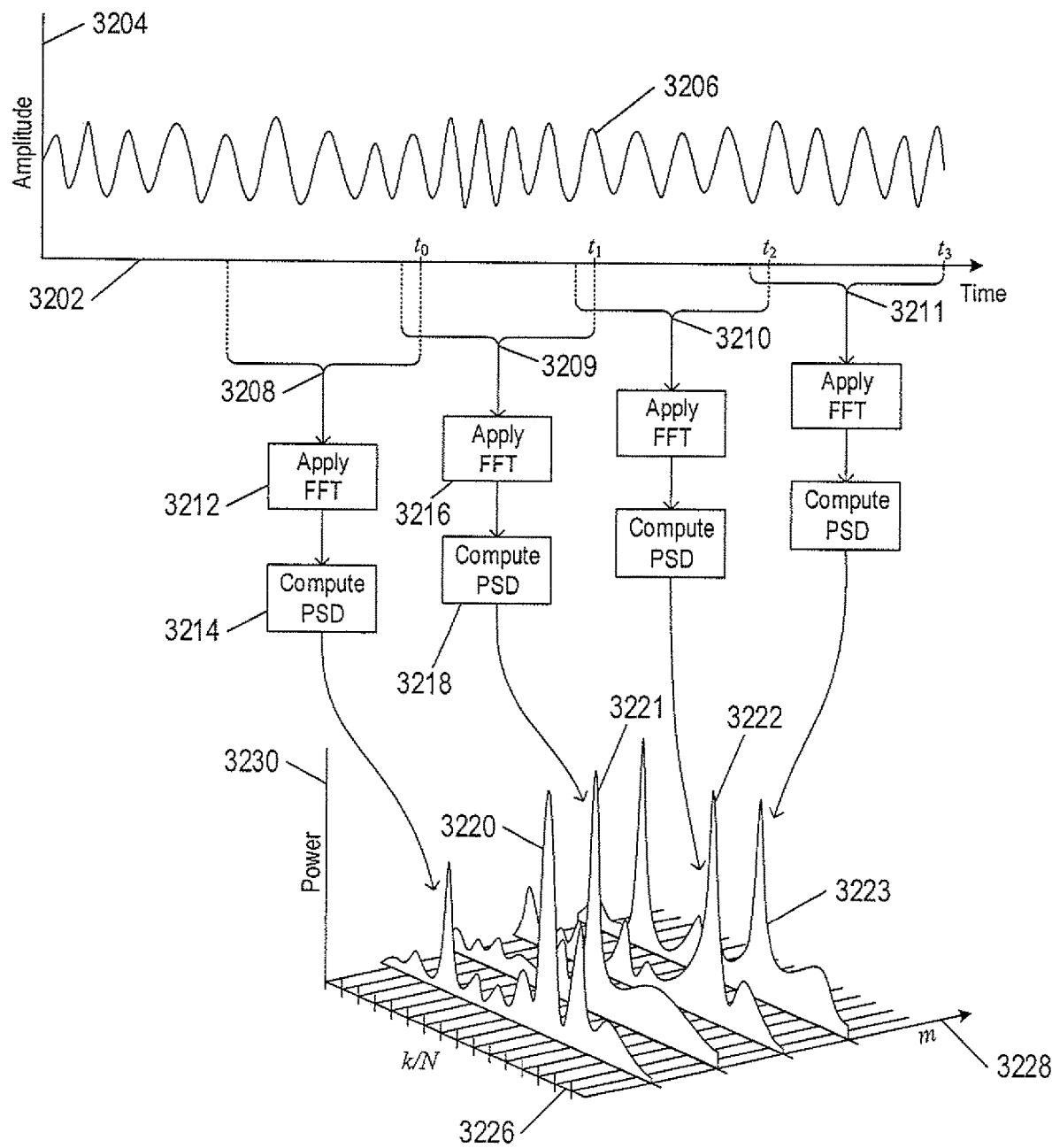
FIG. 32 shows an example of periodograms for a series of short-time windows of non-trendy metric data.

FIG. 32 shows an example of periodograms computed for a series of short-time windows of a sequence of non-trendy metric data. In FIG. 32, horizontal axis 3202 represents time. Vertical axis 3204 represents a range of metric data amplitudes. Curve 3206 represents non-trendy metric data sampled at one of the three sampling rates. Brackets 3208-3211 represents the location of a moving overlapping short-time window of non-trendy metric data as non-trendy metric data is received by the seasonal model 2211. For each short-time window, an FFT is applied to a small number N of the latest metric data points followed by computation of a PSD. For example, short-time window 3208 contains a subsequence of non-trendy metric data values up to a current time $t_0$. An FFT 3212 is applied to a latest subsequence of metric data (e.g., N=64) in the shot-time window 3208 followed by computation of a PSD 3214. As more metric data is received and sampled at the sampling rate, the FFT is applied to the subsequence of metric data in a current short-time window followed by computation of a PSD. For example, short-time window 3209 contains a subsequence of metric data up to a next current time $t_1$. An FFT 3216 is applied to the subsequence of latest metric data (e.g., N=64) in the shot-time window 3209 followed by computation of a PSD 3218. FIG. 32 also shows example plots of periodograms 3220-3223 for each the PSDs computed from the subsequences of metric data in each of the corresponding short-time windows 3208-3211. Axis 3226 represents a range of frequencies. Axis 3228 represents a range of time shifts. Axis 3230 represents a range of power.

For each periodogram, an approximate area of the periodogram is computed. For example, the approximate area of a periodogram can be computed using the Trapezoid Rule:

$$PSD_{Area} = \frac{N}{2} \sum_{k=1}^{N/2} \left( PSD\left(\frac{k-1}{N}\right) - PSD\left(\frac{k}{N}\right) \right) \quad (23)$$

Other methods may be used to compute the area of a periodogram, such as Simpson's rule and Romberg's method. Candidate principle frequencies of a periodogram are identified from the approximate area of the periodogram using the following threshold condition:

$$\operatorname*{argmax}_{k}\left\{\left(PSD\left(\frac{k}{N}\right) * K_{trap}\left(\frac{k}{N}\right)\right)\right\} > Th_{princ} * \sum_{k=0}^{N/2} PSD\left(\frac{k}{N}\right) \quad (24)$$

where

"*" means convolution;

$Th_{princ} = PSD_{Area} / Q$; and $$K_{trap}\left(\frac{k}{N}\right) = C_1 PSD\left(\frac{k-1}{N}\right) + C_2 PSD\left(\frac{k}{N}\right) + C_3 PSD\left(\frac{k+1}{N}\right)$$

The parameter Q is a positive integer (e.g., Q=3, 4, or 5) and $K_{trap}(k/N)$ is called a normalized three-point trapezoid window. The parameters $C_1$, $C_2$, and $C_3$ are normalized to 1. For example, $C_1=C_3=0.25$ and $C_2=0.5$. If none of the frequencies of the periodogram satisfies the condition given by Equation (24), the subsequence of the sequence of non-trendy metric data does not have a principle frequency in the short-time window of the FFT and is identified as non-periodic.

Figure 33A:
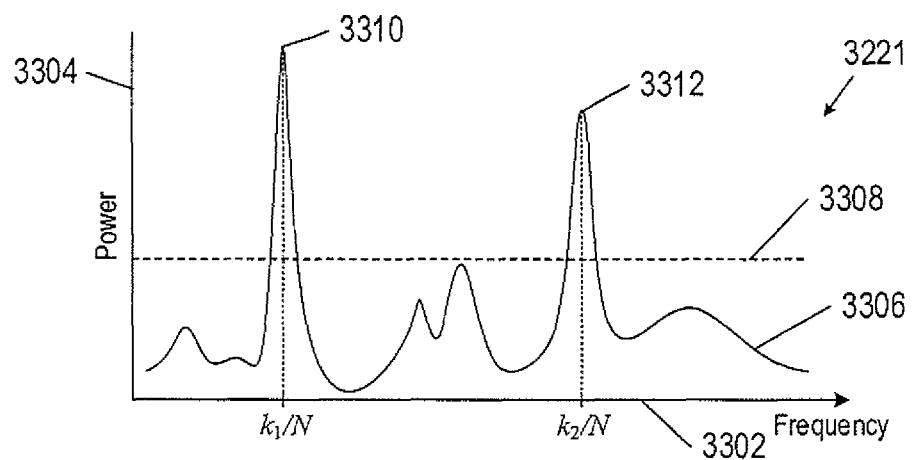
FIG. 33A show a plot of a periodogram.

FIG. 33A show a plot of the periodogram 3221 shown in FIG. 32. Horizontal axis 3302 represents a frequency spectrum sample domain. Vertical axis 3304 represents a power range. Curve 3306 represents the power spectrum present in the subsequence of metric data over a spectral domain of frequencies k/N. The area under the curve 3306 may be approximated by Equation (23). Dashed line 3308 represents the principle frequency threshold $Th_{princ}$. In this example, the periodogram reveals two strong peaks 3310 and 3312 above the threshold 3308 with corresponding frequencies $k_1/N$ and $k_2/N$. However, which of the two peaks 3310 and 3312 is the principle frequency cannot be determined directly from the periodogram alone.

Each PSD value PSD(k/N) of a periodogram is the power in the spectral domain at a frequency k/N or equivalently at a period N/k in the time domain. Each DFT bin corresponds to a range of frequencies or periods. In particular, Z(k/N) bin corresponds to periods in the time interval $$\left[\frac{N}{k}, \frac{N}{k-1}\right).$$

The accuracy of discovered candidate principle frequencies based on the periodogram deteriorates for large periods because of the increasing width of the DFT bins (N/k). In addition, spectral leakage causes frequencies that are not integer multiples of the DFT bin width to spread over the entire frequency spectrum. As a result, a periodogram may contain false candidate principle frequencies. However, a periodogram may provide a useful indicator of candidate principle frequencies.

In certain implementations, the principle frequency of the periodogram is determined by computing an autocorrelation function ("ACF") within each neighborhood of candidate periods that correspond to candidate principle frequencies of the periodogram. The autocorrelation function over time lags T is given by:

$$ACF(\tau) = \frac{1}{N} \sum_{i=1}^{N} \hat{z}_i \hat{z}_{i+\tau} \quad (25)$$

The ACF is time-domain convolution of the subsequence of non-trendy metric data values $\hat{z}_i$ in the short-time window of the FFT. Given the candidate principle frequencies of the periodogram that satisfy the threshold requirements of the condition in Equation (24), the ACF is used to determine which of the corresponding candidate periods in the time domain is a valid principle period. A candidate period with an ACF value located near a local maximum of the ACF (i.e., located within a concave-down region) is a valid period. A candidate period with an ACF value located near a local minimum of the ACF (i.e., located within a concave-up region) is not a valid period and is discarded. For a period with an ACF value that lies on a concave-down region of the ACF, the period is refined by determining the period of a local maximum ACF value of the concave-down region. The period of the local maximum is the principle period used to forecast seasonal metric data.

Figure 33B:
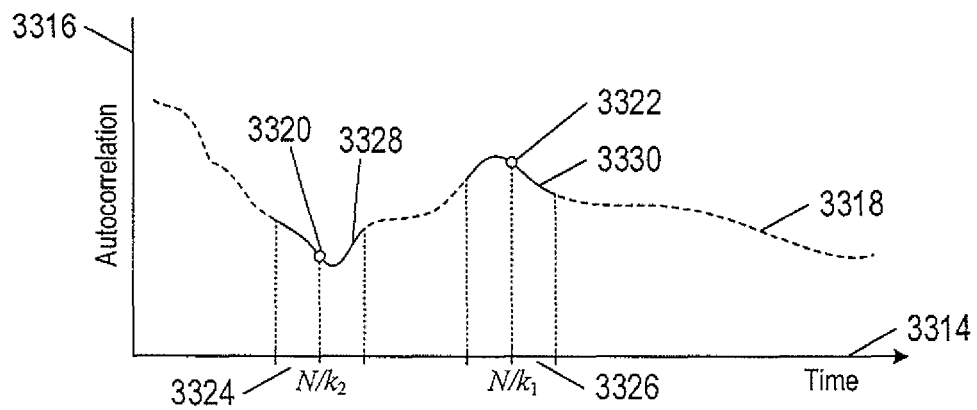
FIG. 33B shows a plot of an autocorrelation function that corresponds to the periodogram shown in FIG. 33A.

FIG. 33B shows a plot of an example ACF that corresponds to the periodogram shown in FIG. 33A. Horizontal axis 3314 represents time. Vertical axis 3316 represents a range of ACF values. Dashed curve 3318 represents ACF values computed according to Equation (25) over a time interval. Periods $N/k_1$ and $N/k_2$ represent candidate periods that correspond to candidate principle frequencies $k_2/N$ and $k_1/N$ in FIG. 33A. Open points 3320 and 3322 are ACF values at candidate periods $N/k_1$ and $N/k_2$. Rather than computing the full ACF represented by dashed curve 3318 over a large time interval, in practice, the ACF may be computed in smaller neighborhoods 3324 and 3326 of the candidate periods as represented by solid curves 3328 and 3330. The ACF value 3322 is located on a concave-down region of the ACF and corresponds to the largest of the two candidate principle frequencies. The other ACF value 3320 is located on a concave-up region of the ACF and corresponds to the smallest of the two candidate principle frequencies.

A neighborhood centered at the candidate period N/k is represented by:

$$NBH_{N/k} = \left[a, \ldots, \frac{N}{k}, \ldots, b\right] \quad (26)$$

In certain implementations, the end points for the neighborhoods may be given by:

$$a = \frac{1}{2}\left(\frac{N}{k+1} + \frac{N}{k}\right) - 1$$

and $$b = \frac{1}{2}\left(\frac{N}{k} + \frac{N}{k-1}\right) + 1$$

The upward or downward curvature of the ACF in the neighborhood of a candidate period is determined by computing a linear regression model for a sequence of points t between the endpoints of the neighborhood $NBH_{N/k}$. A split period within the search interval $R_{N/k}$ is obtained by minimizing a local approximation error for two line segments obtained from linear regression as follows:

$$t_{split} = \underset{P}{\mathrm{argmin}}(\mathrm{error}(S(a, t)) + \mathrm{error}(S(t + 1, b))) \quad (27)$$

where
t is point in the neighborhood $NBH_{N/k}$;
S(a, t) is a first line segment fit to points between point a and point t of the search interval $NBH_{N/k}$;
S(t+1, b) is a second line segment fit to points between point t+1 and point b of the search interval $NBH_{N/k}$;
error(S(a, t)) is the error between the S(a, t) and ACF values between point a and point t; and
error(S(t+1, b)) is the error between S(t+1, b) and ACF values between point t+1 and point b.

If the slopes of the first line segment $S(a, t_{split})$ and the second line segment $S(t_{split}+1, b)$ are correspondingly negative and positive, then the ACF value is in a concave-up region of the ACF and the corresponding period is discarded. If the slopes of the first line segment $S(a, t_{split})$ and second line segment $S(t_{split}+1, b)$ are correspondingly positive and negative, then the ACF value is in a concave-down region of the ACF and the corresponding candidate period is kept. Once a candidate period of a concave-down region has been identified, the local maximum ACF may be located at the end point of the first line segment $S(a, t_{split})$ or located at the start point of the second line segment $S(t_{split}+1, b)$. Alternatively, a hill-climbing technique, such as gradient ascent, is applied to determine the local maximum ACF of the concave-down region. The period that corresponds to the ACF local maximum is the principle period and is seasonal parameter used to forecast seasonal metric data over a forecast interval.

Figure 33C:
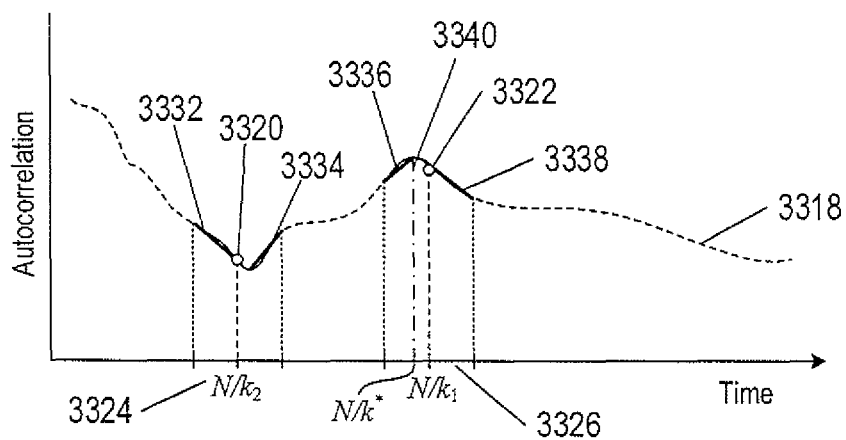
FIG. 33C shows examples of a local maximum and a local minimum in neighborhoods of the autocorrelation function shown in FIG. 33B.

FIG. 33C shows examples of line segments computed from ACF values in the neighborhoods 3324 and 3326. First and second line segments 3332 and 3334 in the neighborhood 3324 have negative and positive slopes, respectively. As a result, the candidate period $N/k_2$ is in a concave-up region of the ACF and is discarded. On the other hand, first and second line segments 3336 and 3338 in the neighborhood 3326 have positive and negative slopes, respectively. As a result, the candidate period $N/k_1$ is in a concave-down region of the ACF. The local maximum 3340 with principle period N/k* may be at the end of the first line segment or beginning of the second line segment or determined by applying a hill-climbing technique. The principle period is a seasonal parameter.

In other implementations, rather than checking each candidate period of the candidate frequencies that satisfy the condition in Equation (24) in neighborhoods of the ACF, only the candidate period that corresponds to the largest candidate principle frequency is checked using the ACF to determine if the candidate period is a principle period.

Recent mode tracking may be used to determine robust periodic model parameter estimates. Recent mode tracking is implemented with a circular buffer back-sliding histogram to track recent distributions. The periodic parameters are stored in a circular buffer. When a latest periodic parameter is determined, the periodic parameter is input to the circular buffer to overwrite the oldest periodic parameter stored in the buffer. The back-sliding histogram is updated by incrementing the count of the histogram bin the latest periodic parameter belongs to and decrementing the count of histogram bin the oldest periodic parameter belongs to. The mode tracker outputs the histogram bin with the largest count when the count is greater than a histogram threshold defined as $Th_{hist}=C \times \text{total\_count}$, where $0 < C < 1$ (e.g., $C=0.5$) and total_count is the total_count of periodic parameters recorded in the histogram. For each histogram bin, the count of periodic parameters in the histogram bin, denoted by Count(bin), is compared with the histogram threshold. When the following condition is satisfied $$\text{Count(bin)} > Th_{hist} \quad (28)$$

the latest periodic parameter with a count added to the bin with Count(bin) that satisfies Equation (28) is used to forecast periodic metric data. On the other hand, if none of the counts of the histogram bins are greater than the histogram threshold, then forecasting of the metric data is not carried out with any of the periodic parameters of the histogram bins and the metric data in the historical window does not have a periodic pattern.

Figure 34A:
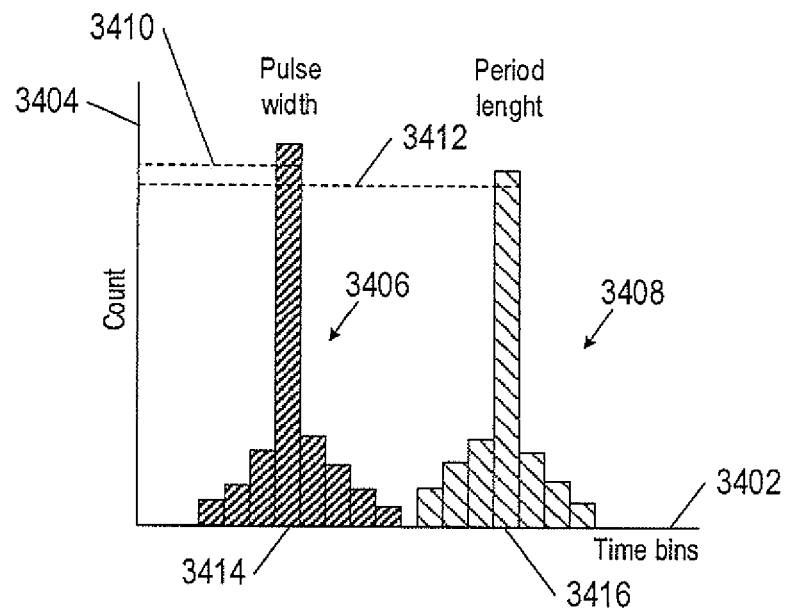
FIGS. 34A-34B show plots of example periodic parameters for a pulse wave model and a seasonal model, respectively.
Figure 34B:
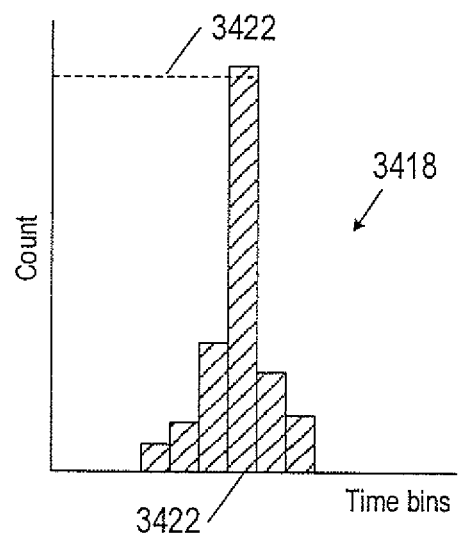

FIGS. 34A-34B show plots of example periodic parameters for the pulse wave model and the seasonal model, respectively. Horizontal axes, such as horizontal axis 3402, represent a time bin axis. Vertical axis, such as vertical axis 3404, represent counts. In FIG. 34A, histogram 3406 represents a back-sliding histogram of pulse widths and histogram 3408 represents a back-sliding histogram of periods for pulse-wave metric data for seasonal model. Dashed line 3410 represents a histogram threshold for pulse widths. Dashed line 3412 represents a histogram of threshold for periods. In the example of FIG. 34A, the count of pulse widths in histogram bin 3414 is greater than the histogram threshold 3410 and the count of periods in histogram bin 3416 is greater than the histogram threshold 3412. In this case, the most recent pulse width and period counted in corresponding historical bins 3414 and 3416 are pulse wave period parameters used to forecast pulse wave metric data. In FIG. 34B, histogram 3418 represents a back-sliding histogram of periods for seasonal model. Dashed line 3420 represents a histogram threshold for periods. In the example of FIG. 34B, the count of periods in histogram bin 3422 is greater than the histogram threshold 3420. In this case, the most recent period that corresponds to histogram bin 3422 is a seasonal periodic parameter used to forecast seasonal metric data.

Returning to FIG. 22, junction 2212 represents combining appropriate models for forecasting metric data over a forecast interval executed in block 2213. Let $\tilde{z}_{n+l}$ represent forecasted metric data values for lead times $t_{n+l}$ in a forecast interval with $l=1, \ldots, L$. The following three conditions are considered in combing appropriate models in junction 2212 for computing a sequence of forecasted metric data over a forecast interval in block 2213:

(1) Metric data in the historical window may not have a pulse wave pattern or a seasonal period. In this case, in block 2213, metric data points of a sequence of forecasted metric data are computed by combining the trend estimate given in Equation (7a) and the stochastic process model with the smallest accumulated residual error as follows:

$$\hat{z}_{n+l} = T_{n+l} + \hat{z}_{n+l}^{(m)} \quad (29)$$

Figure 35A:
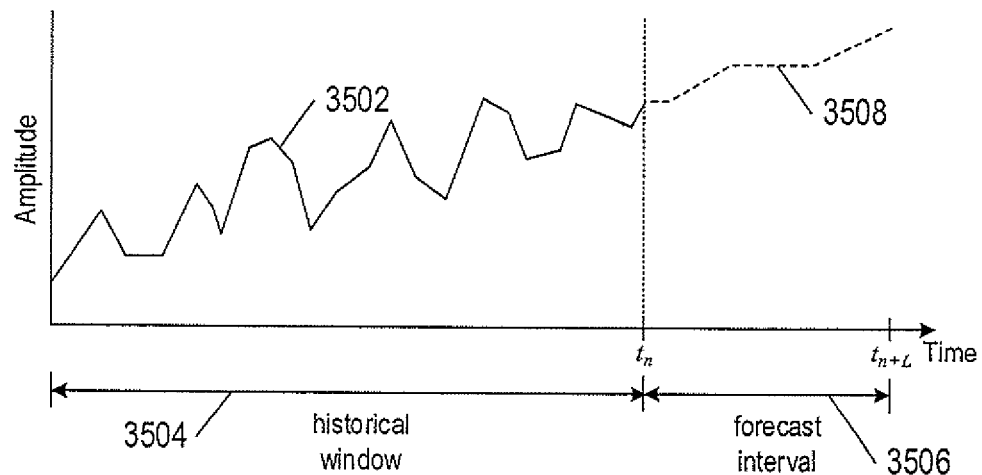
FIG. 35A shows a plot of example trendy, non-periodic metric data and forecasted metric data over a forecast interval.

FIG. 35A shows a plot of example trendy, non-periodic metric data and a sequence of forecasted metric data over a forecast interval. Jagged curve 3502 represents a non-seasonal sequence of metric data with an increasing trend over historical window 3504. At time stamp $t_n$, a forecast is requested for a forecast interval 3506. The parameters of the trend estimate and the stochastic process models are computed from the sequence of metric data in the historical window 3106 as described above. Jagged dashed-line curve 3508 represents a sequence of forecasted metric data computed using Equation (29) at lead times in the forecast interval 3506.

(2) Metric data in the historical window may be pulse wave metric data. In this case, in block 2213, metric data points of a sequence of metric data are computed by combining the trend estimate given in Equation (7a) with the stochastic process model AR(0), ARMA(0,0), or ARIMA(0, 0) and the latest pulse width and period given by back-sliding histogram as described above with reference to FIG. 34A as follows:

$$\hat{z}_{n+l} = T_{n+l} + a_{n+l} + S(A, pw, p) \quad (30)$$

where $$S(A, pw, p) = \begin{cases} A & t_s + mp \leq t_{n+l} \leq t_s + m(p + pw) \\ 0 & t_{n+l} < t_s + mp \text{ and } t_s + m(p + pw) < t_{n+l} \end{cases}$$

$$m = 1, 2, \ldots \text{ for } t_s + mp \leq t_{n+L}.$$

Figure 35B:
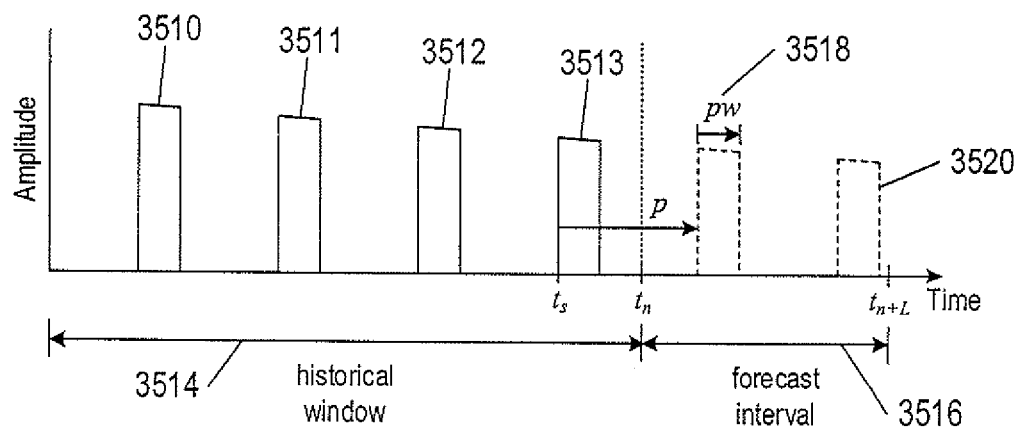
FIG. 35B shows a plot of example trendy, pulse-wave metric data and forecasted metric data over a forecast interval.

FIG. 35B shows a plot of example trendy, pulse-wave metric data and a sequence of forecasted metric data over a forecast interval. Pulses 3510-3513 represent sequence of pulse wave metric data with a decreasing trend over historical window 3514. At time stamp $t_n$, a forecast is requested for a forecast interval 3516. Upward edges of forecasted pulses in the forecast interval 3514 are given by $(t_s+mp, A+T_{n+l}a_{n+l})$ and downward edges of forecasted pulses in the forecast model are given by $(t_s+m(p+pw), A+T_{n+l}+a_{n+l})$. Dashed-line pulses 3518 and 3520 represent two forecasted pulses of sequence of forecasted metric data computed using Equation (30) over the forecast interval 3516.

(3) Metric data in the historical window may not have a pulse wave pattern but may have a seasonal period. In this case, in block 2213, metric data points of a sequence of forecasted metric data are computed by combining the trend estimate given in Equation (7a) with the stochastic process model AR(0), ARMA(0,0), or ARIMA(0,0) and the seasonal period model with the latest principle period P given by the back-sliding histogram as described above with reference to FIG. 34B as follows:

$$\hat{z}_{n+l} = T_{n+l} + a_{n+l} + S_{(n+l)modP} \quad (31)$$

where
$S_{(n+l)modP} = \hat{z}_{(n-P+l)modP}$; and
P is the principle period (i.e., P=N/k*).

Figure 35C:
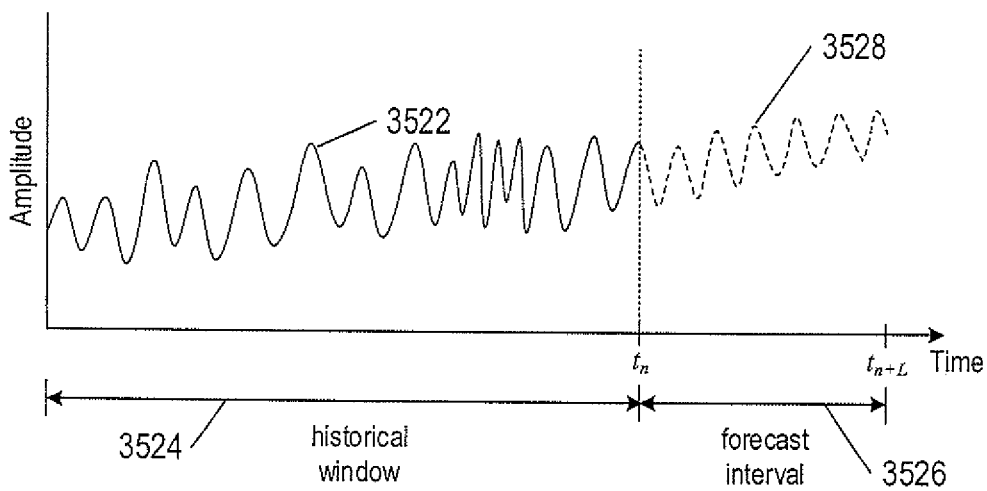
FIG. 35C shows a plot of example trendy, periodic metric data and forecasted metric data over a forecast interval.

FIG. 35C shows a plot of example trendy, seasonal metric data and a sequence of forecasted metric data over a forecast interval. Sinusoidal curve 3522 represents metric data with an increasing trend over historical window 3524. At time stamp $t_n$, a forecast is requested for a forecast interval 3526. The parameters of the trend estimate and the seasonal periodic model are computed from the sequence of metric data in the historical window 3524 as described above. Dashed curve 3528 represents a sequence of forecasted metric data computed using Equation (31) over the forecast interval 3526.

Returning to FIG. 19, the streams of metric data received by the analytics services manager 1902 may include active status streams of metric data generated by the VIMT 1914 as described above with reference to Equations (1)-(5). When the VIMT 1914 submits a request to the analytics services manager 1902 to generate forecasted active status metric data over a forecast interval, the analytics services manager 1902 assigns a corresponding metric processor that generates forecasted active status metric data over a forecast interval as described above. The forecast interval may be provided by a system administrator. If the data points in the forecasted sequence of active status metric data are zero in the forecast interval, then the virtual object is identified as prospectively inactive virtual object. A prospectively inactive virtual object may be migrated to a more cost effective virtual infrastructure or the virtual object may be deleted. In either case, the capacity of the resources of the virtual infrastructure assigned to the prospectively inactive virtual object is reclaimed and may be repurposed by assigning the resources to another virtual object or further partitioning the resources for use by other virtual objects already running on the virtual infrastructure. On the other hand, if at least one active status value in the forecasted sequence of active status metric data is non-zero in the forecast interval, then the virtual object is identified as a prospectively active virtual object and the virtual object is not disturbed and the capacity of the resources assigned to the virtual object are not reclaimed.

FIGS. 36A-36B show plots of example active status metric data for two different virtual objects running on a virtual infrastructure. Horizontal axes 3602 and 3604 represent time. Vertical axes 3606 and 3608 represent active status ranges. Time stamp $t_n$ represents a current time stamp or a current time period. Directional arrows 3610 and 3612 represent historical windows that end at the time stamp $t_n$. Directional arrows 3614 and 3616 represent forecast intervals that begin after the time stamp $t_n$. Each solid dot, such as solid dot 3618, represents an active status metric value of a virtual object computed as described above with reference to Equations (1)-(5) in the historical window 3610. For example, each active status metric value may represent the active status of the virtual object at point in time, each hour, every two hours, each day, or every three days, depending on the length of the time period selected. Each open dot, such as open dot 3619, represents a forecasted active status metric value of the virtual object computed as described above with reference to FIGS. 19-35 in the forecast interval 3614.

In FIG. 36A, the historical sequence of active status metric data exhibits a periodic pattern that is repeated with forecasted active status metric data over the forecast interval 3614. Because at least one forecasted active status metric data value in the forecast interval 3614 is non-zero, the associated virtual object is identified as a prospectively active virtual object. On the hand, in FIG. 36B, the historical sequence of active status metric data exhibits only three non-zero irregularly spaced active status metric data points 3620 and 3622. In this example, because there are so few non-zero active status metric data points that occur for earlier times in the historical window 3612, the forecasted active status metric data points in the forecast interval are zero. In this case, the associated virtual object is identified as a prospectively inactive virtual object. Virtual resources of the virtual infrastructure that are assigned to the prospectively inactive virtual object are reclaimed for use by active virtual objects or for new virtual objects that are expected to run on the virtual infrastructure.

The methods described below with reference to FIGS. 37-46 are stored in one or more data-storage devices as machine-readable instructions that when executed by one or more processors of the computer system shown in FIG. 1 manage resource utilization in a distributed computing system.

Figure 37:
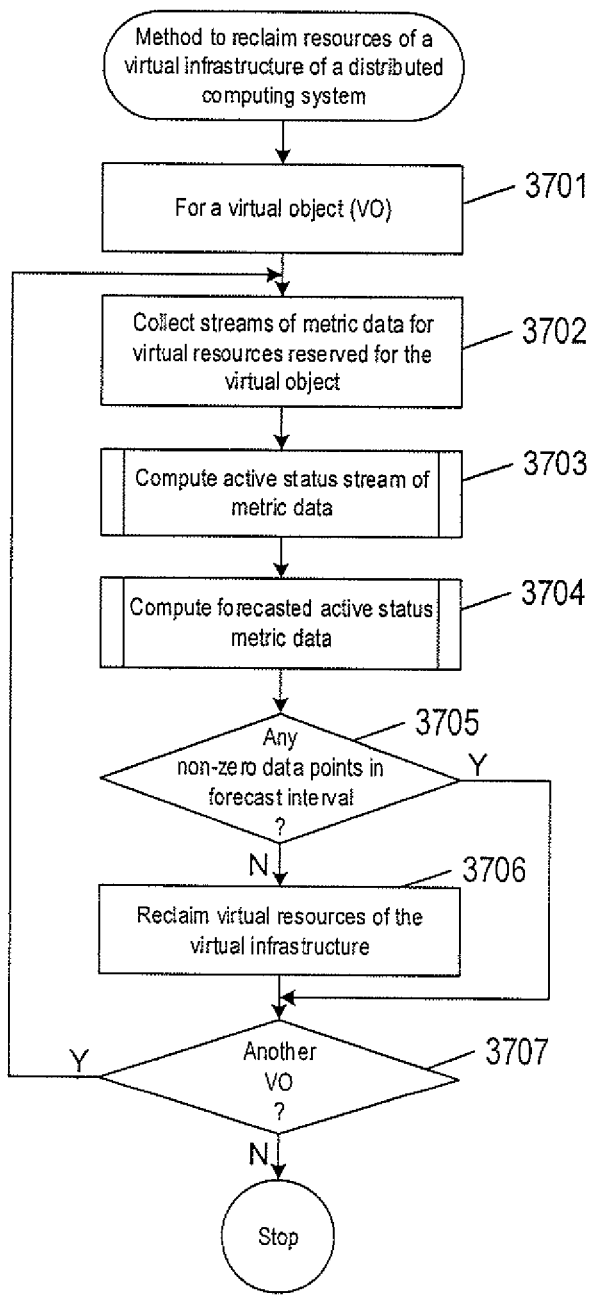
FIG. 37 shows a control-flow diagram of a method to reclaim resources of virtual infrastructure of a distributed computing system.

FIG. 37 shows a control-flow diagram of a method to reclaim resources of virtual infrastructure of a distributed computing system. A loop beginning with block 3701 repeats the computational operations represented by blocks 3702-3707 for each virtual object running in a virtual infrastructure of distributed computing system. In block 3702, streams of metric data of virtual resources assigned to the virtual object are collected. In block 3703, a routine "compute sequence of active status metric data based on recorded streams" is called to compute a sequence of active status metric data for the virtual object. In block 3704, a routine "compute forecasted active status metric data" is called to compute forecasted active status metric data over a forecast interval for the virtual object. In decision block 3705, if any of the forecasted active status metric data in the forecast interval are non-zero, the virtual object is considered a prospectively active virtual object and control flows to decision block 3707. Otherwise, the virtual object is considered a prospectively inactive virtual object and control flows to block 3706. In block 3706, the capacity of the resources of the virtual infrastructure assigned to the prospectively inactive virtual object is reclaimed and may be repurposed by assigning the resources to another virtual object or further partitioning the resources for use by other virtual objects already running on the virtual infrastructure. In decision block 3707, blocks 3702-3706 are repeated for another virtual object of the virtual infrastructure.

Figure 38:
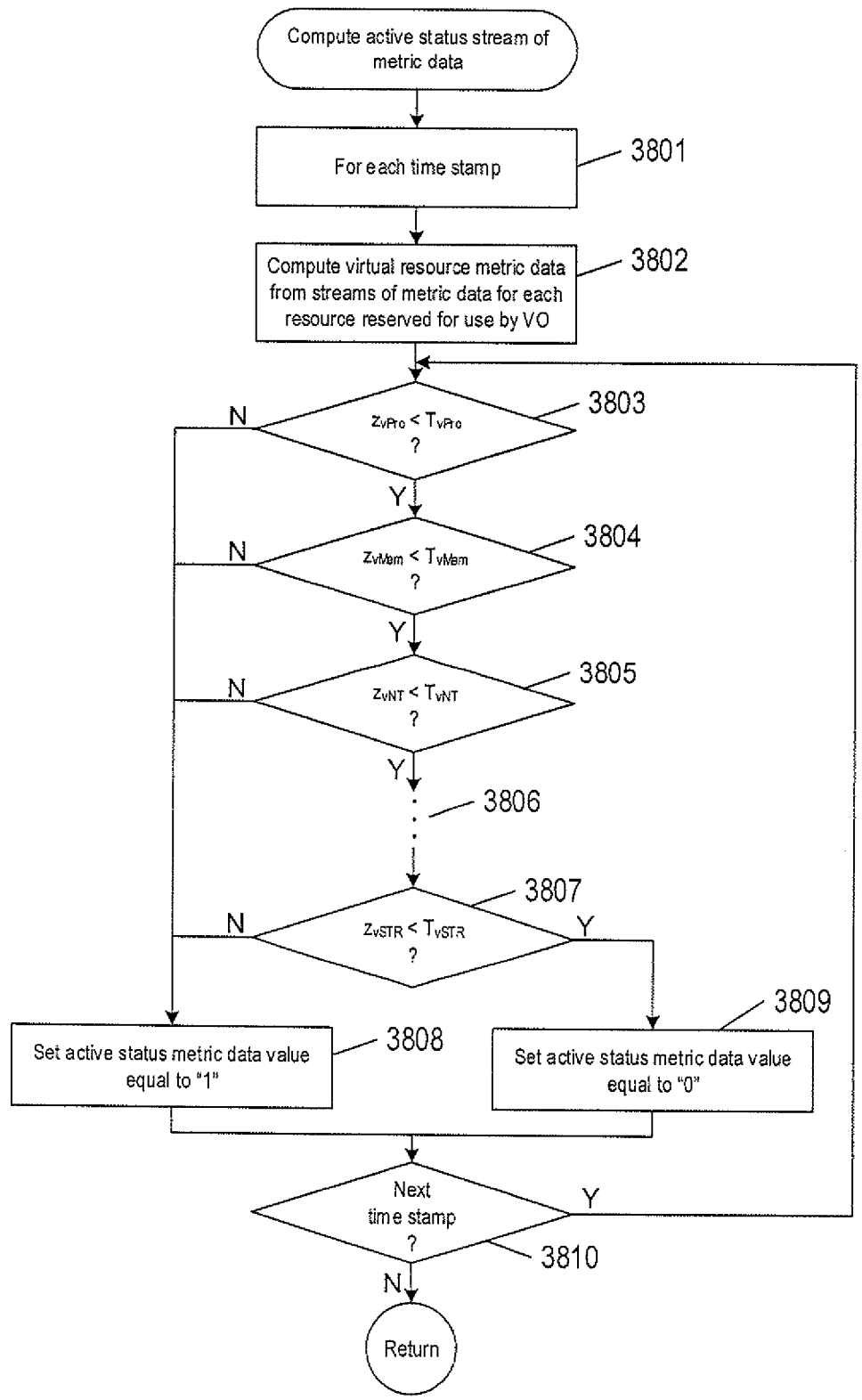
FIG. 38 shows a control-flow diagram of the routine "compute active status stream of metric" called in block 3703 of FIG. 37.

FIG. 38 shows a control-flow diagram of the routine "compute active status stream of metric" called in block 3703 of FIG. 37. A loop beginning with block 3801 repeats the computational steps represented by blocks 3802-3810 for each time stamp. In block 3802, virtual resource metric data is computed from streams of metric data for each resource assigned to use by the virtual object, as described above with reference to Equation (2). The virtual resource metric data includes virtual processor usage $z_{vPro,k}$, virtual memory usage $z_{vMem,k}$, virtual network throughput $z_{vNT,k}$, and virtual storage transfer rate $z_{vSTR,k}$. In decision block 3803, when the virtual processor usage is less than the virtual processor threshold $T_{vPro}$, control flows to block 3804. Otherwise, control flows to block 3808. In decision block 3804, when the virtual memory usage is less than the virtual memory threshold $T_{vMem}$, control flows to block 3805. Otherwise, control flows to block 3808. In decision block 3805, when the virtual memory usage is less than the virtual memory threshold $T_{vMem}$, control flows to a next decision block in a series of decision blocks that each test a different virtual resource usage as represented by ellipsis 3806. Otherwise, control flows to block 3808. In decision block 3807, when the virtual storage transfer rate is less than the virtual storage transfer rate threshold $T_{vSTD}$, control flows to block 3809. Otherwise, control flows to block 3808. In block 3808, because at least one of the virtual resource thresholds has been violated, as described above with reference to Equation (3), the active status metric value at the time stamp has been assigned a binary value "1" as described above with reference to Equation (4), indicating that the virtual resource is active at the time stamp or within the time period represented by the time stamp. In block 3809, because the virtual resource thresholds have been satisfied, as described above with reference to Equation (3), the active status metric value at the time stamp has been assigned a binary value "0" as described above with reference to Equation (4), indicating that the virtual resource is inactive at the time stamp or within the time period represented by the time stamp. In decision block 3810, the operations represented by blocks 3802-3809 are repeated for another time stamp.

Figure 39:
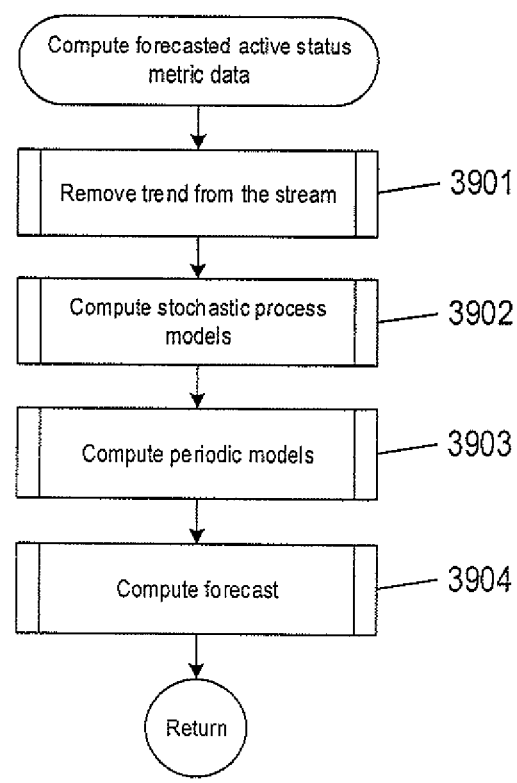
FIG. 39 shows a control-flow diagram of the routine "compute forecasted active status metric data" called in block 3704 of FIG. 37.

FIG. 39 shows a control-flow diagram of the routine "compute forecasted active status metric data" called in block 3704 of FIG. 37. In block 3901, a routine "remove trend from the stream" is called. The stream is the sequence of active status metric data computed in block 3703 of FIG. 37. In block 3902, a routine "compute stochastic process models" is called. In block 3903, a routine "compute periodic models" is called. In decision block 3905, when a forecast requested is received, control flows to block 3906. Otherwise, control flows to block 3901. In block 3904, a routine "compute forecast" is called.

Figure 40:
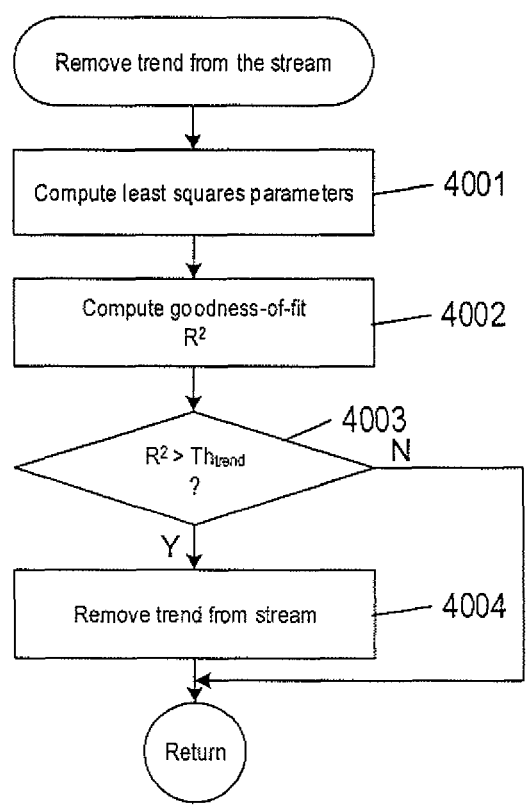
FIG. 40 shows a control-flow diagram of a routine "remove trend from the stream" called in FIG. 39.

FIG. 40 shows a control-flow diagram of the routine "remove trend from the stream" called in block 3901 of FIG. 39. In block 4001, least squares parameters for the sequence of metric data in the historical window are computed, as described above with reference to Equations (7c) and (7d). In block 4002, a goodness-of-fit parameter is computed as described above with reference to Equation (8). In decision block 4003, when the goodness-of-parameter is greater than a threshold, control flows to block 4004. In block 4004, a trend computed using the least squares parameters is subtracted from the metric data in the historical window, as described above with reference to Equations (7a), (9) and FIGS. 23B and 23C.

Figure 41:
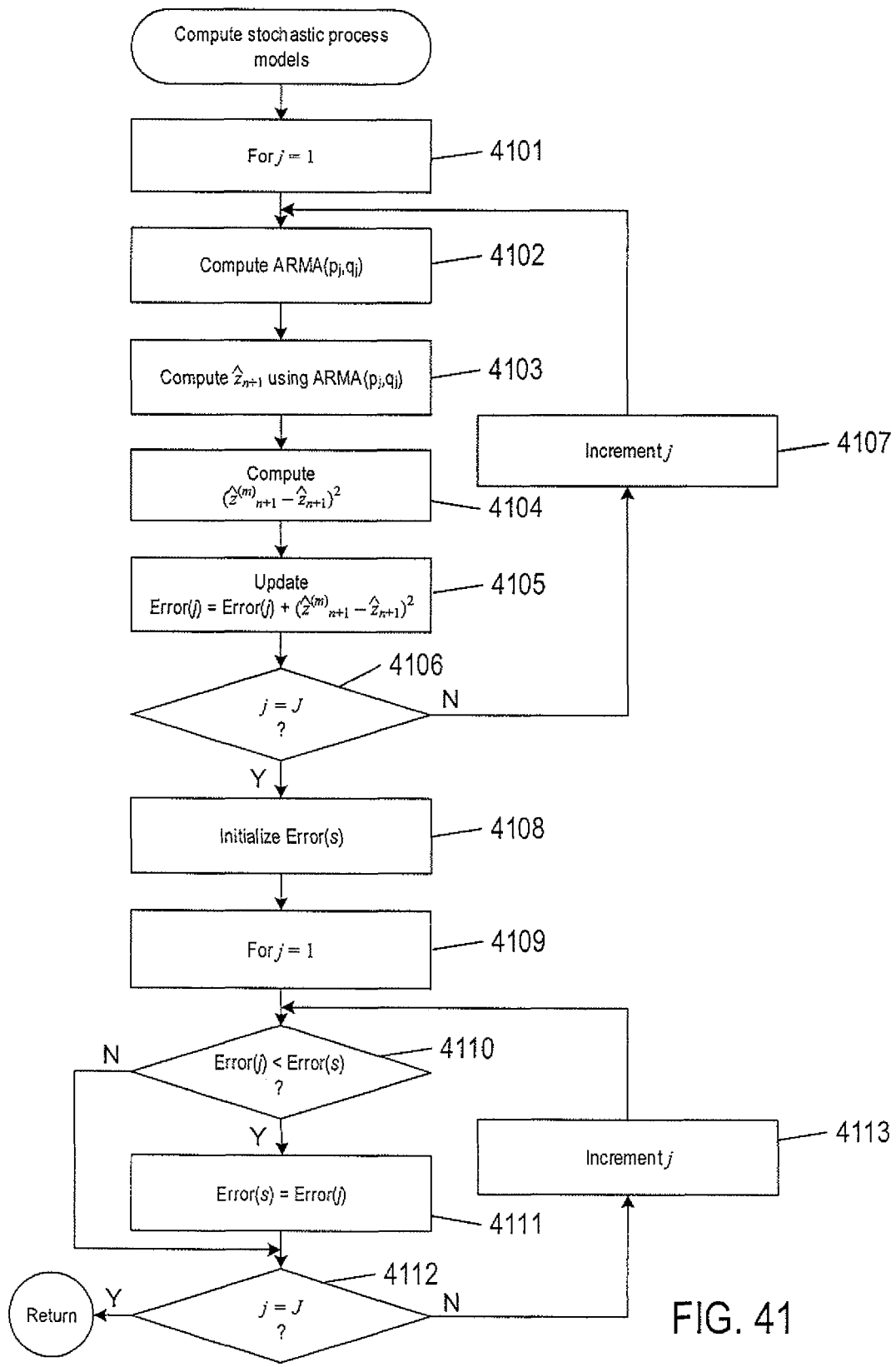
FIG. 41 shows a control-flow diagram of a routine "compute stochastic process models" called in FIG. 39.

FIG. 41 shows a control-flow diagram of the routine "compute stochastic process models" called in block 3902 of FIG. 39. A loop beginning with block 4101 repeats the computational operations represented by blocks 4102-4107 for each J different stochastic models, where J is the number of different stochastic models. In block 4102, weight parameters of a stochastic process model are computed based on previous values of the non-trendy metric data in the historical window, as described above with reference to FIG. 24. In block 4103, when a new non-trendy (e.g., detrended) metric data values is received, estimated metric data values are computed using each of the stochastic process models as described above with reference to Equation (14) and FIG. 25. In block 4104, a residual error is computed for each of the stochastic process models as described above with reference to Equation (15). In block 4105, an accumulated residual error is computed for the stochastic model as described above with reference to Equation (15). In decision block 4106, when weight parameters and accumulated residual errors have been computed for each of stochastic process models, control flow to block 4108. Otherwise, the parameter j is incremented in block 4107. In block 4108, a minimum residual error is initialized (e.g., Error(s)=100). A loop beginning with block 4109 repeats the computational operations of blocks 4110-4112 for each stochastic process model to identify the stochastic process model with the smallest accumulated residual error. In decision block 4110, when the accumulated residual error of the j-th stochastic process model is less the minimum residual error, control flow to block 4111. Otherwise, control flows to decision block 4112. In block 4111, the minimum residual error is set equal to the accumulated residual error. In decision block 4112, when accumulated residual errors for all J of the stochastic residual models have been considered control returns to FIG. 33. In block 4113, the parameter j is incremented.

Figure 42:
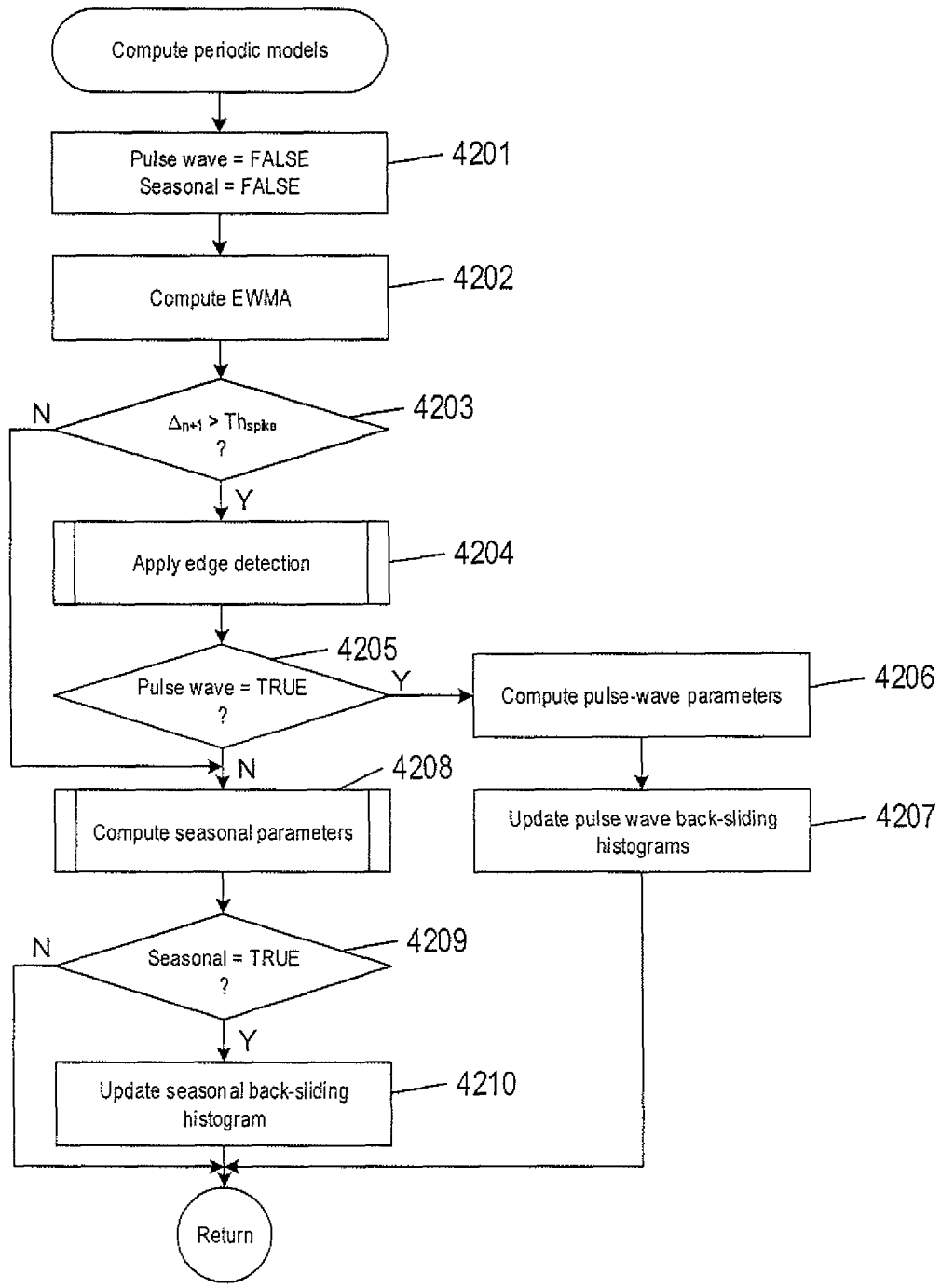
FIG. 42 shows a control-flow diagram of a routine "compute periodic models" called in FIG. 39.

FIG. 42 shows a control-flow diagram of the routine "compute periodic models" called in block 3903 of FIG. 39. In block 4201, logical parameters "Pulse wave" and "Seasonal" are set to FALSE. In block 4202, the EWMA is computed as described above with reference to Equation (19a). In decision block 4203, when the absolute difference $\Delta_{n+1}$ satisfies the condition given by Equation (19b), control flows to block 4204. Otherwise, control flows to block 4208. In block 4204, a routine "apply edge detection" is called. If pulse edges are determined in block 4204, "Pulse wave" is set to TRUE. In decision block 4205, if "Pulse wave" is set to TRUE, control flows to block 4204. Otherwise, control flows to block 4208. In block 4206, pulse width and period of a pulse wave are computed as described above with reference to FIG. 30A-30B. In block 4207, pulse wave back-sliding histograms of pulse width and period are updated as described above with reference to FIG. 34A. In block 4208, a routine "compute seasonal parameters" is called. If a seasonal parameter is determined in block 4208, "Seasonal" is set to TRUE. In decision block 4207, if "Seasonal" is set to TRUE, control flows to block 4210. In block 4210, a seasonal back-sliding histogram is updated, as described above with reference to FIG. 34B.

Figure 43:
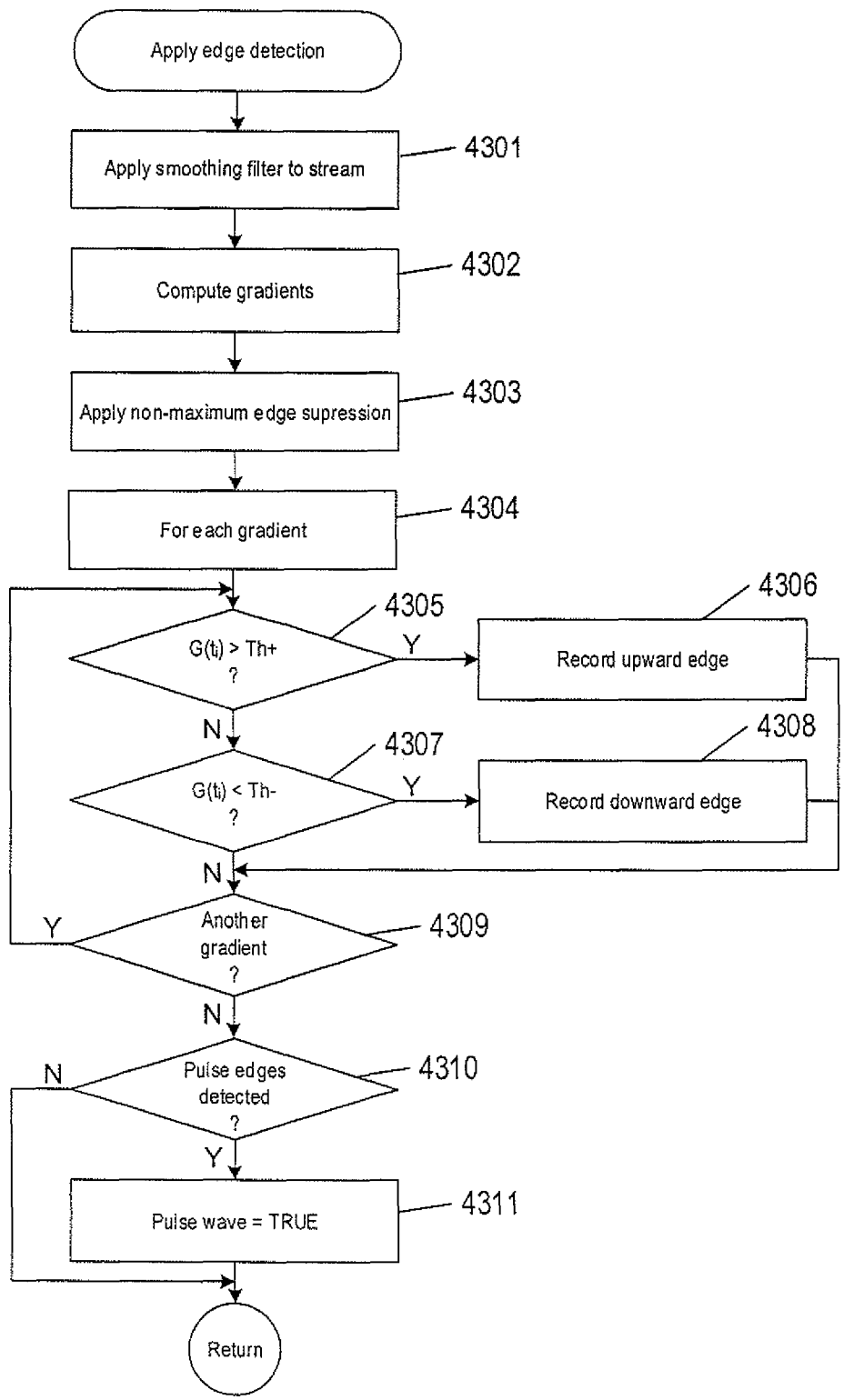
FIG. 43 shows a control-flow diagram of a routine "apply edge detection" called in FIG. 42.

FIG. 43 shows a control-flow diagram of the routine "apply edge detection" called in block 4204 of FIG. 42. In block 4301, a smoothing filter is applied to the metric data in the historical window. In block 4302, gradients are computed as described above with reference to Equation (20). In block 4303, non-maximum edge suppression is applied as described above with reference to FIGS. 29C and 29D. A loop beginning with block 4304 repeats the computation operations of blocks 4305-4308 for each gradient. In decision block 4305, when the gradient is greater than a threshold Th+, control flows to block 4306. In block 4306, the time stamp of the gradient and amplitude at the time stamp binary representation of positive gradients are recorded in a data-storage device as described above with reference to FIG. 26B. In decision block 4307, when the gradient is less than a threshold Th−, control flows to block 4308. In block 4308, the time stamp of the gradient and amplitude at the time stamp binary representation of negative gradients are recorded in a data-storage device as described above with reference to FIG. 26B. In decision block 4309, operations represented by blocks 4305-4308 are repeated for another gradient. In decision block 4310, when pulse edges of a pulse wave have been detected by conditions 4305 and 4307, control flows to block 4311. In block 4311, "Pulse wave" is set to TRUE.

Figure 44:
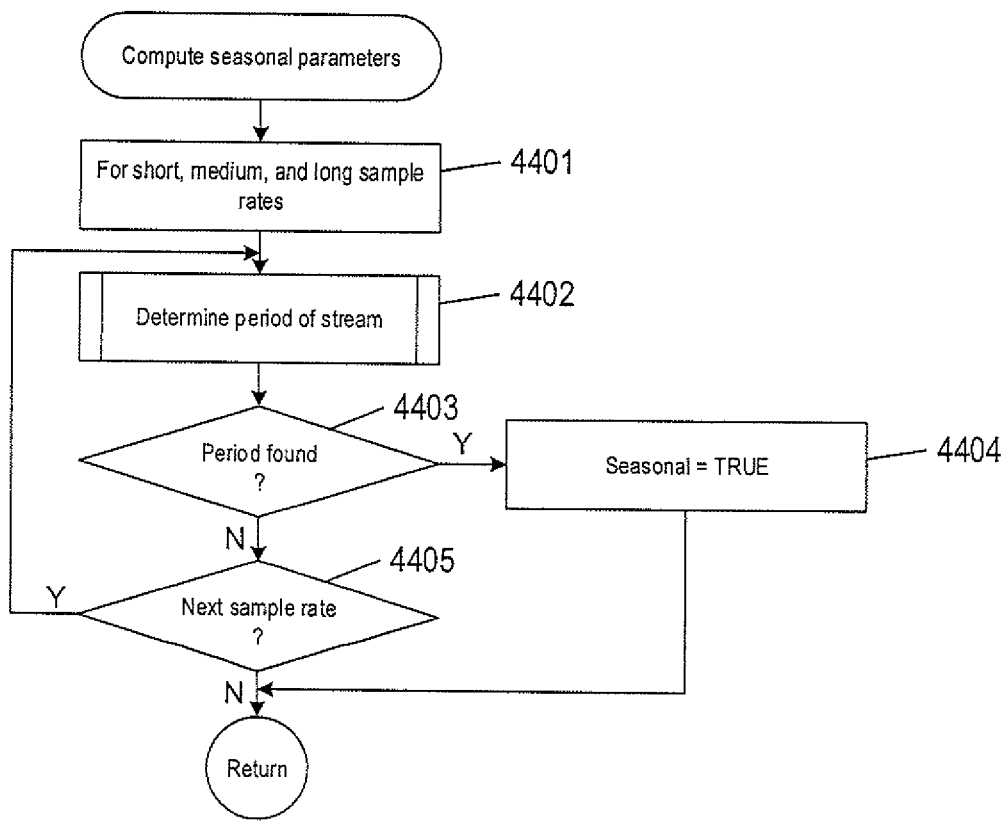
FIG. 44 shows a control-flow diagram of a routine "compute seasonal period parameters" called in FIG. 42.

FIG. 44 shows a control-flow diagram of the routine "compute seasonal parameters" called in block 4208 of FIG. 42. A loop beginning with block 4401 repeats the computational operations represented by blocks 4402-4405 for short, medium, and long sampling rates, as described above with reference to FIG. 31. In other implementations, the number sampling rates may be larger than three. In block 4402, a routine "compute period of stream" is called. In decision block 4403, when a period of the stream is determined, the period is returned and control flows to block 4404. In block 4404, "Seasonal" is set to TRUE. In decision block 4405, the computational operations represented by blocks 4402-4404 are repeated for a longer sample rate.

Figure 45:
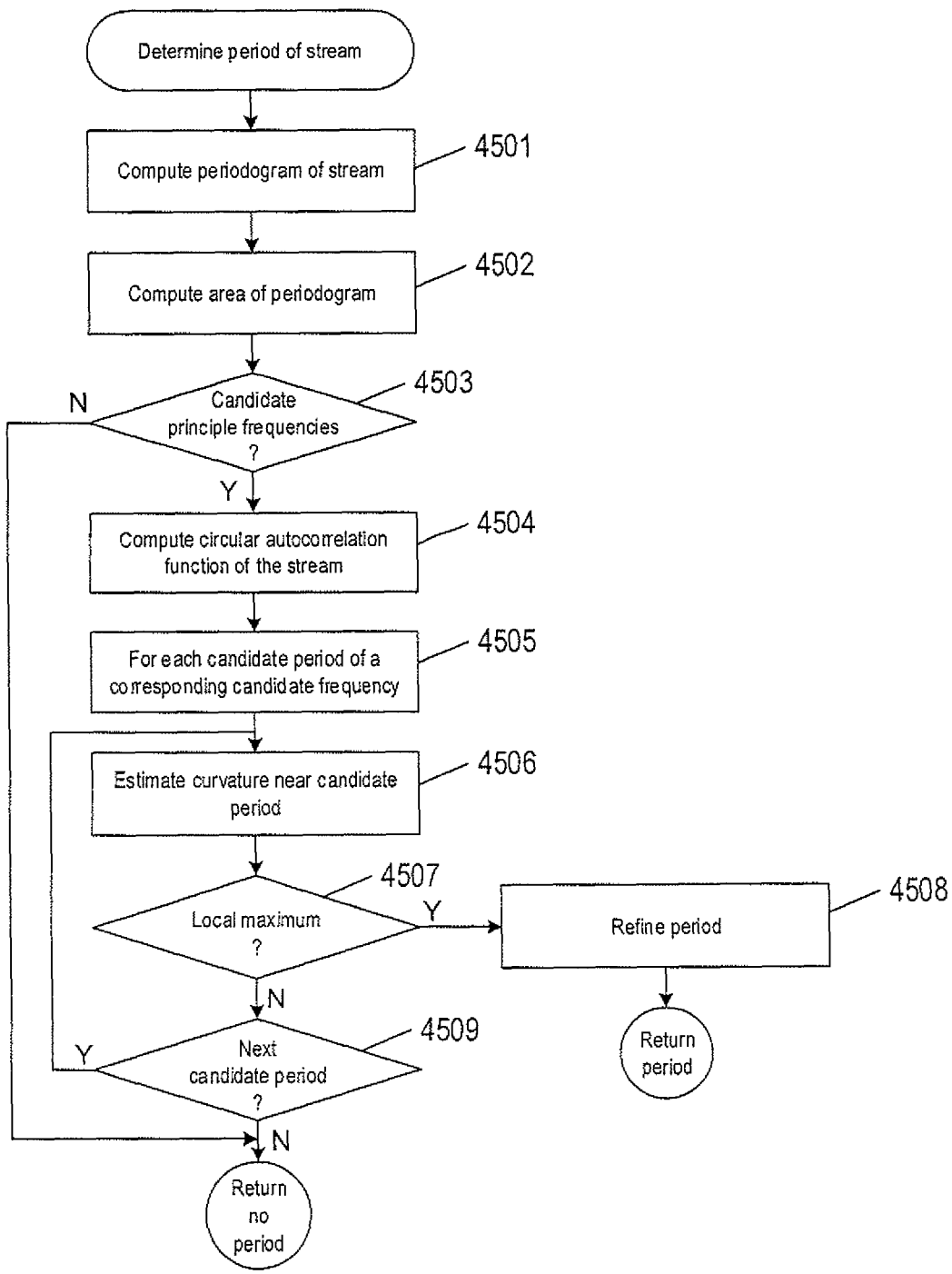
FIG. 45 shows control-flow diagram of a routine "compute period of stream" called in FIG. 44.

FIG. 45 shows control-flow diagram of the routine "compute period of stream" called in block 4402 of FIG. 44. In block 4501, a periodogram is computed for a short-time window of the historical window as described above with reference to Equations (21)-(22) and FIG. 32. In block 4502, the area of the periodogram is computed as described above with reference to Equation (23). In decision block 4503, if no frequencies of the periodogram satisfy the condition of Equation (24), then no candidate principle frequencies exist in the periodogram and the routine does not return a seasonal period for the short-time window. Otherwise, control flows to block. In block 4504, an autocorrelation function is computed in neighborhoods of candidate periods that correspond to the candidate principle frequencies, as described above with reference to Equation (25) and FIG. 33B. A loop beginning with block 4505 repeats the computational operations of blocks 4506-4509 for each candidate period. In block 4506, curvature near a candidate period is estimated as described above with reference to Equation (27). In decision block 4507, when the curvature corresponds to a local maximum, control flows to block 4508. In block 4508, the period is refined to the period that corresponds to the maximum ACF value in the neighborhood and the period is returned as the principle period, as described above with reference to FIG. 33C. In decision block 4509, operations represented by blocks 4506-4508 are repeated for another candidate period. Otherwise, no principle period is returned.

Figure 46:
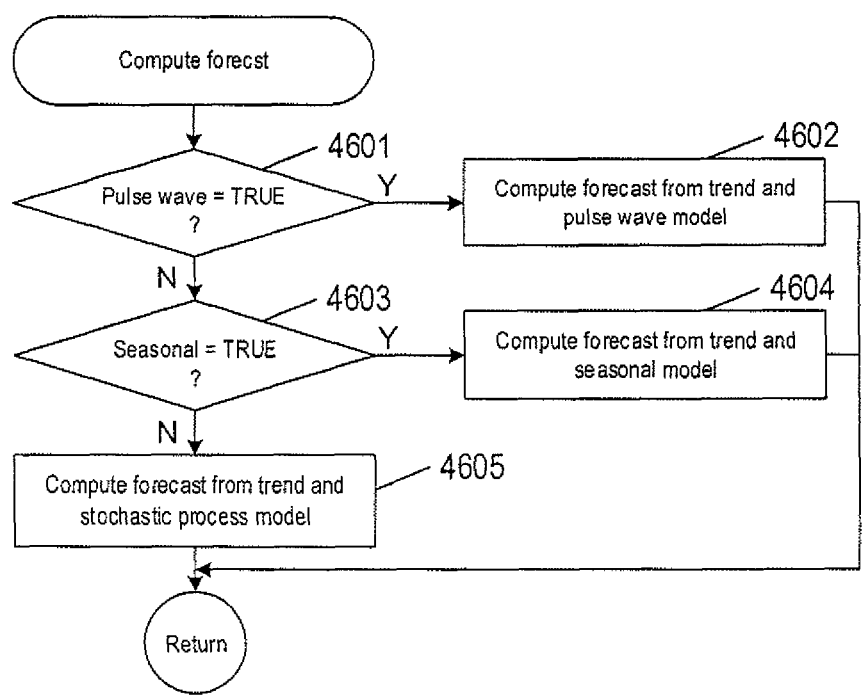
FIG. 46 shows a control-flow diagram a routine "compute forecast" called in FIG. 39.

FIG. 46 shows a control-flow diagram the routine "compute forecast" called in block 3904 of FIG. 39. In decision block 4601, when "Pulse wave" equals TRUE, control flows to block 4602. In block 4602, a forecast is computed over a forecast interval as described above with reference to Equation (30). In decision block 4603, when "Seasonal" equals TRUE, control flows to block 4604. In block 4604, a forecast is computed over the forecast interval as described above with reference to Equation (31). In block 4605, a forecast is computed over the forecast interval as described above with reference to Equation (29).

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to reclaim capacity of unused virtual resources assigned to a virtual object of a distributed computing system, the process comprising:
    collecting streams of metric data in a historical window, each stream of metric data representing usage of one of the virtual resources assigned to the virtual object;
    computing a sequence of active status metric data in the historical window based on the streams of metric data, each active status metric data value indicating active or inactive status of the virtual object in the historical window;
    computing forecasted active status metric data in a forecast interval based on the sequence of active status metric data, each forecasted active status metric data value indicating active or inactive status of the virtual object in the forecast interval; and assigning the virtual resources assigned to the virtual object to a prospectively active virtual object in the forecast interval based on the forecasted active status metric data values indicating inactive status of the virtual object in the forecast interval.

2. The process of claim 1 wherein computing the sequence of active status metric data comprises:

for each time stamp in the historical window,
assigning a value that indicates the virtual object is active to an active status metric data point in the sequence of active status metric data when one or more of the metric data values of the streams of metric data at the time stamp are greater than corresponding resource thresholds, and assigning a value that indicates the virtual object is inactive to an active status metric data point in the sequence of active status metric data when none of the metric data values of the streams of metric data at the time stamp are greater than the corresponding resource thresholds.

3. The process of claim 1, wherein computing the forecasted sequence of active status metric data in the forecast interval comprising:

computing a trend estimate in the sequence of active status metric data;

detrending the sequence of active status metric data based on the estimated trend to obtain a sequence of non-trendy metric data;

computing two or more stochastic process models of the sequence of non-trendy metric data and corresponding accumulated residual errors; and computing a pulse wave model and a seasonal model of the sequence of non-trendy metric data;

when a forecast request is received,
determining whether the sequence of non-trendy metric data is a pulse wave or seasonal;

computing the forecasted sequence of active status metric data over the forecast interval based on the estimated trend and the pulse wave model when the sequence of non-trendy metric data is a pulse wave, computing the forecasted sequence of active status metric data over the forecast interval based on the estimated trend and the seasonal model when the sequence of non-trendy metric data is seasonal, or when the sequence of non-trendy metric data is not a pulse wave and not seasonal, computing the forecasted sequence of active status metric data over the forecast interval based on the estimated trend and a stochastic process model of the stochastic process models with a smallest of the corresponding accumulated residual errors.

4. The process of claim 3 wherein estimating the trend in the sequence of active status metric data comprises:

applying linear regression to the sequence of active status metric data to generate least squares parameters; and computing a trend estimate for each time stamp of the sequence of active status metric data based on the least-squares parameters.

5. The process of claim 3 wherein detrending the sequence of metric data to obtain the sequence of non-trendy metric data comprises:

computing a goodness-of-fit parameter based the sequence of active status metric data and a trend estimate at each time stamp of the sequence of active status metric data; and when the goodness-of-fit parameter is greater than a user-defined trend threshold, subtracting the trend estimate from corresponding metric data values in the sequence of active status metric data to generate the sequence of non-trendy metric data.

6. The process of claim 3 wherein computing the two or more stochastic process models comprises:

fining weight parameters of each of the two or more stochastic process models to a different number of most recent subsequence of metric data in the sequence of non-trendy metric data;

when a new metric data value is received, detrending the new metric data value to obtain a non-trendy metric data value and computing two or more estimated non-trendy metric data values from the two or more stochastic process models;

for each of the two or more stochastic process models, computing a residual error between the estimated non-trendy metric data value and the new non-trendy metric data value; and for each of the two or more stochastic process models, summing the residual errors to generate the corresponding accumulated residual error.

7. The process of claim 3 wherein computing the two periodic models comprises:

computing an exponentially weighted moving average of absolute differences between consecutive pairs of the sequence of non-trendy metric data;

computing an absolute difference between a new non-trendy metric data value and a most recent metric data value in the sequence of non-trendy metric data;

when the absolute difference between the new non-trendy metric data value and the most recent metric data value is greater than a spike threshold, applying edge detection to determine if the sequence of non-trendy metric data is a pulse wave;

if the sequence of non-trendy metric data is a pulse wave, determining a pulse width and a period that matches a pulse width and a period of the sequence of non-trendy metric data; and if the sequence of non-trendy metric data is not a pulse wave, determining a seasonal period that matches a periodicity of the sequence of non-trendy metric data.

8. The process of claim 7 wherein determining the pulse width and the period comprises:

applying a smoothing filter to the sequence of non-trendy metric data;

computing gradients at each time stamp of the sequence of non-trendy metric data;

applying non-maximum edge suppression to the gradients at each time stamp to identify pulse edges and suppress local non-maximum gradients;

identifying upward and downward pulse edges at time stamps of pulse edges;

determining each pulse width as a difference between different pairs of consecutive upward and downward edges;

determining each period as a difference between different pairs of consecutive upward edges;

recording counts of the pulse widths and periods in bins of corresponding back-sliding pulse width and period histograms; and identifying the most recent pulse width and most recent period with counts in corresponding bins of the pulse width and period histograms that are greater than corresponding histogram thresholds.

9. The process of claim 7 wherein determining the seasonal period comprises:
for each sampling rate applied to the sequence of non-trendy metric data,
sampling the sequence of non-trendy metric data at the sampling rate to obtain a subsequence of the sequence of non-trendy metric data metric data,
computing a periodogram of the subsequence,
identifying each frequency of the periodogram that is greater than a principle frequency threshold as a candidate principle frequency,
computing autocorrelation function values in a neighborhood of a candidate period, the candidate period corresponding to a largest of the principle candidate frequencies,
estimating curvature of the autocorrelation function in the neighborhood of the candidate period, and
when the estimated curvature of the autocorrelation function is concave down, determining a principle period that corresponds to a maximum of the autocorrelation function value in the neighborhood, otherwise, identifying the subsequence as not having a principle period;
recording counts of principle periods in bins of a backsliding seasonal period histogram, principle period corresponding to a smallest of the sampling rates applied to the sequence of non-trendy metric data with a principle period; and
identifying the seasonal period for the sequence of non-trendy metric data as a most recent principle period in a bin of the histogram with a count that is greater than a histogram threshold.

10. A computer system to reclaim capacity of unused virtual resources assigned to a virtual object of a distributed computing system, the system comprising:
one or more processors;
one or more data-storage devices; and
machine-readable instructions stored in the one or more data-storage devices that when executed using the one or more processors controls the system to perform operations comprising:
collecting streams of metric data in a historical window, each stream of metric data representing usage of one of the virtual resources assigned to the virtual object;
computing a sequence of active status metric data in the historical window based on the streams of metric data, each active status metric data value indicating active or inactive status of the virtual object in the historical window;
computing forecasted active status metric data in a forecast interval based on the sequence of active status metric data, each forecasted active status metric data value indicating active or inactive status of the virtual object in the forecast interval; and
assigning the virtual resources assigned to the virtual object to a prospectively active virtual object in the forecast interval based on the forecasted active status metric data values indicating inactive status of the virtual object in the forecast interval.

11. The computer system of claim 10 wherein computing the sequence of active status metric data comprises:
for each time stamp in the historical window,
assigning a value that indicates the virtual object is active to an active status metric data point in the sequence of active status metric data when one or more of the metric data values of the streams of metric data at the time stamp are greater than corresponding resource thresholds, and
assigning a value that indicates the virtual object is inactive to an active status metric data point in the sequence of active status metric data when none of the metric data values of the streams of metric data at the time stamp are greater than the corresponding resource thresholds.

12. The computer system of claim 10, wherein computing the forecasted sequence of active status metric data in the forecast interval comprising:
computing a trend estimate in the sequence of active status metric data;
detrending the sequence of active status metric data based on the estimated trend to obtain a sequence of non-trendy metric data;
computing two or more stochastic process models of the sequence of non-trendy metric data and corresponding accumulated residual errors; and
computing a pulse wave model and a seasonal model of the sequence of non-trendy metric data;
when a forecast request is received,
determining whether the sequence of non-trendy metric data is a pulse wave or seasonal;
computing the forecasted sequence of active status metric data over the forecast interval based on the estimated trend and the pulse wave model when the sequence of non-trendy metric data is a pulse,
computing the forecasted sequence of active status metric data over the forecast interval based on the estimated trend and the seasonal model when the sequence of non-trendy metric data is seasonal, or
when the sequence of non-trendy metric data is not a pulse wave and not seasonal, computing the forecasted sequence of active status metric data over the forecast interval based on the estimated trend and a stochastic process model of the stochastic process models with a smallest of the corresponding accumulated residual errors.

13. The computer system of claim 12 wherein estimating the trend in the sequence of active status metric data comprises:
applying linear regression to the sequence of active status metric data to generate least squares parameters; and
computing a trend estimate for each time stamp of the sequence of active status metric data based on the least-squares parameters.

14. The computer system of claim 12 wherein detrending the sequence of metric data to obtain the sequence of non-trendy metric data comprises:
computing a goodness-of-fit parameter based the sequence of active status metric data and a trend estimate at each time stamp of the sequence of active status metric data; and
when the goodness-of-fit parameter is greater than a user-defined trend threshold, subtracting the trend estimate from corresponding metric data values in the sequence of active status metric data to generate the sequence of non-trendy metric data.

15. The computer system of claim 12 wherein computing the two or more stochastic process models comprises:

fitting weight parameters of each of the two or more stochastic process models to a different number of most recent subsequence of metric data in the sequence of non-trendy metric data;

when a new metric data value is received, detrending the new metric data value to obtain a non-trendy metric data value and computing two or more estimated non-trendy metric data values from the two or more stochastic process models;

for each of the two or more stochastic process models, computing a residual error between the estimated non-trendy metric data value and the new non-trendy metric data value; and for each of the two or more stochastic process models, summing the residual errors to generate the corresponding accumulated residual error.

16. The computer system of claim 12 wherein computing the two periodic models comprises:

computing an exponentially weighted moving average of absolute differences between consecutive pairs of the sequence of non-trendy metric data;

computing an absolute difference between a new non-trendy metric data value and a most recent metric data value in the sequence of non-trendy metric data;

when the absolute difference between the new non-trendy metric data value and the most recent metric data value is greater than a spike threshold, applying edge detection to determine if the sequence of non-trendy metric data is a pulse wave;

if the sequence of non-trendy metric data is a pulse wave, determining a pulse width and a period that matches a pulse width and a period of the sequence of non-trendy metric data; and if the sequence of non-trendy metric data is not a pulse wave, determining a seasonal period that matches a periodicity of the sequence of non-trendy metric data.

17. The computer system of claim 16 wherein determining the pulse width and the period comprises:

applying a smoothing filter to the sequence of non-trendy metric data;

computing gradients at each time stamp of the sequence of non-trendy metric data;

applying non-maximum edge suppression to the gradients at each time stamp to identify pulse edges and suppress local non-maximum gradients;

identifying upward and downward pulse edges at time stamps of pulse edges;

determining each pulse width as a difference between different pairs of consecutive upward and downward edges;

determining each period as a difference between different pairs of consecutive upward edges;

recording counts of the pulse widths and periods in bins of corresponding back-sliding pulse width and period histograms; and identifying the most recent pulse width and most recent period with counts in corresponding bins of the pulse width and period histograms that are greater than corresponding histogram thresholds.

18. The computer system of claim 16 wherein determining the seasonal period comprises:

for each sampling rate applied to the sequence of non-trendy metric data, sampling the sequence of non-trendy metric data at the sampling rate to obtain a subsequence of the sequence of non-trendy metric data, computing a periodogram of the subsequence, identifying each frequency of the periodogram that is greater than a principle frequency threshold as a candidate principle frequency, computing autocorrelation function values in a neighborhood of a candidate period, the candidate period corresponding to a largest of the principle candidate frequencies, estimating curvature of the autocorrelation function in the neighborhood of the candidate period, and when the estimated curvature of the autocorrelation function is concave down, determining a principle period that corresponds to a maximum of the autocorrelation function value in the neighborhood, otherwise, identifying the subsequence as not having a principle period;

recording counts of principle periods in bins of a back-sliding seasonal period histogram, principle period corresponding to a smallest of the sampling rates applied to the sequence of non-trendy metric data with a principle period; and identifying the seasonal period for the sequence of non-trendy metric data as a most recent principle period in a bin of the histogram with a count that is greater than a histogram threshold.

19. A non-transitory computer-readable medium encoded with machine-readable instructions that implement a method carried out by one or more processors of a computer system to perform operations comprising:

collecting streams of metric data in a historical window, each stream of metric data representing usage of a virtual resource assigned to a virtual object;

computing a sequence of active status metric data in the historical window based on the streams of metric data, each active status metric data value indicating active or inactive status of the virtual object in the historical window;

computing forecasted active status metric data in a forecast interval based on the sequence of active status metric data, each forecasted active status metric data value indicating active or inactive status of the virtual object in the forecast interval; and reassigning the virtual resources assigned to the virtual object to a prospectively active virtual object in the forecast interval based on the forecasted active status metric data values indicating inactive status of the virtual object in the forecast interval.

20. The medium of claim 19 wherein computing the sequence of active status metric data comprises:

for each time stamp in the historical window, assigning a value that indicates the virtual object is active to an active status metric data point in the sequence of active status metric data when one or more of the metric data values of the streams of metric data at the time stamp are greater than corresponding resource thresholds, and assigning a value that indicates the virtual object is inactive to an active status metric data point in the sequence of active status metric data when none of the metric data values of the streams of metric data at the time stamp are greater than the corresponding resource thresholds.

21. The medium of claim 19, wherein computing the forecasted sequence of active status metric data in the forecast interval comprising:

computing a trend estimate in the sequence of active status metric data;

detrending the sequence of active status metric data based on the estimated trend to obtain a sequence of non-trendy metric data;
computing two or more stochastic process models of the sequence of non-trendy metric data and corresponding accumulated residual errors; and
computing a pulse wave model and a seasonal model of the sequence of non-trendy metric data;
when a forecast request is received,
determining whether the sequence of non-trendy metric data is a pulse wave or seasonal;
computing the forecasted sequence of active status metric data over the forecast interval based on the estimated trend and the pulse wave model when the sequence of non-trendy metric data is a pulse wave,
computing the forecasted sequence of active status metric data over the forecast interval based on the estimated trend and the seasonal model when the sequence of non-trendy metric data is seasonal, or
when the sequence of non-trendy metric data is not a pulse wave and not seasonal, computing the forecasted sequence of active status metric data over the forecast interval based on the estimated trend and a stochastic process model of the stochastic process models with a smallest of the corresponding accumulated residual errors.

22. The medium of claim 21 wherein estimating the trend in the sequence of active status metric data comprises:
applying linear regression to the sequence of active status metric data to generate least squares parameters; and
computing a trend estimate for each time stamp of the sequence of active status metric data based on the least-squares parameters.

23. The medium of claim 21 wherein detrending the sequence of metric data to obtain the sequence of non-trendy metric data comprises:
computing a goodness-of-fit parameter based the sequence of active status metric data and a trend estimate at each time stamp of the sequence of active status metric data; and
when the goodness-of-fit parameter is greater than a user-defined trend threshold, subtracting the trend estimate from corresponding metric data values in the sequence of active status metric data to generate the sequence of non-trendy metric data.

24. The medium of claim 21 wherein computing the two or more stochastic process models comprises:
fitting weight parameters of each of the two or more stochastic process models to a different number of most recent subsequence of metric data in the sequence of non-trendy metric data;
when a new metric data value is received, detrending the new metric data value to obtain a non-trendy metric data value and computing two or more estimated non-trendy metric data values from the two or more stochastic process models;
for each of the two or more stochastic process models, computing a residual error between the estimated non-trendy metric data value and the new non-trendy metric data value; and
for each of the two or more stochastic process models, summing the residual errors to generate the corresponding accumulated residual error.

25. The medium of claim 21 wherein computing the two periodic models comprises:
computing an exponentially weighted moving average of absolute differences between consecutive pairs of the sequence of non-trendy metric data;
computing an absolute difference between a new non-trendy metric data value and a most recent metric data value in the sequence of non-trendy metric data;
when the absolute difference between the new non-trendy metric data value and the most recent metric data value is greater than a spike threshold, applying edge detection to determine if the sequence of non-trendy metric data is a pulse wave;
if the sequence of non-trendy metric data is a pulse wave, determining a pulse width and a period that matches a pulse width and a period of the sequence of non-trendy metric data; and
if the sequence of non-trendy metric data is not a pulse wave, determining a seasonal period that matches a periodicity of the sequence of non-trendy metric data.

26. The medium of claim 25 wherein determining the pulse width and the period comprises:
applying a smoothing filter to the active status sequence of non-trendy metric data;
computing gradients at each time stamp of the sequence of non-trendy metric data;
applying non-maximum edge suppression to the gradients at each time stamp to identify pulse edges and suppress local non-maximum gradients;
identifying upward and downward pulse edges at time stamps of pulse edges;
determining each pulse width as a difference between different pairs of consecutive upward and downward edges;
determining each period as a difference between different pairs of consecutive upward edges;
recording counts of the pulse widths and periods in bins of corresponding back-sliding pulse width and period histograms; and
identifying the most recent pulse width and most recent period with counts in corresponding bins of the pulse width and period histograms that are greater than corresponding histogram thresholds.

27. The medium of claim 25 wherein determining the seasonal period comprises:
for each sampling rate applied to the sequence of non-trendy metric data,
sampling the sequence of non-trendy metric data at the sampling rate to obtain a subsequence of the sequence of non-trendy metric data,
computing a periodogram of the subsequence,
identifying each frequency of the periodogram that is greater than a principle frequency threshold as a candidate principle frequency,
computing autocorrelation function values in a neighborhood of a candidate period, the candidate period corresponding to a largest of the principle candidate frequencies,
estimating curvature of the autocorrelation function in the neighborhood of the candidate period, and
when the estimated curvature of the autocorrelation function is concave down, determining a principle period that corresponds to a maximum of the autocorrelation function value in the neighborhood, otherwise, identifying the subsequence as not having a principle period;
recording counts of principle periods in bins of a back-sliding seasonal period histogram, principle period corresponding to a smallest of the sampling rates applied to the sequence of non-trendy metric data with a principle period; and identifying the seasonal period for the sequence of non-trendy metric data as a most recent principle period in a bin of the histogram with a count that is greater than a histogram threshold.

* * * * *